(12) United States Patent
Kajita et al.

(10) Patent No.: US 7,920,238 B2
(45) Date of Patent: Apr. 5, 2011

(54) POLARIZER AND LIQUID-CRYSTAL DISPLAY APPARATUS HAVING REDUCED POLARIZATION STATE IN OBLIQUE VIEWING ANGLES

(75) Inventors: Daisuke Kajita, Hitachi (JP); Ikuo Hiyama, Hitachinaka (JP); Mutsumi Maehara, Mobara (JP); Yuka Utsumi, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 472 days.

(21) Appl. No.: 11/038,092

(22) Filed: Jan. 21, 2005

(65) Prior Publication Data

US 2005/0206817 A1    Sep. 22, 2005

(30) Foreign Application Priority Data

Jan. 23, 2004    (JP) .................................. 2004-015056

(51) Int. Cl.
*G02F 1/1335* (2006.01)
(52) U.S. Cl. .......................... 349/118; 349/117; 349/119
(58) Field of Classification Search ........... 349/117–121
See application file for complete search history.

(56) References Cited

U.S. PATENT DOCUMENTS

| | | | | |
|---|---|---|---|---|
| 5,774,197 | A * | 6/1998 | Nakamura | 349/117 |
| 6,285,430 | B1 | 9/2001 | Saito | |
| 7,187,424 | B2 * | 3/2007 | Parri et al. | 349/117 |
| 2002/0080310 | A1 * | 6/2002 | Nakamura et al. | 349/117 |
| 2003/0122991 | A1 * | 7/2003 | Itakura et al. | 349/43 |
| 2003/0193637 | A1 * | 10/2003 | Mi et al. | 349/123 |
| 2004/0066482 | A1 | 4/2004 | Tanaka | |
| 2004/0090578 | A1 * | 5/2004 | Chang et al. | 349/117 |
| 2004/0233362 | A1 * | 11/2004 | Kashima | 349/117 |
| 2005/0140900 | A1 * | 6/2005 | Jeon et al. | 349/141 |

FOREIGN PATENT DOCUMENTS

| | | |
|---|---|---|
| CN | 1160222 | 9/1997 |
| CN | 1431546 | 7/2003 |
| EP | 1 353 214 A2 | 10/2003 |
| JP | 63-21907 | 5/1988 |
| JP | 9-80424 | 3/1997 |
| JP | 2982869 | 9/1999 |
| JP | 2001-56476 | 2/2001 |

(Continued)

OTHER PUBLICATIONS

"Crystal Chemical" Japan Society of Applied Physics, Optic Conference, Chapter 5, pp. 102-163, issued in the fourth print of the first edition in 1984 and published by Morikita Publishing Ltd.

(Continued)

*Primary Examiner* — David Nelms
*Assistant Examiner* — Lauren Nguyen
(74) *Attorney, Agent, or Firm* — Antonelli, Terry, Stout & Kraus, LLP.

(57) ABSTRACT

A liquid crystal display apparatus includes a first polarizer located on one side of a first substrate, a second polarizer located on the opposite side of a second substrate, a liquid crystal layer formed of liquid crystal molecules and between the first and the second substrates so that the liquid crystal molecules may be aligned in parallel to the first or the second substrate and to which an electric field is applied in parallel to the first substrate, and a lighting device. The first or the second polarizer includes a polarization layer and supporting materials located on both sides of the polarization layer, reducing light leakage and a colour shift in a black display state when viewed from the oblique direction.

6 Claims, 46 Drawing Sheets

FOREIGN PATENT DOCUMENTS

| JP | 3204182 | 6/2001 |
|---|---|---|
| JP | 2001-350022 | 12/2001 |
| JP | 2002-296424 A | 10/2002 |
| JP | 2003-195310 A | 7/2003 |

OTHER PUBLICATIONS

SID 98 Digest (1998) "Optimum Film Compensation Modes for TN and VA LCDs" pp. 315-318.

SID 00 Digest (2000) "Novel Wide Viewing Angle Polarizer with High Achromaticity" pp. 1094-1096.

IDW '01 Asia Display (2001) "A Wide Viewing Angle Polarizer and a Quarter-wave plate with a Wide Wavelength Range for Extremely High Quality LCDs" pp. 485-488.

J. Opt. Soc. Am. "Optical in Stratified and Anisotropic Media: 4×4—Matrix Formulation" D. W. Berreman, 1972, vol. 4, pp. 502-510.

Japanese Office Action dated Mar. 17, 2009, issued in corresponding Japanese Patent Application No. 2004-015056 (and partial English translation).

Anderson, James E., Bos, Philip J., Methods and Concerns of Compensating In-Plane Switching Liquid Crystal Displays, Japanese Journal of Applied Physics, vol. 39, No. 11, pp. 6388-6392, Nov. 2000.

\* cited by examiner

FIG.3
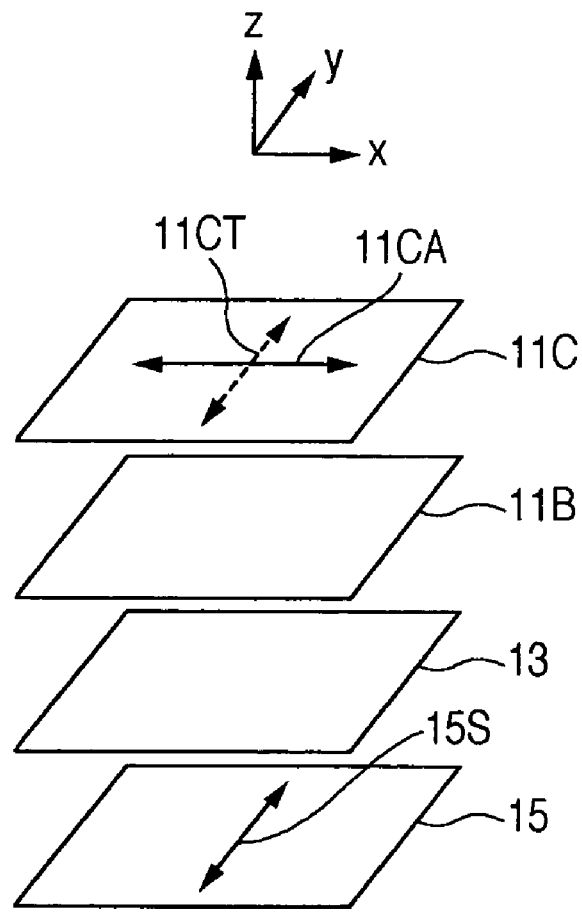
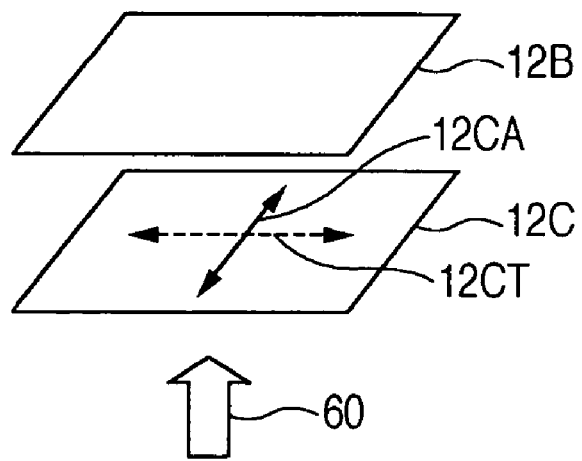

FIG.4
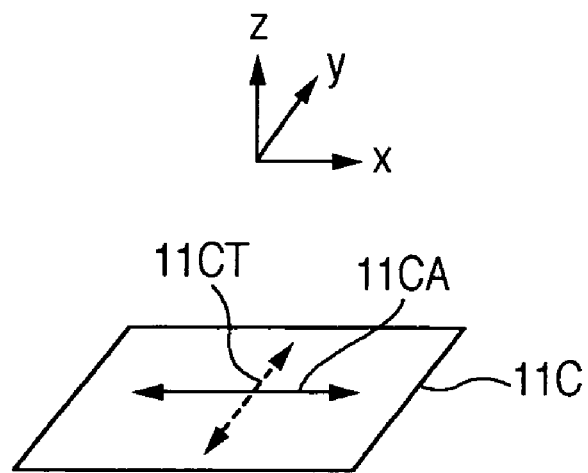
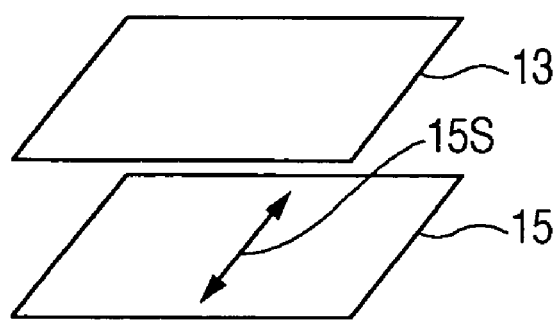
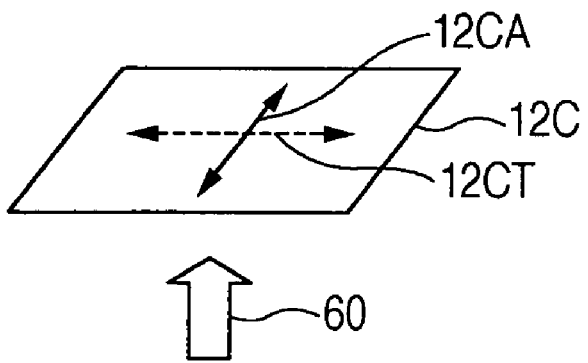

FIG.6
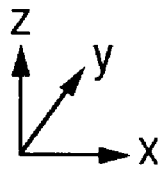
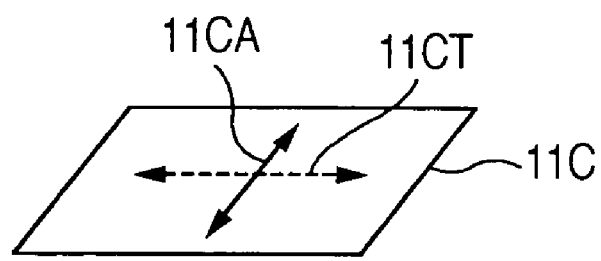
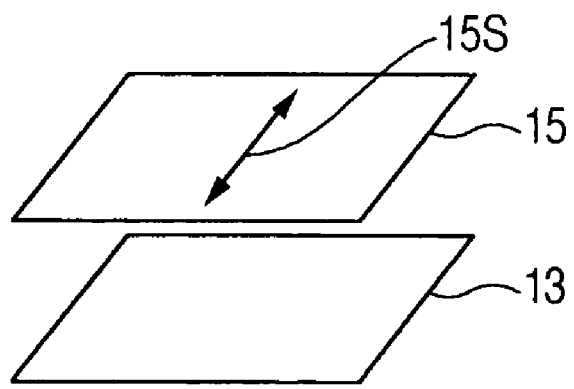
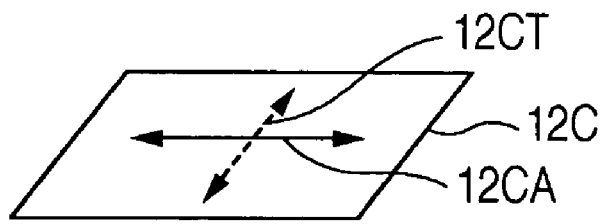

POLARIZER AND LIQUID-CRYSTAL DISPLAY APPARATUS HAVING REDUCED POLARIZATION STATE IN OBLIQUE VIEWING ANGLES

BACKGROUND OF THE INVENTION

The present invention relates to a liquid crystal (LCD) apparatus, and more particularly to the LCD apparatus with a so-called In-Plane Switching (IPS) mode in which a transmission/shut off of the light is controlled by applying an electric field in a lateral direction to liquid crystal molecules aligned in a horizontal direction.

As a system of orienting the electric field applied onto the liquid crystal in parallel to the substrate (which is referred to as a lateral electric field system or an IPS mode), a system in which an interdigital electrode is located on one substrate has been proposed in JP-A-63-21907, JP-A-9-80424, and JP-A-2001-056476. It is known that since this system allows the liquid crystal molecules to be rotated on a substantially parallel plane to the substrates, this system may reduce the difference in the degree of the double refraction, or birefringence when the electric field is applied and when it is cut off and provide a wider viewing angle.

However, it is understood that though the IPS mode reduces the change of the birefringence of the liquid crystal itself, when an operator views the display from the oblique direction shifted from the absorption axis of the polarizer, the IPS mode brings about light leakage due to the characteristic of the polarizer itself. Another system provided with a retardation film for preventing the light leakage in the oblique direction of the polarizer has been proposed in JP-A-2001-350022. This publication basically discloses improvement of the viewing angle of only the polarizer itself in consideration of the effect of the liquid crystal about the VA mode.

Further, the Japanese Patent No.3204182 discloses means for solving color shift to white in the specific viewing directions.

Moreover, the Japanese Patent No.2982869 discloses location of the retardation film on one inside of the polarizer for improving the viewing angle characteristic of the black image.

As the other references, the following publications may be referred:

(1) Japan Society of Applied Physics, Optic Conference, "Crystal Chemical", Chapter 5, Pages 102 to 163, issued in the fourth print of the first edition in 1984 and published by Morikita Publishing Ltd.

(2) J. Opt. Soc. Am. "Optical in Stratified and Anisotropic Media: 4×4—Matrix Formulation" D. W. BERREMAN, 1972, Volume 62, No. 4, Pages 502 to 510.

A disadvantage to be overcome by this invention is light leakage and color shift in the oblique direction in the LCD apparatus of the IPS mode for controlling transmission and cut-off of light by applying the electric field in the lateral direction onto the liquid crystal molecules aligned in the horizontal direction.

The IPS mode LCD apparatus is configured to have liquid crystal molecules aligned homogeneously in the horizontal direction and two polarizers with their absorption axes crossed at right angles in the vertical and the horizontal directions from the frontal view of the display. When an operator views the display obliquely from the vertical or the horizontal direction, the absorption axes of these polarizers are viewed to be crossed at right angles and the homogeneously aligned liquid crystal molecules are located in parallel to the absorption axis of one polarizer. These locations allow the luminance at black state to be sufficiently reduced. On the other hand, when the operator views the display obliquely at an azimuth angle of 45°, the angle formed between the absorption axes of the two polarizers is shifted from 90°. This shift thus causes the transmitted light to be double-refracted and thereby to be leaked, thereby being able to sufficiently reduce the luminance at black state. Further, the leakage quantity of light is variable depending on each wavelength, and the variety brings about the color shift.

The foregoing cited publications discuss the viewing angle characteristic only in light of the luminance characteristic and do not consider this problem about the color shift.

SUMMARY OF THE INVNETION

It is therefore an object of the present invention to provide an IPS mode LCD apparatus which is configured to reduce the light leakage on a black display and the color shift when viewed from the oblique direction for the purpose of obtaining the excellent display when viewed from any angle even in the black display state.

According to an aspect of the invention, a LCD apparatus includes a first polarizer located on one side of a first substrate, a second polarizer located on the opposite side of a second substrate, a liquid crystal layer laid between the first and the second substrates and having liquid crystal molecules being aligned in parallel to the first or the second substrate and in one direction so as to make the black state possible, and a lighting device, the first and the second polarizers each having a polarization layer and supporting materials located on both sides of the polarization layer and a plurality of retardation films for compensating for the polarization state of the transmitted polarized light, those films being located between the first and the second polarizers located on the side of the lighting device and between the liquid crystal layer and the first polarizer, the first polarizer having an absorption axis substantially perpendicular to the aligning direction of the liquid crystal molecules in a black state, and the liquid crystal layer having a substantially isotropic to that of the polarization layer of the second polarizer.

The LCD apparatus includes the retardation films for compensating for the polarization state of the transmitted polarized light, those films being located between the liquid crystal layer and the first polarizer located on the side of the lighting device and between the liquid crystal layer and the second polarizer, the absorption axis of the first polarizer being substantially vertical to the aligning direction of the liquid crystal molecules in a black state, and all the members located between the liquid crystal layer and the polarization layer of the second polarizer having a substantially isotropic.

The LCD apparatus includes a plurality of retardation films for compensating for the polarization state of the transmitted polarized light, those films being located between the second polarizer and the first polarizer located on the side of the lighting device and between the liquid crystal layer and the second polarizer, the absorption axis of the first polarizer being substantially parallel to the aligning direction of the liquid crystal molecules in a black state, and the portion between the liquid crystal layer and the polarization layer of the first polarizer being substantially isotropic.

The LCD apparatus includes a plurality of retardation films for compensating for the polarization state of the transmitted polarized light, those films being located between the liquid crystal layer and the first polarizer located on the side of the lighting device and between the liquid crystal layer and the second polarizer, the absorption axis of the first liquid crystal layer being substantially parallel to the aligning direction of the liquid crystal molecules in a black state, all the components located between the polarized layer of the first polarizer and the liquid crystal layer having substantially isotropic refractive indexes, and of those retardation films located between the second polarizer and the liquid crystal layer, the retardation film located on the side of the second polarizer and the supporting material between the retardation film and the polarization layer of the second polarizer having a substantially birefringence as their refractive indexes.

The LCD apparatus includes the retardation films for compensating for the polarization state of the transmitted polarized light, those films being located between the second polarizer and the first polarizer located on the side of the lighting device, at least one of those films having a relation of $R_R > R_G > R_B$ in comparing the planar retardation with the thickness retardation to the wavelength of the incident light in which $R_R$ is the retardation to red, $R_G$ is the retardation to green, and $R_B$ is the retardation to blue.

The first and the second polarizers each have a polarization layer and supporting materials located on both sides of the polarization layer, the supporting material located on one side of the polarization layer having an anisotropic on one plane and satisfying the relation of $n1 > n2 \approx n3$ in which $n1$ is a planar refractive index in the slow axis direction, $n2$ is a planar refractive index in the slow axis direction, $n2$ is a planar refractive index in the fast axis direction, and $n3$ is a refractive index in the thickness direction, in a case that the slow axis of the supporting material having the anisotropic on the plane is substantially parallel to the absorption axis of the polarization layer and the absorption axis of the first polarizer is substantially parallel to the aligning direction of the liquid crystal molecules at black state, the supporting material located on the side of the liquid crystal layer of the first polarizer having an anisotropic retardation on the plane and satisfying the relation of $n1 > n2 \approx n3$ in which $n1$ is a planar refractive index in the slow axis direction, $n2$ is a planar refractive index in the fast axis direction, and $n3$ is a refractive index in the thickness direction, in a case that the slow axis of the supporting material having the anisotropic on the plane is substantially parallel to the absorption axis of the polarization layer and the absorption axis of the first polarizer is substantially perpendicular to the aligning direction of the liquid crystal molecules in a black state, the supporting material located on the side of the liquid crystal layer of the second polarizer having an anisotropic on the plane and satisfying the relation of $n1 > n2 \approx n3$ in which $n1$ is a planar refractive index in the slow axis direction, $n2$ is a planar refractive index in the fast axis direction, and $n3$ is a refractive index in the thickness direction, and the slow axis of the supporting material having an anisotropic refractive direction on the plane being substantially parallel to the absorption axis of the polarization layer.

The polarizer has the supporting materials located on both sides of the polarization layer, at least one of the supporting materials having an anisotropic on the plane and meeting the relation of $n1 > n2 \approx n3$ in which $n1$ is a planar refractive index in the slow axis direction, $n2$ is a planar refractive index in the fast axis direction, and $n3$ is a refractive index in the thickness direction, and the slow axis of the supporting material having the anisotropic on the plane being substantially parallel to the absorption axis of the polarization layer.

The polarizer has the supporting materials located on both sides of the polarization layer, at least one of the supporting materials being formed of triacetyle-cellulose (TAC) and having the retardation films laminated thereon, those films serving to compensate for the polarization state of the transmitted polarized light, and those retardation films satisfying the relation of $n1 \approx n3 > n2$ in which $n1$ is a planar refractive index in the slow axis direction, $n2$ is a planar refractive index in the fast axis direction, and $n3$ is a refractive index in the thickness direction, and the slow axis of the retardation films being substantially perpendicular to the absorption axis of the polarization layer.

The other configurations will be described in detail along the following embodiments.

The LCD apparatus according to the invention is able to reduce the adverse effect of the liquid crystal layer in the oblique field of view and the luminance at black state and the color shift as viewed in the oblique direction.

Other objects, features and advantages of the invention will become apparent from the following description of the embodiments of the invention taken in conjunction with the accompanying drawings.

BRIEF DESCRIPTION OF THE DRAWINGS

FIG. 3 is a view showing a LCD apparatus according to an embodiment of the present invention;

FIG. 4 is a view showing a LCD apparatus according to an embodiment of the present invention;

FIG. 6 is a view showing a LCD apparatus according to an embodiment of the present invention;

DETAILED DESCRIPTION OF THE EMBODIMENTS

Hereafter, the present invention will be concretely described.

The liquid crystal TV is prevailing more and more. The liquid crystal display provides no light source in itself. Hence, what is important to the LCD is that how the LCD transmits the light emitted from the lighting device in a white display state (often referred simply to as a white state) and how the LCD cuts off the light in a black display state (often referred simply to as a black state). The present invention concerns with prevention of luminance reduction and color shift taking place when an operator views the display in the black state from the oblique direction.

Figure 7:
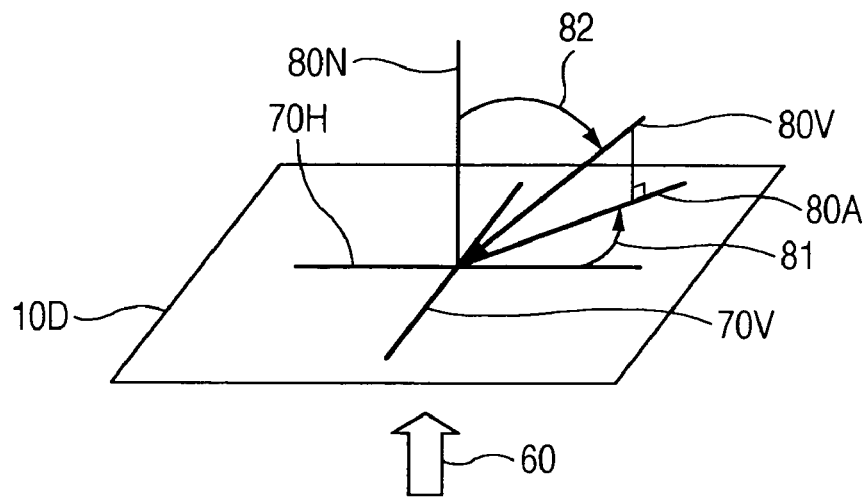
FIG. 7 is a definition view for describing the LCD apparatus of the present invention.

At first, before describing why the luminance becomes higher and the color shift takes place when the operator views the display in the black state from the oblique direction, the definitions will be described with reference to FIG. 7. Consider the case that the incident light 60 is entered from the lighting device to the liquid crystal elements, the light is transformed by the liquid crystal elements, and the light outgoes from a display plane 10D. Assuming that a display plane normal direction of the display plane 10D is 80N, the display plane horizontal direction is 70H, the display plane vertical direction is 70V, and taking the viewing direction 80V, assuming that the view angle 82 is θ and the projection direction to the display plane 10D in the viewing direction 80V is 80A, the angle formed between the projection direction 80A and the display plane horizontal direction 70H is indicated as an azimuth angle 81 by Φ.

The inventors have found the following facts. Consider why the light leakage takes place on a pair of polarizers crossed at right angles assuming that the view angle θ and the azimuth Φ are θ≠0° and Φ≠0°, 180°, ±90°. In a case that the absorption axes 11CA and 12CA (or the transmission axes 11CT and 12CT) of the two polarizers are crossed at right angles as shown in the left hand of FIG. 9, the light incident from the normal direction of the polarizer is linearly polarized through the polarizer located on the incident side and absorbed through the outgoing side polarizer, resulting in realizing the black display state. On the other hand, when viewed from the oblique direction as shown in the right hand of FIG. 9 (θ≠0°, Φ≠0°, 180°, ±90°), the transmission axes of the polarizers on the incident side and the exist side are parallel to each other, so that the light is not completely cut off by the opposite polarizer, resulting in bringing about the light leakage. Further, in a case that the liquid crystal layer aligned in parallel is located between the polarizers crossed at right angles, if the alignment axis of the liquid crystal layer is parallel to the absorption axis of the polarizer on the incident side, the liquid crystal layer does not have any influence to the polarizer, while if the alignment axis of the liquid crystal is shifted from the polarizer or the angle formed between the two polarizers is shifted from the right angle, the liquid crystal layer has any influence to the polarizer.

These polarization states are quite easily understood through the use of the Poincare sphere display. The Poincare sphere display is disclosed in Japan Society of Applied Physics, Optic Conference, "Crystal Chemical", Chapter 5, Pages 102 to 163, issued in the fourth print of the first edition in 1984 and published by Morikita Publishing Ltd. The Stokes parameters S0, S1, S2, S3 take x and y axes on the plane perpendicular to the traveling direction of light. Assuming that the electric field swings of the x and y axes are Ex and Ey and a phase difference between Ex and Ey is δ (=δy−δx), the following expression (1) is established:

$$S0 = \leq |Ex|^2 > + \leq |Ey|^2 >$$

$$S1 = \leq |Ex|^2 > - \leq |Ey|^2 >$$

$$S2 = \leq 2ExEy \cos \delta >$$

$$S3 = \leq 2ExEy \sin \delta > \quad (1)$$

Figure 8:
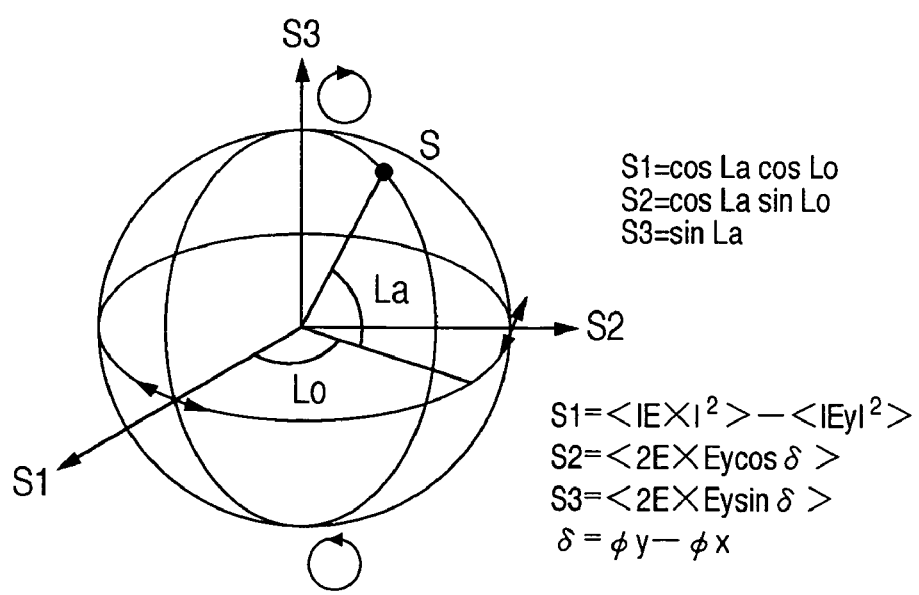
FIG. 8 is a view showing a general Poincare sphere to be used for describing the LCD apparatus of the present invention.

For the complete polarization, $S0^2 = S1^2 + S2^2 + S3^2$ is established. When this is represented on the Poincare sphere, the result is indicated in FIG. 8. The rectangular coordinates take the S1, the S2 and the S3 axes and the S point that represents the polarization state is located on the sphere with a strength S0 as a radius. Taking a certain polarization state S and representing the S point with the latitude La and the longitude Lo, for the completely polarized light, $S0^2 = S1^2 + S2^2 + S3^2$ is established. Hence, considering the sphere with the radius 1, the following expression (2) is established.

$$S1 = \cos La \cos Lo$$

$$S2 = \cos La \sin Lo$$

$$S3 = \cos La \quad (2)$$

On the Poincare sphere, the right-handed polarization is located in the upper hemisphere, the left-handed polarization is located in the lower hemisphere, the linear polarization is located in the equator, the right-handedly circular polarization is located in the north pole, and the left-handed circular polarization is located in the south pole.

Figure 9:
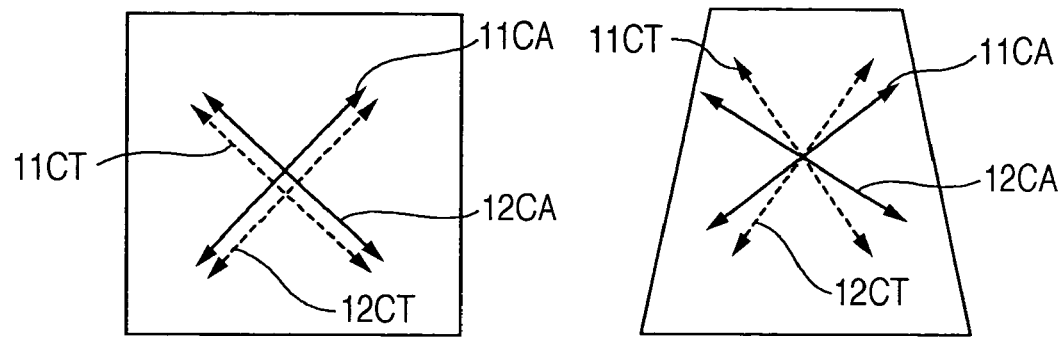
FIG. 9 is a concept view for describing the LCD apparatus of the present invention.
Figure 10:
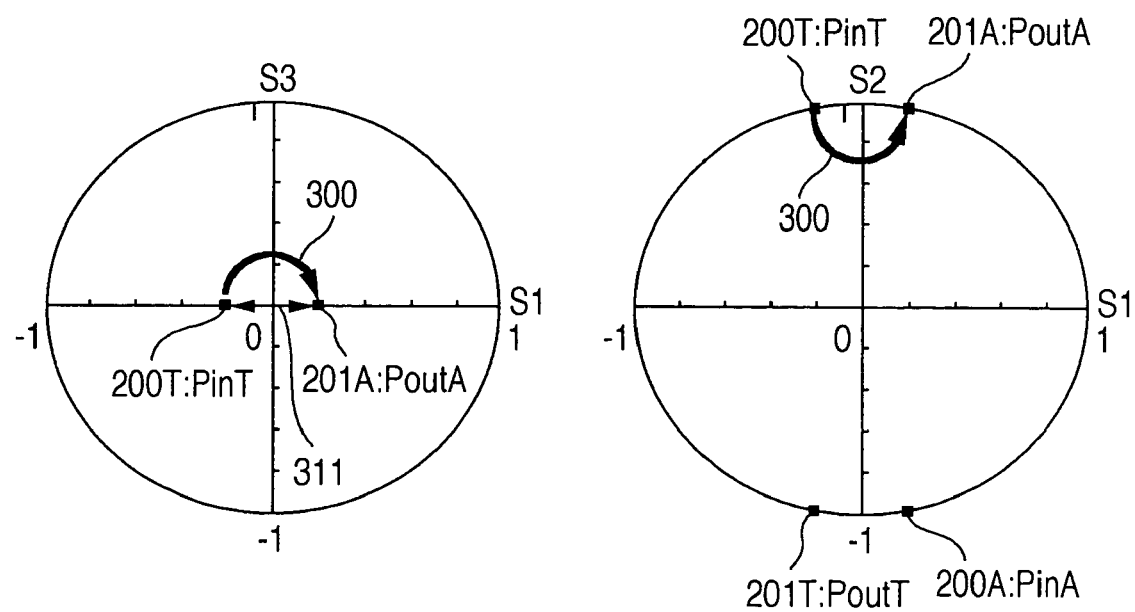
FIG. 10 is a view showing the Poincare sphere to be used for describing the LCD apparatus of the present invention.

Considering the state shown in FIG. 9 on the Poincare sphere, the result is shown in FIG. 10. In FIG. 10, viewed at an azimuth angle Φ=45° and θ=60°, the right figure shows the projection from the S1 to S2 plane and the left figure shows the projection from the S1 to S3 plane. The polarization state of the transmission axis 12CT of the polarizer on the incident side is 200T, the linearly polarized light having the light polarized components on the absorption axis 12CA is 200A, the transmission axis 11CT of the polarizer on the outgoing side is 201T, the linear polarization having the polarized components on the absorption axis 11CA is 201A. That is, the distance 311 between 200T and 201A corresponds to the light leakage. Hence, it is understood that the light leakage may be prevented by executing the conversion 300 from the polarization state 200T into the polarization state 201A.

FIG. 10 shows the ideal state in which only the polarization layers are located. The ordinary polarizer includes supporting materials on both sides of the polarization layer. The supporting material is ordinarily formed of triacetyle-cellulose (TAC), in which material no substantial phase difference takes place on the plane but the retardation R·h takes place in the thickness direction. Assuming that the slow axis on the plane of the supporting material is oriented in parallel to the x axis and the refractive indexes in the x and the y axes are nx and ny, the refractive index in the thickness direction is nz, and the thickness is h, the following expression (3) is established:

$$R \cdot h = ((nx+ny)/2 - nz) \cdot h \quad (3)$$

Figure 1:
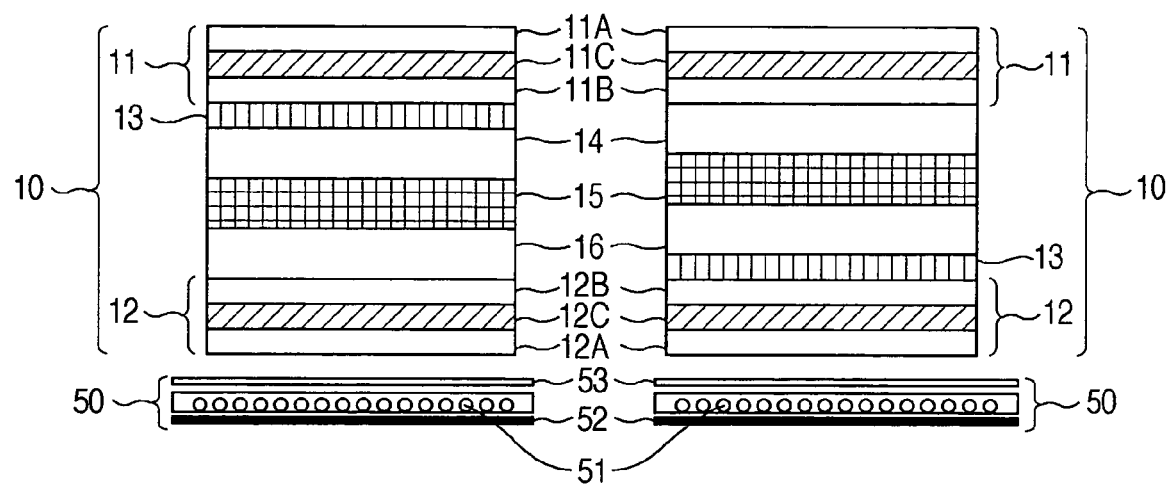
FIG. 1 is a view showing a LCD apparatus according to an embodiment of the present invention.
Figure 2:
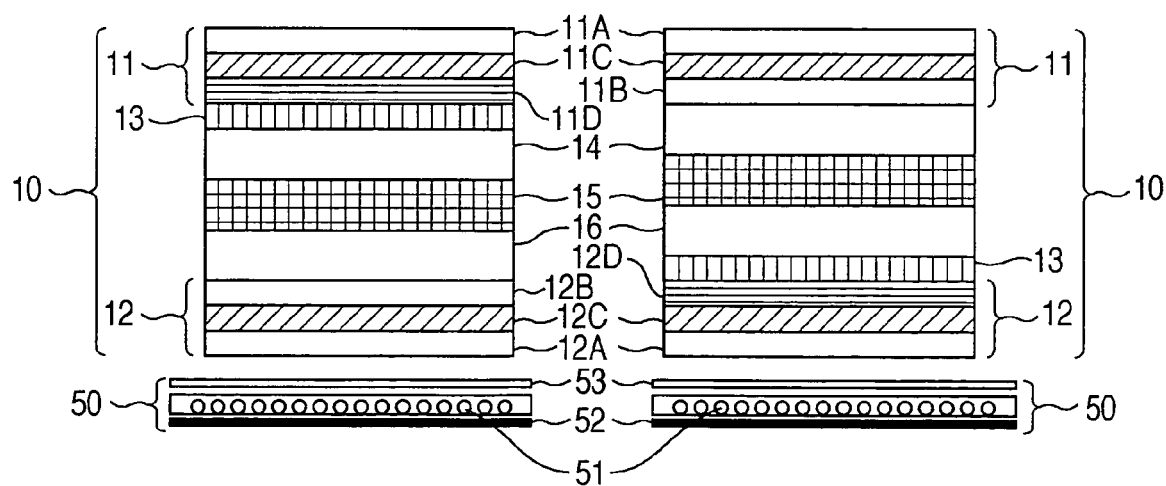
FIG. 2 is a view showing a LCD apparatus according to an embodiment of the present invention.
Figure 5:
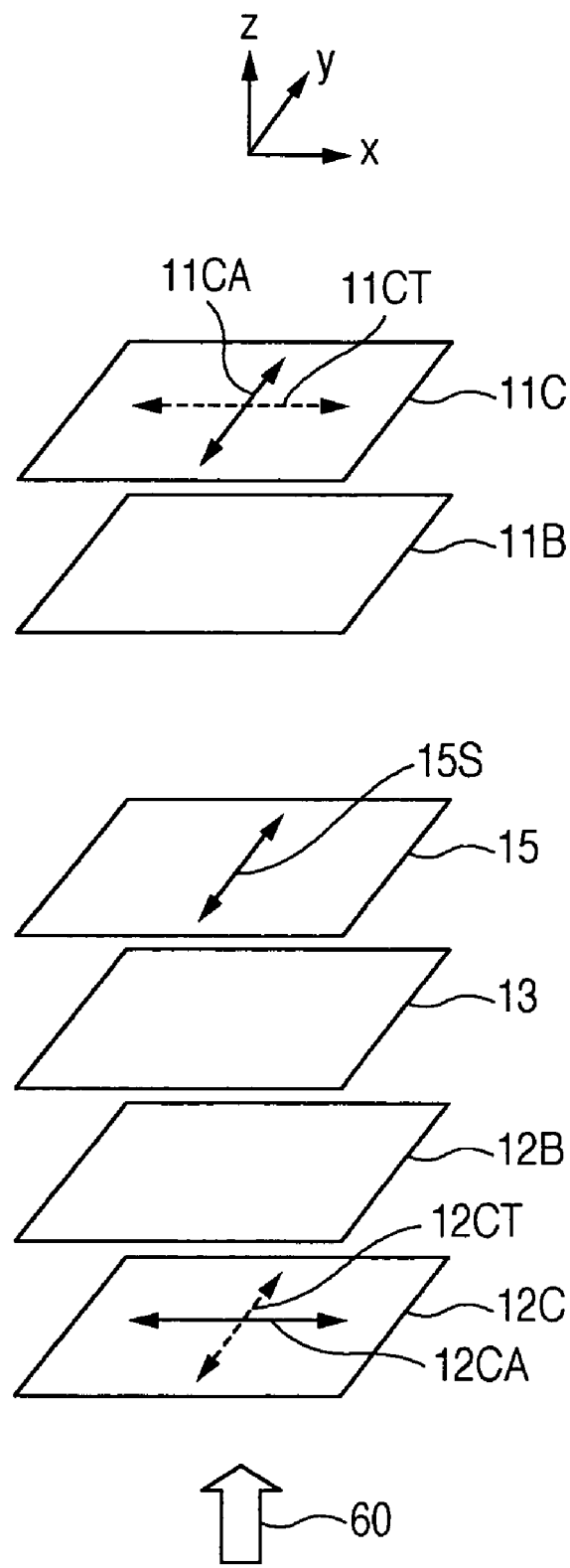
FIG. 5 is a view showing a LCD apparatus according to an embodiment of the present invention.

This retardation R·h allows no influence to be given to the polarization state in vertical incidence but any influence of the supporting material to be given to the polarization state in oblique incidence, resulting in changing the polarization state in oblique incidence. Herein, consider the change of the polarization state in the optical layer configuration shown in FIG. 3. The polarizers 11 and 12 are located on both sides of the liquid crystal layer 15. The supporting material 12B is located on the inside of the polarizer 12 on the incident side. The polarizer 11 on the exist side includes the supporting material 11B located on its inside. The alignment axis 15S of the liquid crystal is located in parallel to the absorption axis 12CA of the incident side polarizer 12 and perpendicularly to the transmission axis 12CT thereof as well as perpendicularly to the absorption axis 11CA of the exist side polarizer 11 and in parallel to the transmission axis 11CT thereof. This location is called the o-mode. In a case that the axes of the upper and the lower polarizers are rotated by 90° with respect to each other as shown in FIG. 5, that is, in a case that the alignment axis 15S of the liquid crystal is located perpendicularly to the absorption axis 12CA of the incident side polarizer 12 and in parallel to the transmission axis 12CT thereof as well as in parallel to the absorption axis 11CA of the exist side polarizer 11 and perpendicularly to the transmission axis 11CT thereof. This location is called the e-mode. Further, ordinarily, the supporting materials 11A and 12A are located on the outsides of the polarization layers 11C and 12C as shown in FIGS. 1 and 2. In actual, however, those supporting materials are left out because they are not necessary in considering the polarization state. Consider the change of the polarization state on the Poincare sphere through the use of the left figure of FIG. 11 with respect to the configuration of FIG. 3. Herein, assuming that the anisotropic of the liquid crystal layer 15 is $\Delta nLC$ and its gap is $dLC$, the product of $\Delta nLC$ and $dLC$ is called retardation. Moreover, if not specified in the following description, it is considered that each property value takes a wavelength of 550 nm. Considering that the light viewed at an azimuth angle $\Phi = 45°$ and a view angle $\theta = 60°$ like the case of FIG. 10, the polarization state of the light transmitted through the transmission axis 12CT of the polarization layer 12C is 200T, the retardation $R1 \cdot h1$ of the supporting material 12B causes the S1 axis to be rotated by the retardation $R1 \cdot h1$ clockwise as viewed from $-1$ side, thereby converting the polarization state 200T into the left-handed elliptical polarization that is the polarization state 202. Further, the liquid crystal layer 15 causes the point 200T to be rotated clockwise by the retardation $\Delta nLC \cdot dLC$ of the liquid crystal layer. Further, the retardation $R2 \cdot h2$ of the supporting material 11B of the outgoing side polarizer 11 causes the S1 axis to be rotated by the retardation $R2 \cdot h2$ clockwise as viewed from $-1$ side, thereby converting the polarization state into the right-handed elliptical polarization that is the polarization state 204. Herein, the polarization state that is matched to the absorption axis 11CA of the exist polarization layer 11C is denoted by 201A. The light is leaked by the distance 310 between the polarization state 204 and 201A.

Figure 11:
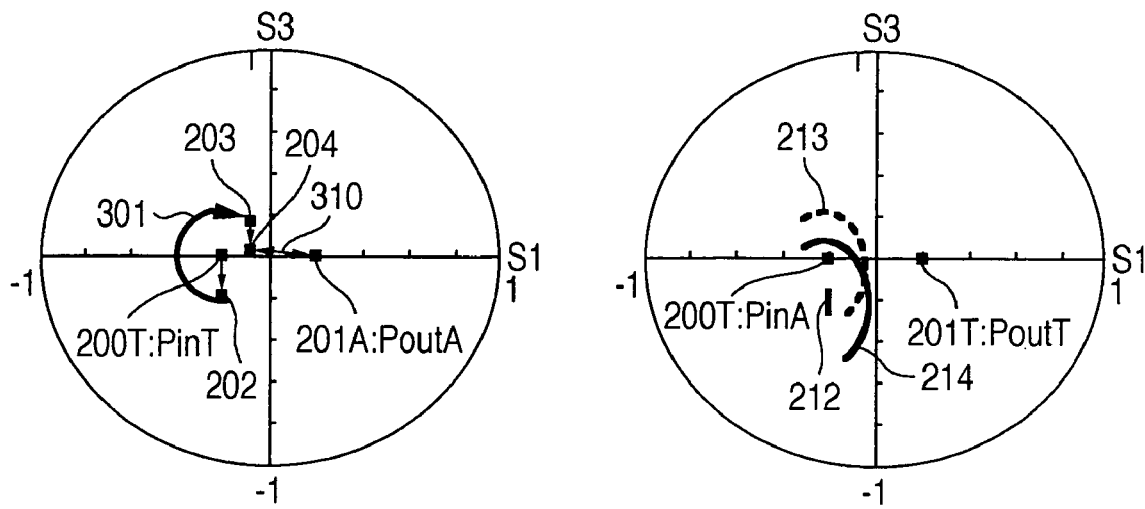
FIG. 11 is a view showing the Poincare sphere to be used for describing the LCD apparatus of the present invention.

Consider a ray of light with a wavelength of 550 nm in the left figure of FIG. 11. Concretely, in the right hand of FIG. 11, since the visible light area ranges 380 nm to 780 nm, the ray of light with a wavelength of 400 nm to 700 nm, which is substantially equivalent, is considered about the configuration of FIG. 4. Like the case of FIG. 10, consider the ray of light as viewed at an azimuth angle $\Phi = 45°$ and a viewing angle $\theta = 60°$. the polarization state of the light transmitted through the transmission axis 12CT of the polarization layer 12C is 200T. The retardation Rh1 of the supporting material 12B causes the S1 axis to be rotated by the retardation $R1 \cdot h1$ clockwise as viewed from $-1$ side, thereby converting the polarization state into the left-handed elliptical polarization that is the polarization state 212. The lengths of the straight lines of the polarization state 212 are variable depending on the wavelengths. Hence, the converted polarization state depends on the wavelength of the light. Further, the liquid crystal layer 15 causes the polarization state to be rotated by the retardation $\Delta nLC \cdot dLC$ of the liquid crystal layer clockwise with the point 200T as a center, thereby converting the polarization state into the elliptical polarization that is the polarization state 213 whose spread depends on the wavelength. It is understood from FIG. 11 that the left-handed elliptical polarization is brought about by the light of the short wavelength and the right-handed elliptical polarization is brought about by the light of the long wavelength. Further, the retardation $R2 \cdot h2$ of the supporting material 11B of the exit side polarizer 11 causes the S1 axis to be rotated by the retardation $R2 \cdot h2$ clockwise as viewed from $-1$ side, thereby converting the polarization state into the elliptical polarization that is the polarization state 214. Herein, the polarization state that is matched to the absorption axis 11CA of the exit side polarization layer 11C corresponds to the polarization state 201A. The light is leaked by the distance between the polarization states 214 and 201A and the light leakage quantity depends on the wavelength. Hence, it is understood that the color shift takes place when viewed from the oblique direction.

Further, based on this idea, it is understood that what makes the greatest contribution to the color shift is the change of the polarization state caused by the liquid crystal layer. That is, the problem of the present invention is to reduce the light leakage in the oblique direction through the effect of the retardation films as reducing the adverse effect of the liquid crystal layer when viewed from the oblique direction in the black state. The present invention is made for solving this problem.

At first, the present invention is described. The configuration of the LCD apparatus of the invention is illustrated in FIG. 1. The absorption axes, located between the first substrate 16 provided with the first polarizer 12 on the incident side and the second substrate 14 provided with the other second polarizer 11, are substantially perpendicular to each other (a smaller angle is 88° to 90°). The liquid crystal layer 15 is located between the two substrates 14 and 16 so that the liquid crystal molecules of the liquid crystal layer 15 are aligned in parallel to the substrates 14 and 16 and in one direction, thereby making the black state possible. The supporting materials 11b and 12B located on the liquid crystal layer side of the polarizers 11 and 12 are substantially isotropic. Further, on the closer side to the liquid crystal layer 15 of any one of the first substrate 16 and the second substrate 14 provided a matrix-driven electrode group having a pair of electrodes opposed to the pixels respectively. A lighting device 50 is located on the rear side. In the left hand of FIG. 1 is shown the location of the alignment axis of the liquid crystal layer 15 in parallel to the absorption axis of the incident side polarizer 12 and perpendicularly to the transmission axis, which is called an o-mode. In this case, as shown in the left hand of FIG. 1, a plurality of retardation films are laid between the liquid crystal layer 15 and the second polarizer 11. In the right hand of FIG. 1, the alignment axis of the liquid crystal layer 15 is located perpendicularly to the absorption axis of the incident side polarizer 12 and in parallel to the transmission axis, which is called an e-mode. In this case, as shown in the right hand of FIG. 1, a plurality of retardation films are laid between the first polarizer 12 and the liquid crystal layer 15.

The configuration shown in the left hand of FIG. 1 includes the supporting materials 11a and 12A of the polarizers. However, those materials may be disregarded when considering the polarization state. Hence, consider the optical configuration in which those supporting materials 11A and 12A are left out and the axial directions of the polarizers 11, 12 and the liquid crystal layer 15 are explicit. This optical configuration is as shown in FIG. 4. Since the supporting materials 11B and 12B of the polarizers are substantially isotropic, this configuration may be considered. Then, consider the method of reducing the oblique light leakage through the retardation films 13 in the optical configuration shown in FIG. 4.

Figure 12:
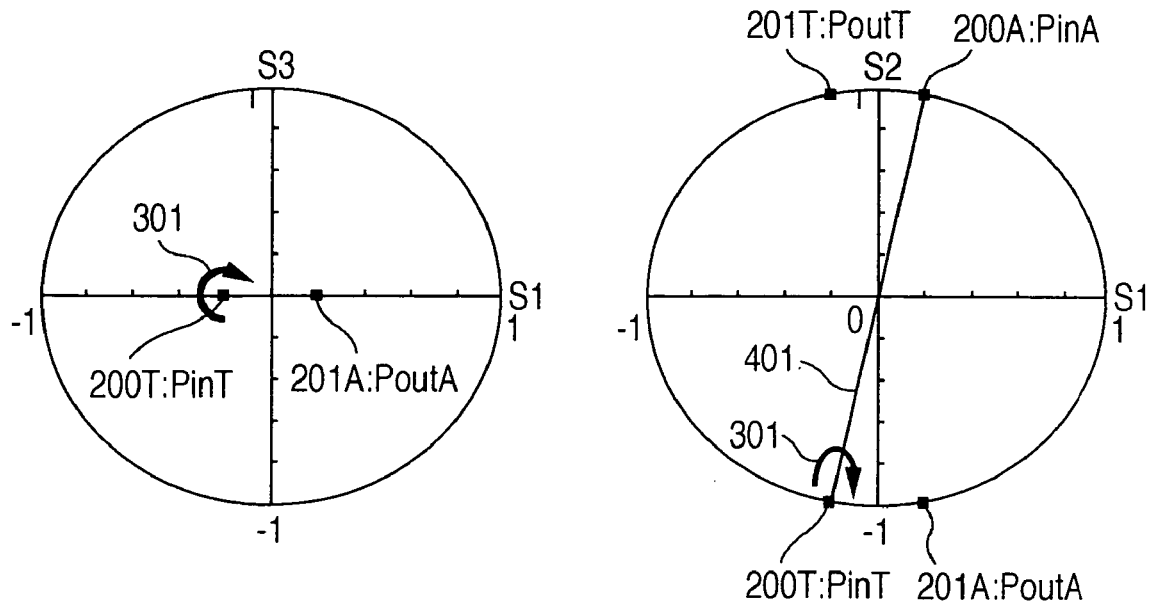
FIG. 12 is a view showing the Poincare sphere to be used for describing the LCD apparatus of the present invention.
Figure 13:
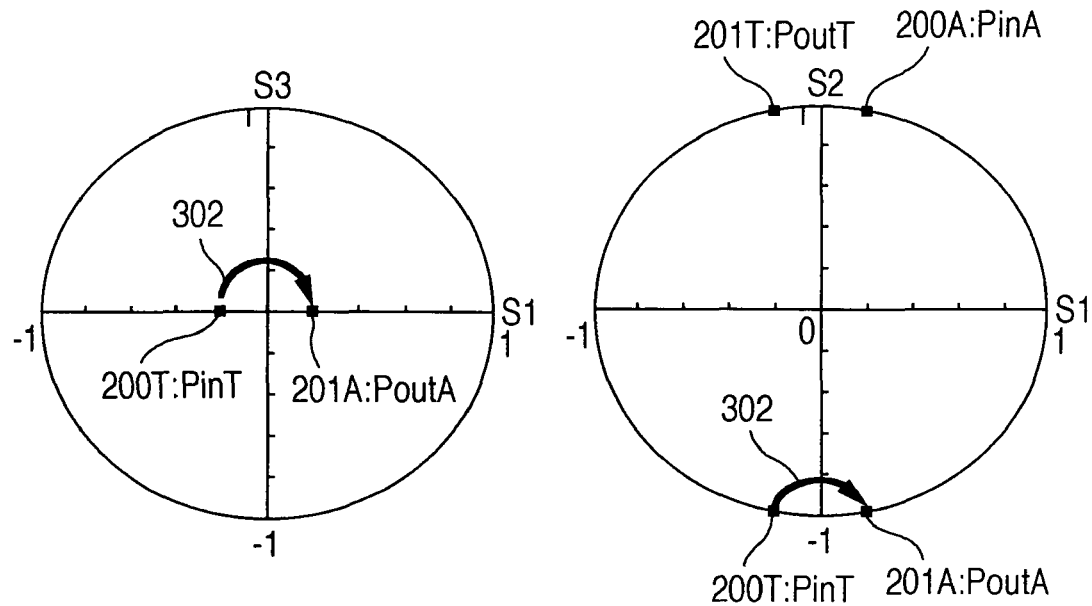
FIG. 13 is a view showing the Poincare sphere to be used for describing the LCD apparatus of the present invention.

FIGS. 12 and 13 show the changes of the polarization state through the use of the Poincare sphere. The polarization state of the light obliquely incident to the first polarizer 12 is represented by 200T as stated above. In the configuration of FIG. 4, the supporting material 12B of the polarizer is substantially isotropic. Hence, the incident light is entered into the liquid crystal layer 15 as keeping the polarization state 200T. Herein, assuming that the planar slow axis of the liquid crystal molecules sealed in the liquid crystal layer 15 are located in parallel to the x axis, the refractive indexes in the x axis and the y axis are nx and ny, the refraction in the thickness direction is nz, and the planar retardation is Δn·dr, the following expression (4) is established.

$$nx > ny \approx nz$$

$$\Delta n \cdot dr = (nx - ny) \cdot dr \quad (4)$$

As described above, the medium in which the anisotropic is given only on the plane and the refractive index in the thickness direction is substantially equal to the smaller planar refractive index is called an a-plate. Afterwards, the retardation of the positive a-plate means the planar retardation. The change of the polarization state in the case that the linearly polarized light is incident to the positive a-plate is represented by a principal axis having a larger refractive index (y-axis in this case), that is, the rotation conversion with the slow axis as its axis. In the concerned optical configuration shown in FIG. 4, the absorption axis of the first polarizer 12 is matched to the slow axis 15S of the liquid crystal layer 15. Hence, the rotation conversion on the Poincare sphere may be considered as shown in FIG. 12. That is, the rotation conversion 301 is executed with respect to the polarization state 200T of the light transmitted through the first polarizer 12. This conversion 301 uses the slow axis 401 of the liquid crystal layer 15 as its axis. Hence, if the absorption axis 12CA of the first polarizer is highly accurately matched to the slow axis 15S of the liquid crystal layer 15, no change takes place in the polarization state occurring before and after the light is transmitted through the liquid crystal layer 15.

In turn, consider the change of the polarization state occurring before and after the light is transmitted through a plurality of retardation films 13. As shown in FIG. 13, it is understood that what is necessary to that change is only the conversion of the polarization state 200T of the light transmitted through the liquid crystal layer 15 into the linearly polarization state 201A in the absorption axis direction 11CA of the second polarizer.

That is, in a case that the supporting materials of the polarizers are substantially isotropic and are the o-mode, as shown in FIG. 4, a layer having a anisotropic is not located between the first polarizer 12 and the liquid crystal layer 15, and a plurality of retardation films 13 are located between the second polarizer 11 and the liquid crystal layer 15. This location causes the adverse effect of the liquid crystal layer onto the oblique incident light to be eliminated, thereby being able to reduce the light leakage. No adverse effect of the liquid crystal layer allows the color shift and the light leakage against the oblique incident light to be reduced as stated above.

Figure 14:
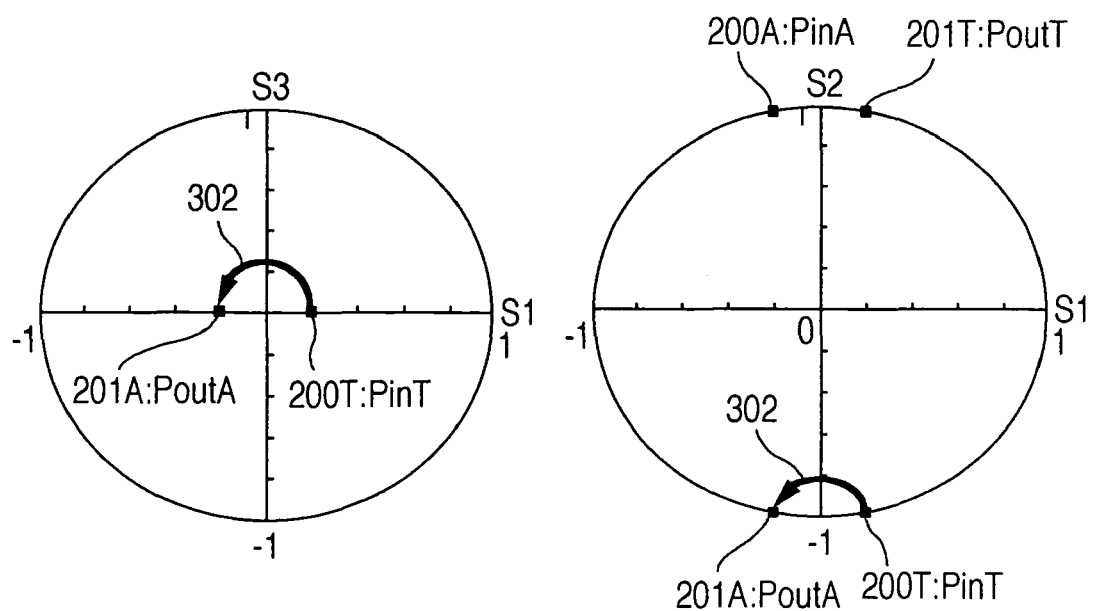
FIG. 14 is a view showing the Poincare sphere to be used for describing the LCD apparatus of the present invention.
Figure 15:
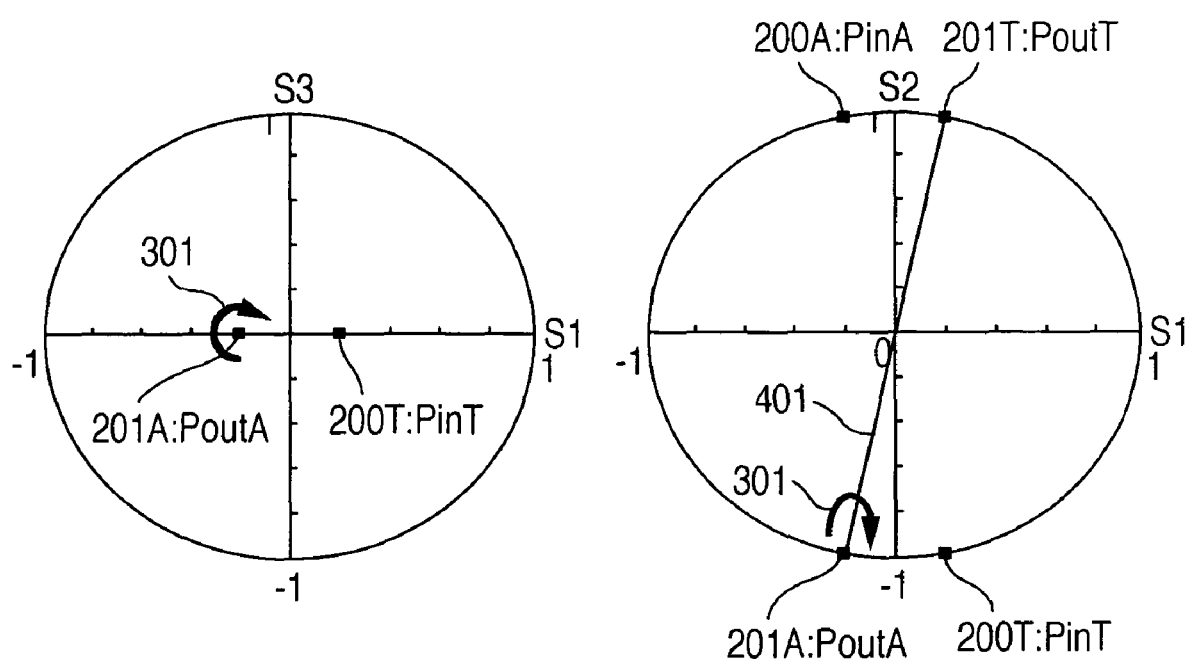
FIG. 15 is a view showing the Poincare sphere to be used for describing the LCD apparatus of the present invention.

In turn, consider the e-mode shown in the right hand of FIG. 1. FIG. 6 shows the optical configuration in which the supporting materials 11A and 12A of the polarizers are left out and the axial directions of the liquid crystal layer 15 and the polarizers 11 and 12 are explicit. The change of the polarization state in this case is represented on the Poincare sphere in FIGS. 14 and 15. FIG. 14 shows the change of the polarization state occurring before and after the light is transmitted through the plurality of retardation films 13. For the e-mode, before the light enters into the liquid crystal layer 15, the polarization state 200T occurring after the light is transmitted through the first polarizer 12 is converted into the linearly polarization state 201A of the absorption axis 11CA of the second polarizer. This conversion allows the direction of the slow axis 15S of the liquid crystal layer to be matched to the polarizing direction of the light incident to the liquid crystal layer 15. In this case, as stated above, the change of the polarization state occurring before and after the light is transmitted through the liquid crystal layer 15 is as shown in FIG. 15. It means that the adverse effect of the liquid crystal layer 15 may be eliminated.

In a case that the supporting materials of the polarizers are isotropic and the e-mode, by not locating the layer having the anisotropic between the second polarizer 11 and the liquid crystal layer 15 and the plurality of retardation films 13 between the first polarizer 12 and the liquid crystal layer 15 as shown in FIG. 4, it is possible to eliminate the adverse effect of the liquid crystal layer onto the oblique incident light, thereby being able to reduce the light leakage.

For eliminating the adverse effect of the liquid crystal layer caused when a ray of light enters into the liquid crystal layer from the oblique direction, the proper conversion of the polarization state is executed before the ray of light enters into the liquid crystal layer without location of the birefringent medium between the first polarizer and the liquid crystal layer in the case of the o-mode or without location of the birefringent medium between the second polarizer and the liquid crystal layer in the case of the e-mode.

For changing the polarization state executed through the plurality of retardation films 13 as shown in FIGS. 13 to 14, it is only necessary to make the direction reverse. Hence, for the cases of the o-mode and the e-mode, by taking the proper layered structure as shown in FIG. 1 and properly locating each of the retardation films 13, if those retardation films have the same specifications (type, configuration and retardation) as each other, the viewing angle characteristic is are substantially equal in the black state for the cases of the o-mode and the e-mode.

Following this idea, the supporting material of the polarizer is not necessarily isotropic in a refractive index. As shown in the left hand of FIG. 2, for the case of the o-mode, the supporting material 11D located on the side of the liquid crystal layer 15 of the second polarizer 11 may be a birefringent medium. In this case, if the conversion of the polarization state shown in FIG. 13 is made possible, the combination of the retardation films 13 and the birefringent supporting material 11D of the polarizer makes it possible to reduce the material cost as a result of reducing the number of the retardation films though it has the same black state characteristics as the configuration shown in FIG. 1. For the case of the e-mode, as shown in the right hand of FIG. 2, the supporting material 12D located on the side of the liquid crystal layer 15 of the first polarizer 12 may be a birefringent medium. In this case, if the conversion of the polarization state as shown in FIG. 14 is made possible, the combination of the retardation films 13 with the birefringent supporting material 12D of the polarizer makes it possible to reduce the material cost as a result of reducing the number of the retardation films though it has the same black state characteristic as the configuration shown in FIG. 1. For the case of the o-mode in the left hand of FIG. 2, the supporting materials 12A and 11A located on the outsides of the first polarizer 12 and the second polarizer 11 do not have any adverse effect onto the viewing angle characteristic in the black state even if the supporting materials 12A and 11A are the isotropic medium or the birefringent medium. When taking the configuration shown in the left hand of FIG. 2, if some advantages such as improved productivity may be obtained when the supporting material 11A is formed of the birefringent medium, this medium may be used for the material 11A. This holds true to the case of the e-mode shown in the right hand of FIG. 2.

As another idea, it is possible to consider the method in which the change of the polarization state caused by the supporting material of the polarizer is cancelled by the retardation films. As will be discussed below, for the o-mode, if the supporting material of the first polarizer is equivalent to the negative c-plate, the location of the positive c-plate between the first polarizer and the liquid crystal layer allows the change to be cancelled. For the e-mode, it is just necessary to locate the retardation films for canceling the adverse effect of the supporting material of the second polarizer between the second polarizer and the liquid crystal layer. This location is substantially equivalent to no location of the birefringent medium. Expanding the idea, what is just necessary to the o-mode is no change of the polarization state caused by the birefringence between the first polarizer and the liquid crystal layer, and what is just necessary to the e-mode is no change of the polarization state caused by the birefringence between the second polarizer and the liquid crystal layer.

As described above, the inventors have found the method of reducing both of the luminance change and the color shift in the oblique view field by eliminating the adverse effect of the liquid crystal layer onto the change of the polarization state in the oblique view field. Further, the inventors have found the fact that the view field characteristic is made equal in both the o-mode and the e-mode by keeping the specifications of the retardation films in both modes equal to each other except the locations of both modes. According to our study, however, it was found that the e-mode configuration is superior in reliability based on the following grounds. For the o-mode configuration shown in the left hand of FIG. 1, the optical phase configuration films 13 come into contact with the second polarizer 11 of the LCD apparatus. Hence, it is considered that when the user touches the display surface of the LCD apparatus, force is applied to the retardation films 13 through the second polarizer 11. Today, the retardation films are often formed of a material whose refractive index is changed by the force. Formation of the retardation films 13 in the left hand of FIG. 1 with such a material results in changing the refractive index of those films in the foregoing condition, thereby causing the display unevenness on the plane to be more likely to take place.

On the other hand, for the e-mode in the right hand of FIG. 1, this sort of shortcoming is unlikely to take place. Even if the user applies force onto the display surface, the location of the films 13 on the rear sides of the two substrates 14 and 16 serves to prevent transmission of the force.

The aforementioned method is executed to eliminate the adverse effect of the liquid crystal layer in the oblique field of view and thereby improve the viewing angle characteristic in the black state. As another idea, for example, it is effective to use the method in which in the LCD apparatus provided with three primary color filters, the thickness of the liquid crystal layer is properly adjusted for each display area of red, green and blue so that the similar change of the polarization state may be brought about by the liquid crystal layer for each color light. This method makes it possible to improve the viewing angle characteristic in the black state and the white state.

Embodiment

Hereafter, the contents of the invention of the present application will be described in more detail along the following examples. Th embodiment describes the concrete examples of the present invention but does not define the invention. The embodiment may include the numerical values calculated by the optical simulation through the use of the 44 matrix disclosed in Japan Society of Applied Physics, Optic Conference, "Crystal Chemical" Chapter 5, Pages 102 to 163, issued in the fourth print of the first edition in 1984 and published by Morikita Publishing Ltd. Herein, for the simulation are used the spectral characteristic between three-wavelength cold cathodes and spectral transmission characteristics of the R, G and B color filters. For the polarization layer of the polarizer is used the spectral characteristic of 1224 DU manufactured by Nitto Denko, Ltd. For the wavelength dispersion of the retardation films, polycarbonate (PC), polystyrene, norbornane system materials are used. Of course, they are exemplary.

Further, the terms "perpendicular", "vertical" and "90 degrees" do not mean the complete vertical. If they may be understood as the substantial vertical or an angle of 88° to 90°, no difference is given to the essence of the description. This holds true to the term "parallel".

Further, for describing the general current configuration in the examples, the description is expanded on the assumption that one retardation film has one birefringent function. The birefringence of each retardation film that will be described in the following examples may be realized by the combination of two or more retardation films. Moreover, the retardation films and the polarization layer may be formed by coating a material on the substrate and performing the aligning process. In this case, however, the configurations that will be described in the following embodiments may be changed. Concretely, it is considered the case that the polarization layer is located on the side of the liquid crystal layer of the substrate. In this location, all the components formed on the substrate with the polarization layer formed thereon or between the substrate and the polarization layer are served as the supporting material of the polarizer located on the opposite side to the liquid crystal layer that will be described in the following examples. The supporting material of the polarizer located on the side of the liquid crystal layer that will be described in the following embodiments does not exist, or the components formed between the polarization layer and the retardation films formed by the coating are served as the supporting material. The present invention is focused on the optical configuration. The realized optical configuration of the present invention may achieve the effect of the invention without depending on the physical configuration. Hence, in the embodiments, the optical configuration is properly illustrated.

As the liquid crystal cell, the electrode structure, the substrate, the polarization layer of the polarizer, and the lighting device, the conventional components used as the IPS may be applied to the present invention without any change. The present invention concerns the configuration of the LCD apparatus, the supporting material of the polarizer, and the added retardation films.

Further, a smaller angle (pre-tilt angle) of the major axes of the liquid crystal molecules to the substrate when applying no voltage to the liquid crystal layer (in the black state) is specified as 0° in the simulation described in this embodiment. However, in the range of ±3°, no large difference takes place in the trend indicated in this embodiment. In actual, for the pre-tilt angle 0°, the most excellent characteristic is indicated.

The terms and the phases used herein are defined as follows.

The phase of "having a birefringence" or its analogies mean that the retardation on the plane (x, y) and in the thickness (z) direction is more than about 10 nm but equal to and less than about 550 nm.

The phase of "having substantial isotropy" or its analogies mean that the retardation on the plane (x, y) and in the thickness (z) direction is more than 0 but equal to and less than about 10 nm.

The term of "e-mode" means that the absorption axis 12CA of the first polarizer 12 is substantially perpendicular to the direction of the alignment axes 15S of the liquid crystal molecules when no voltage is applied. (A smaller angle is in the range of 88° to 90°.)

The term of "o-mode" means that the absorption axis 12CA of the first polarizer 12 is substantially horizontal to the direction of the alignment axes 15S of the liquid crystal molecules. (A smaller angle is in the range of 0° to 2°.)

The term of "positive a-plate" means the medium having the anisotropic on the plane and in which the refractive index in the thickness direction is substantially equal to the smaller refractive index on the plane. Assuming that the planar refractive index on the slow axis is nx, the planar refractive index in the fast axis is ny, the refractive index in the thickness direction is nz, and the thickness is dr, the medium corresponds to the retardation films in which the relation of nx>ny≈nz is established, the planar retardation is Δn·dr=(nx−ny)·dr, and an Nz coefficient is 0.8 to 1.2.

The term of "positive c-plate" means that the medium having the isotropic on the plane and a larger refractive index in the thickness direction. Assuming that the planar refractive index on the slow axis is ny, the refractive index in the thickness direction is nz, and the thickness is h, the medium corresponds to the retardation films in which the relation of nz>nx≈ny is established, the retardation is R*h=(nz−(nx+ny)/2)*h, and the Nz coefficient is −5 or less.

The term of "negative a-plate" means the medium having the anisotropic on the plane and in which the refractive index in the thickness direction is substantially equal to a larger planar refractive index. Assuming that the planar refractive index on the slow axis is nx, the planar refractive index on the fast axis is ny, the refractive index in the thickness direction is nz, and the thickness is dr, the medium corresponds to the retardation films in which the relation of nx≈nz>ny is established, the planar retardation is Δn·dr=(ny−nx)·dr, and the Nz coefficient is −0.2 to 0.2.

The term of "negative c-plate" means the medium having the isotropic on the plane and in which the refractive index in the thickness direction is smaller. Assuming that the planar refractive index on the slow axis is nx, the planar refractive index on the fast axis is ny, the refractive index in the thickness direction is nz, and the thickness is h, the medium corresponds to the retardation films in which the relation of nz≦nx≈ny is established, the retardation is R·h=((nx+ny)/2−nz)·h, and the Nz coefficient is 5 or more.

EXAMPLE 1

Figure 16:
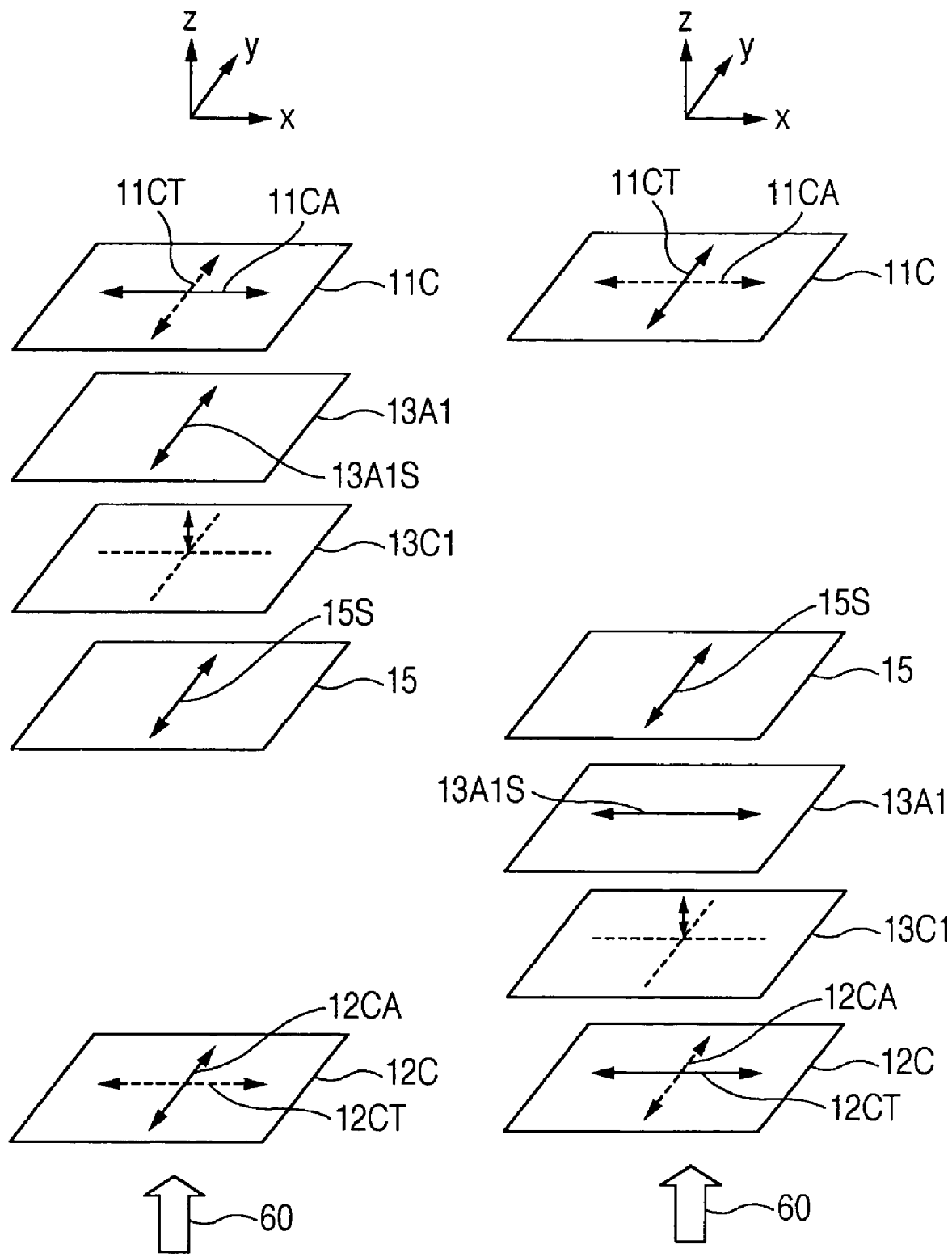
FIG. 16 is a view showing an LCD apparatus according to one embodiment of the present invention.

The structure of the example 1 is shown in FIG. 1 and the optical configuration thereof is shown in FIG. 16, in which the left-hand portion concerns with the o-mode and the right-hand portion concerns with the e-mode. In the example 1, one positive c-plate and one positive a-plate are used as the retardation films. Herein, the film in which the refractive index on the plane is isotropic and the refractive index in the thickness direction is larger is called the positive c-plate. According to the expression (3), the retardation R·h may be represented as $$nz > nx \approx ny$$

$$R \cdot h = (nz - (nx+ny)/2) \cdot h \quad (5)$$

Figure 17:
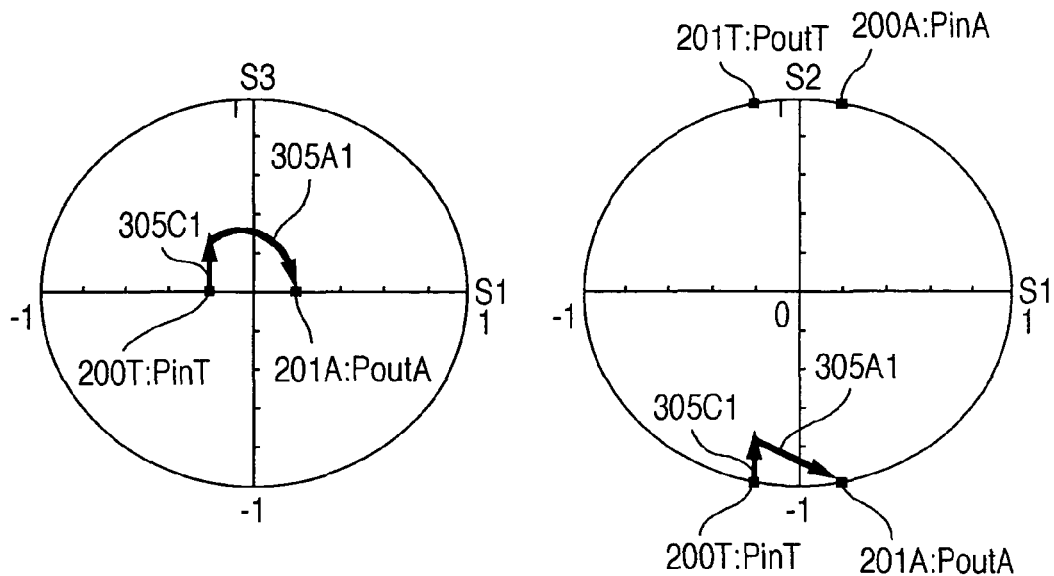
FIG. 17 is a view showing the Poincare sphere to be used for describing the LCD apparatus of the present invention.

Afterwards, the retardation of the positive c-plate indicates this retardation in the thickness direction. In FIG. 16, 13C1 denotes the positive c-plate and 13A1 denotes the positive a-plate. 13A1S denotes the slow axis direction of the positive a-plate. According to the inventors' study, as shown in FIG. 16, for the o-mode, it is necessary to locate the slow axis 13A1S of the positive a-plate in substantially parallel to the slow axis 15S of the liquid crystal layer, while for the e-mode, it is necessary to locate the slow axis 13A1S substantially perpendicularly to the slow axis 15S of the liquid crystal layer. This configuration makes it possible to perform the conversion of the polarization state shown in FIGS. 13 and 14. The representation of the change of the polarization state on the Poincare sphere is shown in FIG. 17, in which 305C1 indicates the change of the polarization state caused by the positive c-plate and 305A1 indicates the change of the polarization state caused by the positive a-plate.

Since the viewing angle characteristic in the black state is greatly varied by the retardations of the positive a-plate 13A and the positive c-plate 13C1, it is necessary to determine the retardation through the use of the optical simulation. Herein, the indicator for estimating the retardations is required to be obtained by the simulation. The object of the invention is to reduce the luminance change and the color shift occurring when the viewing angle is changed in the black state. Hence, it is necessary to introduce the indicators for both of the changes.

Figure 18:
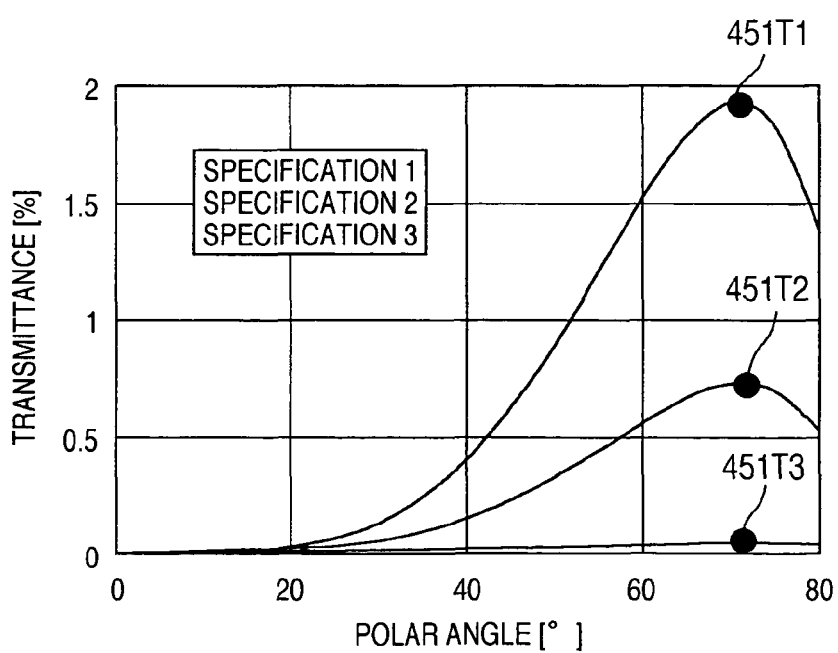
FIG. 18 is a concept view for describing an optical simulation method used in the present invention.

As an indicator for the luminance change is introduced the maximum transmittance occurring when the viewing angle is changed. This will be described with reference to FIG. 18. FIG. 18 shows the estimated characteristic of the transmittance to the viewing angle in the black state in the three kinds of LCD apparatuses each of which includes its own retardation films with respective specifications, in which the azimuth angle is fixed and only the pole angle is changed. As shown in FIG. 18, the specification 3 indicates the most excellent characteristic of the luminance change. Even if the maximum transmittances of their specifications are compared with each other, the similar result can be obtained. 451T1, 451T2, and 451T2 indicate the maximum transmittances of the specifications, respectively. As described above, if the maximum transmittance is small, the luminance change caused by the change of the viewing angle is small accordingly.

Figure 19:
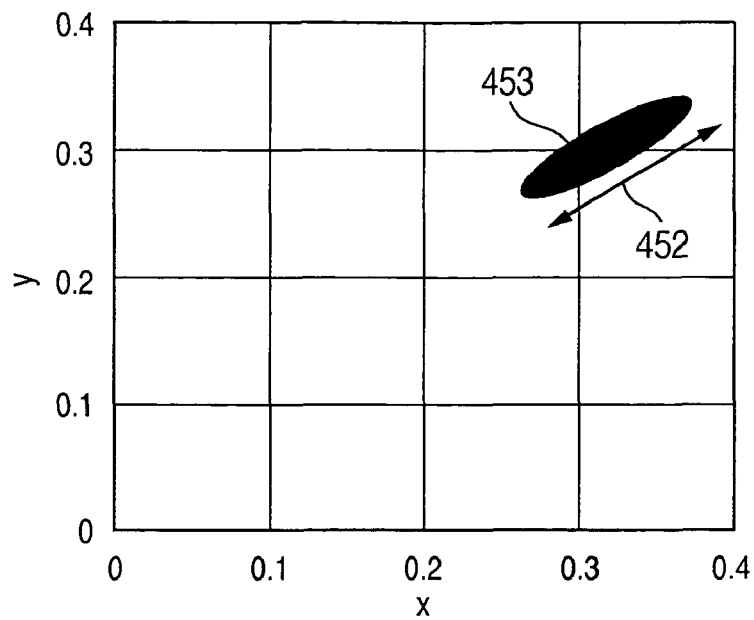
FIG. 19 is a concept view for describing an optical simulation method used in the present invention.

As an indicator for the color shift, Δxy is introduced. FIG. 19 is an explanatory graph thereof, in which in a certain specification of the retardation film, the color in the black state is plotted on the CIE1931xy chromaticity coordinates and all the chromaticity coordinates are platted as viewed from all the azimuth angles and all the polar angles. As a result, the elliptical area shown in FIG. 18 can be obtained. The reduction of the color shift caused by the change of the viewing angle corresponds to the reduction of the elliptical area in FIG. 19. Hence, the length of the major axis of this ellipse is specified as the indicator. This is Δxy.

Figure 20:
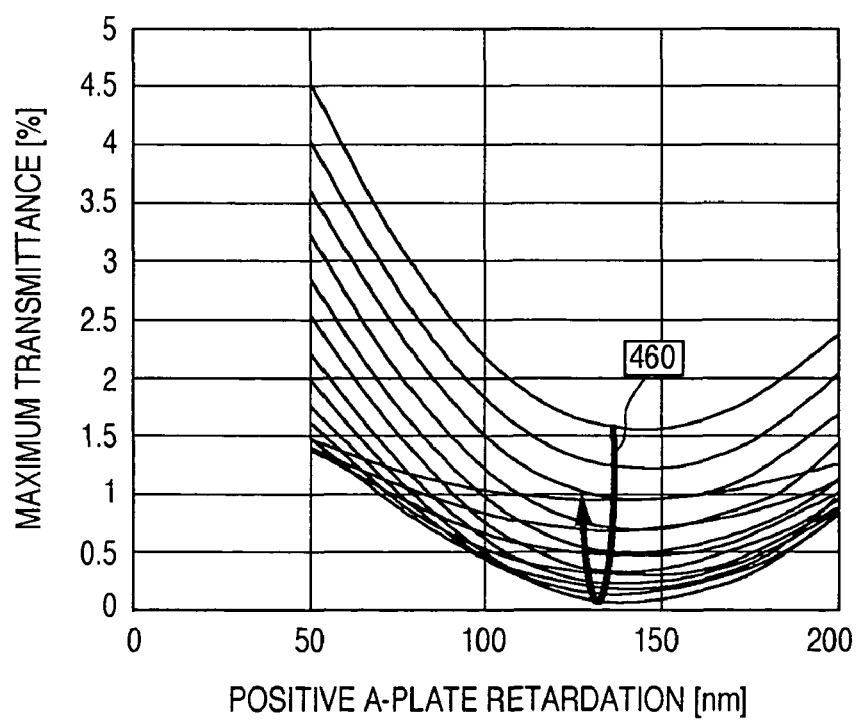
FIG. 20 is a graph showing characteristics of the LCD apparatus according to one embodiment of the present invention.
Figure 21:
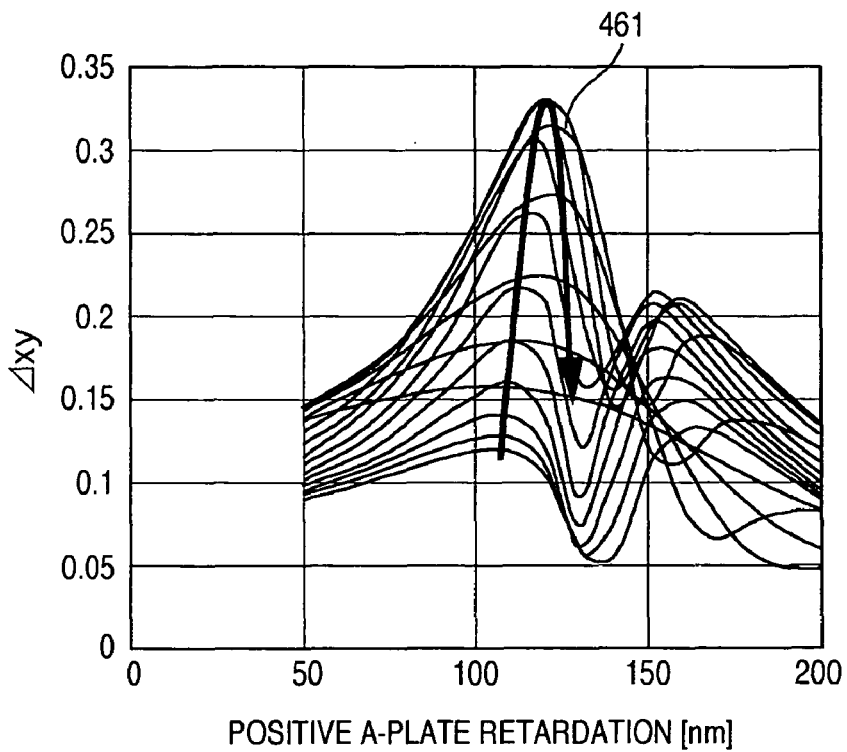
FIG. 21 is a graph showing characteristics of the LCD apparatus according to one embodiment of the present invention.
Figure 22:
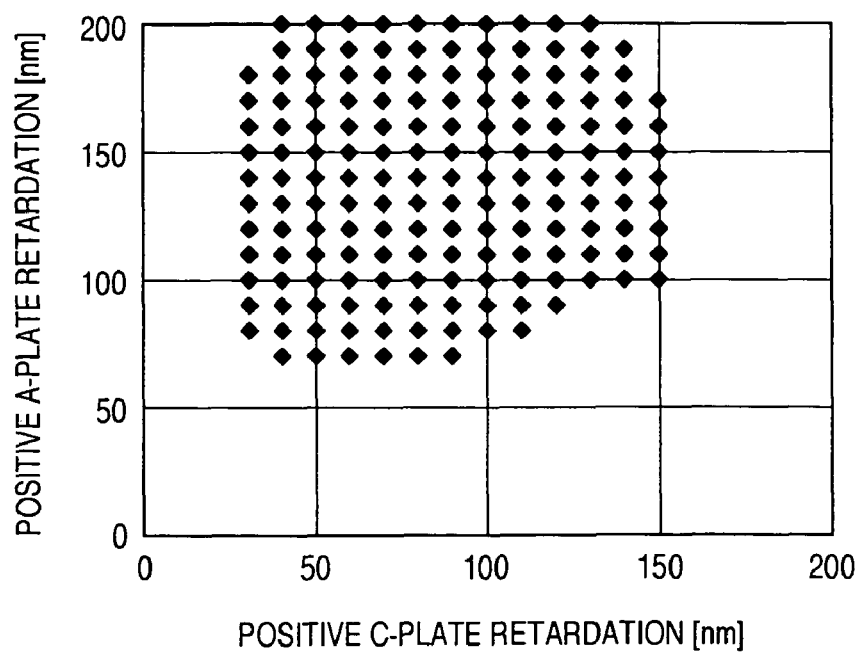
FIG. 22 is a graph showing characteristics of the LCD apparatus according to one embodiment of the present invention.
Figure 23:
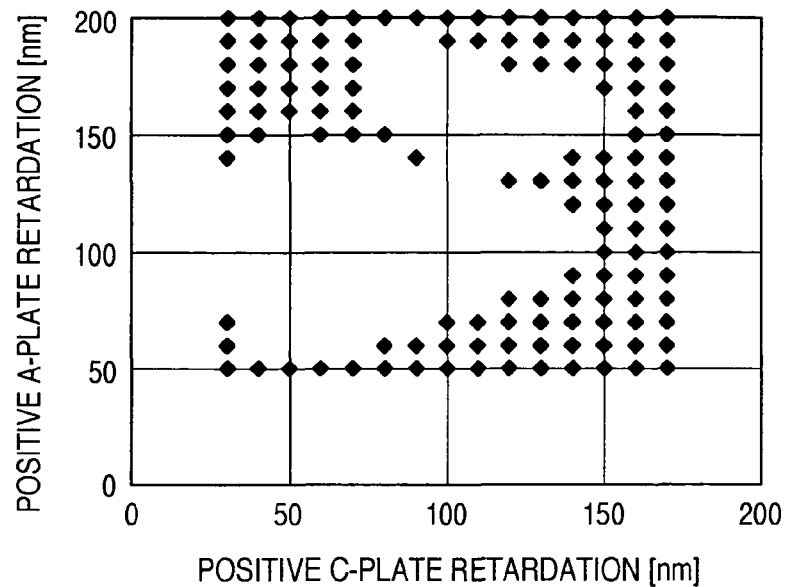
FIG. 23 is a graph showing characteristics of the LCD apparatus according to one embodiment of the present invention.

The change of the maximum transmittance occurring when the retardation of the positive c-plate is changed from 50 nm to 170 nm and the retardation of the positive a-plate is changed from 50 nm to 200 nm independently of the former change is shown in FIG. 20. The change of Δxy is shown in FIG. 21. In FIG. 20, 460 denotes the change occurring when the retardation of the positive c-plate is changed smaller from 170 nm to 30 nm. In FIG. 20, the maximum transmittance is changed in the downwardly convex manner against the change of the retardation of the positive a-plate. When the retardation of the positive a-plate is 140 nm or some, the luminance change becomes minimum. Concretely, when the retardation of the positive c-plate is 80 nm and the retardation of the positive a-plate is 140 nm, the luminance change becomes minimum. Then, the color shift is considered with reference to FIG. 21. In this figure, the value of $\Delta xy$ is changed in the upward convex direction against the change of the retardation of the positive a-plate. It is reverse to the change of the maximum transmittance. That is, the phase difference plate specification that makes the luminance change minimum makes it impossible to reduce the color shift into a minimum. This impossibility is shown in FIGS. 22 and 23. FIG. 22 shows the retardations of the positive a-plate and the positive a-plate in which the maximum transmittance is 1.2% or less. For example, in FIG. 22, in a case that the retardation of the positive c-plate is 80 nm and the retardation of the positive a-plate is 140 nm, the condition that the maximum transmittance is 1.2% or less is met, while in a case that the retardation of the positive c-plate is 160 nm and the retardation of the positive a-plate is 140 nm, the condition is not satisfied. Herein, the value of 1.2% is determined by the functional estimation. Likewise, the condition that $\Delta xy$ is 0.15 or less is shown in FIG. 23. In this figure, the color shift is made larger nearby the condition that the luminance change becomes small. Hence, the condition that the retardation of the positive c-plate is 80 nm and the retardation of the positive a-plate is 140 nm, that is, the condition that is specific to the luminance change does not meet the condition of the color shift.

Figure 24:
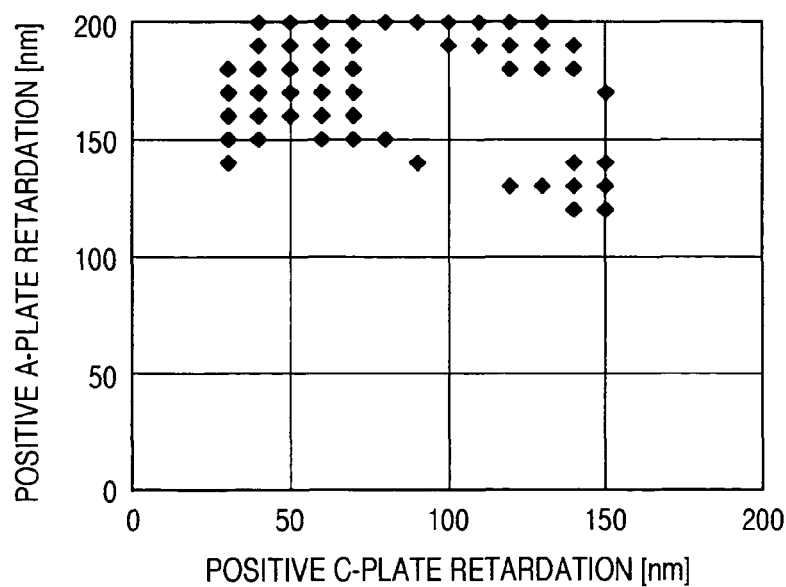
FIG. 24 is a graph showing characteristics of the LCD apparatus according to one embodiment of the present invention.

FIG. 24 shows the retardations of the positive c-plate and the positive a-plate which satisfy both of the conditions of the luminance change and the color shift. Apparently, these retardations are changed according to the specified allowable values of the luminance change and the color shift. In essence, even these retardations have difficulty in reducing both of the luminance change and the color shift. According to the inventor's study, the optimal specification to reducing both of the luminance change and the color shift in the black state is that the retardation of the positive c-plate is 60 nm and the retardation of the positive a-plate is 170 nm.

As described above, by selecting the configuration for the o-mode shown in the left hand of FIG. 16 and the configuration for the e-mode shown in the right hand of FIG. 16, the change of the viewing angle characteristic in the black state against the retardation of the positive c-plate is substantially same as that against the retardation of the positive a-plate.

In the configuration shown in FIG. 16, when the location of the positive a-plate 13A1 is replaced with the location of the positive c-plate 13C1 and the slow axis 13A1S of the positive a-plate 13A1 is varied by 90°, it was found that the similar change of the polarization state can be obtained and the same results as those indicated in FIGS. 22 to 24 can be obtained as well.

Herein, the terms of "positive c-plate" and "positive a-plate" originally mean the complete uniaxial anisotropic medium. It was also found that the use of the biaxial anisotropic medium does not greatly change the trend indicated in the example 1. In the example 1, it was assured that the replacement of the positive c-plate with the retardation film with the Nz coefficient (to be discussed below) of −5 or less and the replacement of the positive a-plate with the retardation film with the Nz coefficient of 0.8 to 1.2 do not greatly change the trend indicated in the example 1.

Assuming that in the example 1 the retardation film is formed of a norbornane system material and the dependency of the refractive index of the film on the wavelength is specified, the calculated result is derived. In place, the use of PC or polystyrene as the film results in obtaining the substantially same result.

EXAMPLE 2

Figure 25:
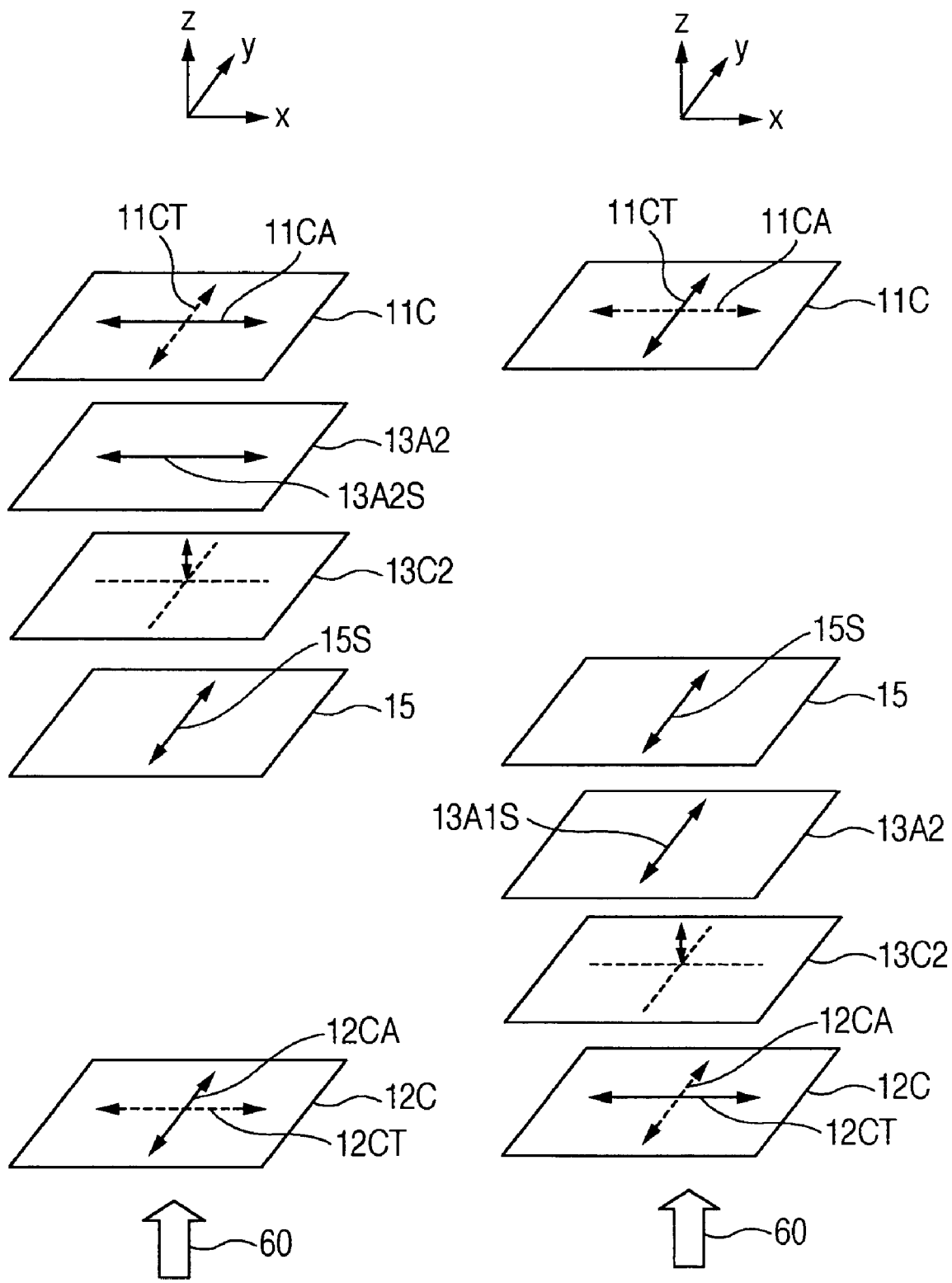
FIG. 25 is a view showing an LCD apparatus according to one embodiment of the present invention.

The structure of the example 2 is shown in FIG. 1 and the optical configuration thereof is shown in FIG. 25, in which the left-hand portion concerns with the o-mode and the right-hand portion concerns with the e-mode. In the example 2, one negative c-plate and one negative a-plate are used as the retardation films. Herein, the film in which the refractive index is isotropic on the plane and the refractive index in the thickness direction is small is called the negative c-plate. According to the expression (3), the retardation R·h may be represented as follows. Afterwards, the retardation of the negative c-plate indicates the retardation in the thickness direction.

$nz \leq nx \approx ny$ $$R \cdot h = ((nx+ny)/2 - nz) \cdot h \quad (6)$$

Further, the film in which the refractive index is anisotropic on the plane and the refractive index in the thickness direction is substantially equal to a larger one of the planar refractive index is called the negative a-plate. According to the expression (4), the retardation may be represented as follows. Afterwards, according to the expression (4), the retardation may be represented as follows. Afterwards, the retardation of the negative a-plate indicates the next planar retardation.

$ny \approx nz > nx$ $$\Delta n \cdot dr = (ny - nx) \cdot dr \quad (7)$$

The negative a-plate includes two major axes each of which has a larger refractive index. If the slow axis of the negative a-plate is termed in the following description, the direction with a larger planar refractive index is indicated (ny direction in the expression (7).

Herein, the function of these retardation films will be described. When a polarized ray of light is incident to the positive c-plate and the negative c-plate, considering the change of the polarization state on the Poincare sphere, if the retardation of the positive c-plate is equal to that of the negative c-plate, the polarization state of the positive c-plate is varied in the 180'-reverse direction to that of the negative c-plate. However, since both of the a-plates include the anisotropic on the plane, it is necessary to pay attention to the slow axis direction. For bringing about the changes of the polarization state in the reverse direction to each other, it is necessary to vary the slow axis of the positive a-plate by 90° with respect to the slow axis of the negative a-plate on the plane.

Figure 26:
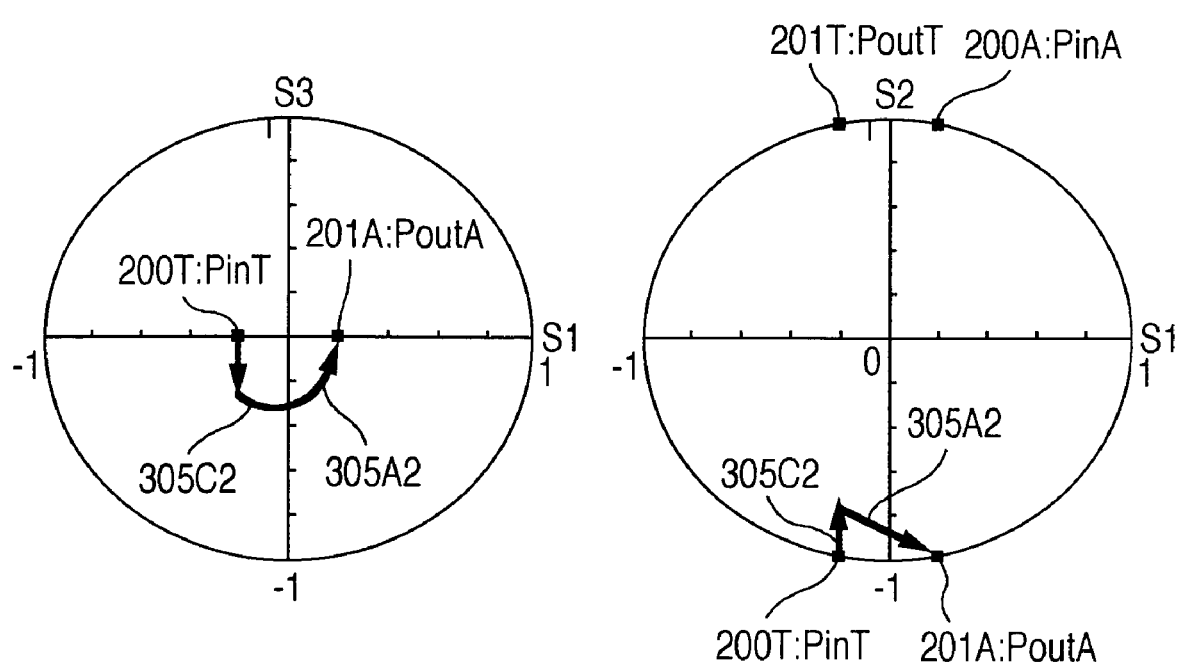
FIG. 26 is a view showing the Poincare sphere to be used for describing the LCD apparatus according to one embodiment of the present invention.

In FIG. 25, 13C2 denotes the negative c-plate and 13A2 denotes the negative a-plate. Further, 13A2C denotes the slow axis direction of the negative a-plate. As shown in FIG. 5, according to the inventor's study, it was found that for the o-mode, it is necessary to locate the slow axis 13A2S of the negative a-plate in substantially parallel to the slow axis 15S of the liquid crystal layer and for the e-mode, it is necessary to located the slow axis 13A2S of the negative a-plate substantially perpendicularly to the slow axis 15S of the liquid crystal layer. This configuration makes it possible to execute the conversion of the polarization state shown in FIGS. 13 and 14. The representation of the change of the polarization state in the black state on the Poincare sphere is shown in FIG. 26. Reference numeral 305C2 denotes the change of the polarization state caused by the negative c-plate. 305A2 denotes the change of the polarization state caused by the negative a-plate. As compared with FIG. 17, it is understood that the conversions of the polarization state of these films are executed in the completely reverse direction to each other. Hence, if the dependency of the refractive index on the wavelength in the negative c-plate is substantially same as that in the negative a-plate, this example holds true to the relation between the combination of the various retardations and the viewing angle characteristic in the black state as derived in the example 1.

In the configuration of FIG. 25, it was found that the replacement of the negative a-plate 13A2 with the negative c-plate 13C2 and the shift of the slow axis 13A2S of the negative a-plate 13A2 by 90° bring about the similar change of the polarization state and thus offer the same result as that shown in FIGS. 22 to 24.

Herein, the terms of "negative c-plate" and "negative a-plate" mean the originally complete uniaxial anisotropic medium. In actual, it was found that the use of the biaxial anisotropic medium does not greatly change the trend indicated in the example 2. In the example 2, it is assured that the replacement of the negative c-plate with the retardation films with the Nz coefficient (to be discussed below) of 5 or more and the replacement of the negative a-plate with the retardation films with the Nz coefficient of −0.2 to 0.2 do not greatly change the trend indicated in the example 2.

If the material of the retardation films is changed into the norbornane system, PC, polystyrene or the like, the way of use of those films are likewise to those indicated in the example 1. By selecting the configurations and the axial locations of the o-mode and the e-mode shown in FIG. 25, the viewing angle characteristic of the o-mode in the black state is the same as those of the e-mode in the black state. This also follows the description about the example 1.

EXAMPLE 3

Figure 27:
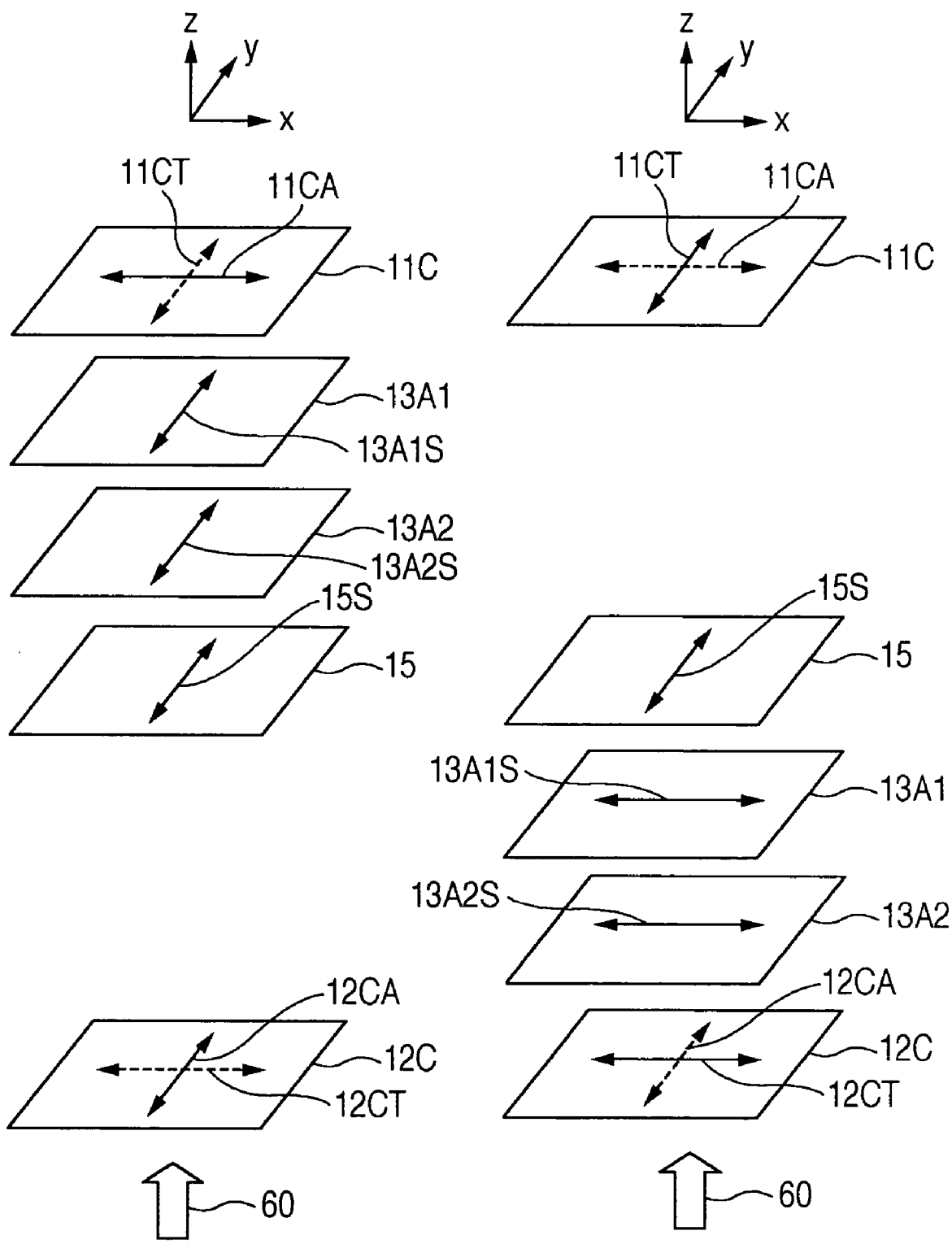
FIG. 27 is a view showing an LCD apparatus according to one embodiment of the present invention.
Figure 28:
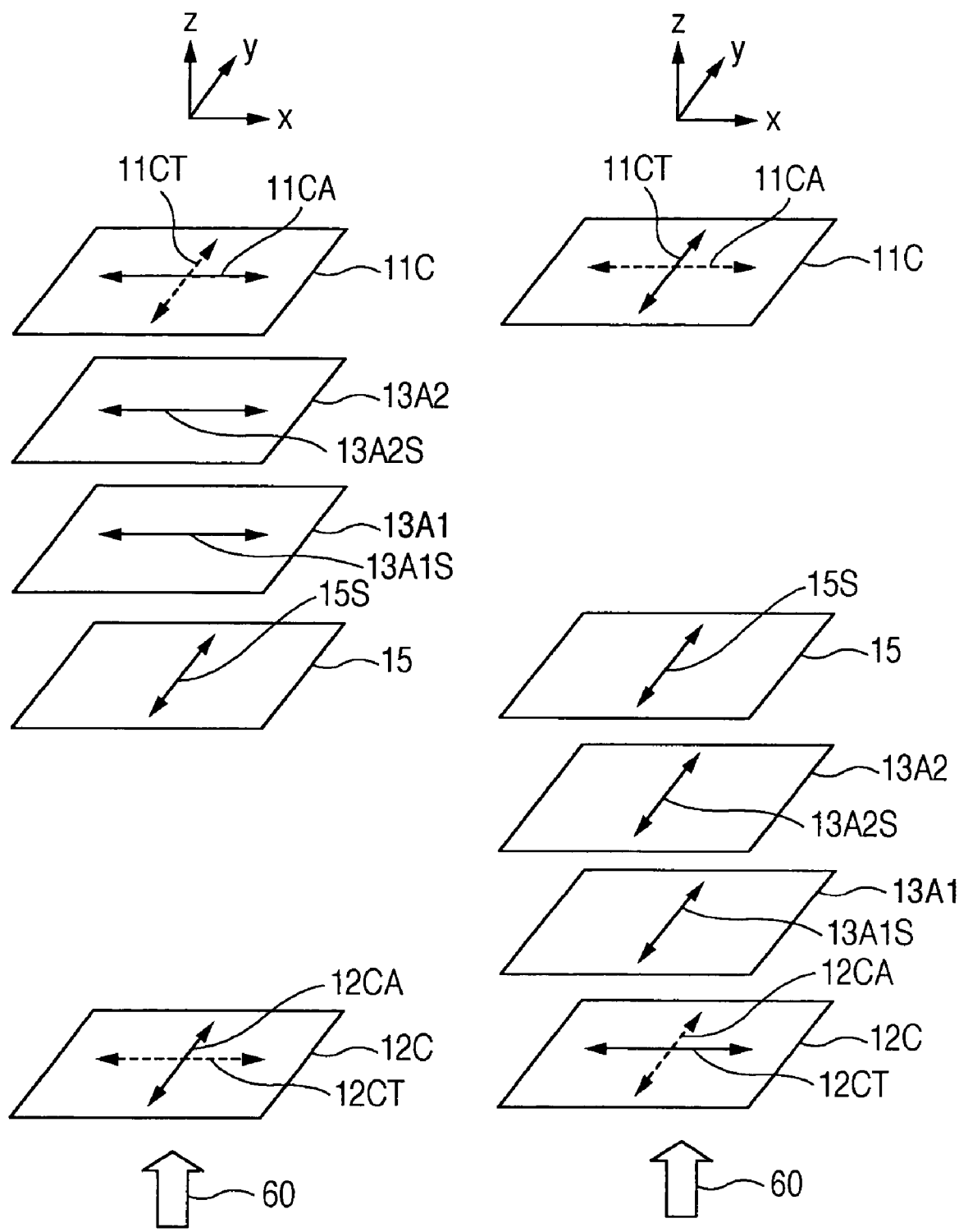
FIG. 28 is a view showing an LCD apparatus according to one embodiment of the present invention.

The structure of the example 3 is shown in FIG. 1 and the four optical configurations thereof are shown in FIGS. 27 and 28, in which the left-hand portion concerns with the o-mode and the right-hand portion concerns with the e-mode. In the example 3, one positive a-plate and one negative a-plate are used as the retardation films. For executing the conversion of the polarization state shown in FIGS. 13 and 14 through the use of the positive a-plate and the negative a-plate, according to the inventor's study, it was found that the four configurations shown in FIGS. 27 and 28 are made possible.

Figure 29:
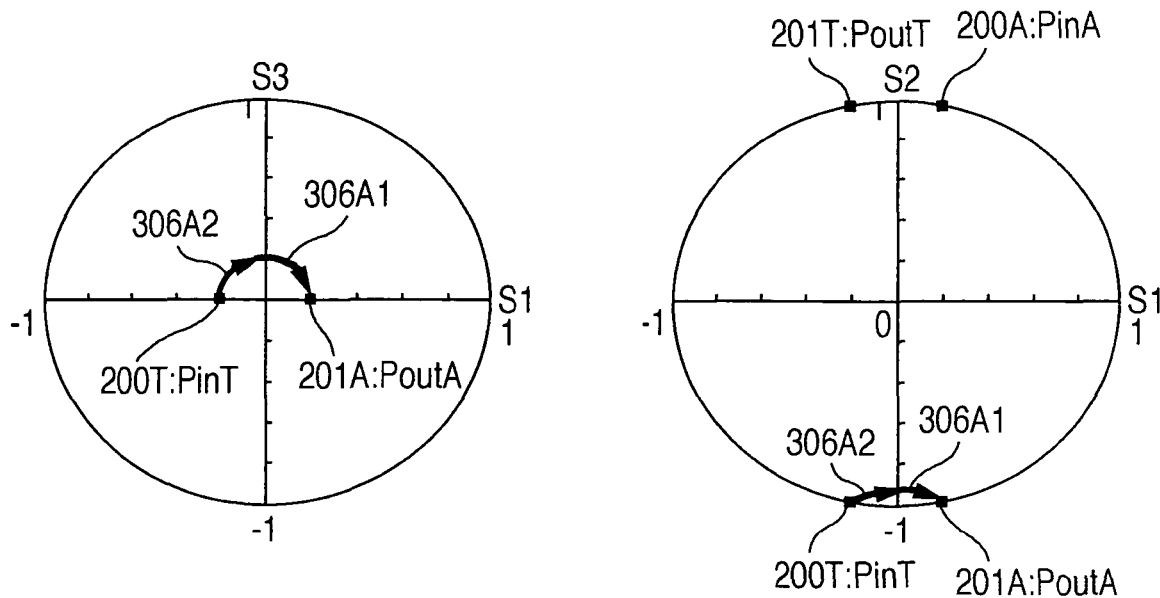
FIG. 29 is a view showing the Poincare sphere to be used for describing the LCD apparatus according to one embodiment of the present invention.

In FIG. 27, the left-hand portion concerns with the o-mode and shows the configuration in which the negative a-plate 13A2 is located on the side of the liquid crystal layer 15. In this configuration, the slow axis 13A2S of the negative a-plate 13A2 and the slow axis 13A1S of the positive a-plate 13A1 are located in parallel to the absorption axis 12AC of the first polarizer 12. FIG. 29 concerns with this configuration and shows the conversion of the polarization state in the black state. It is understood from FIG. 29 that the change of the polarization state shown in FIG. 13 takes place.

Figure 30:
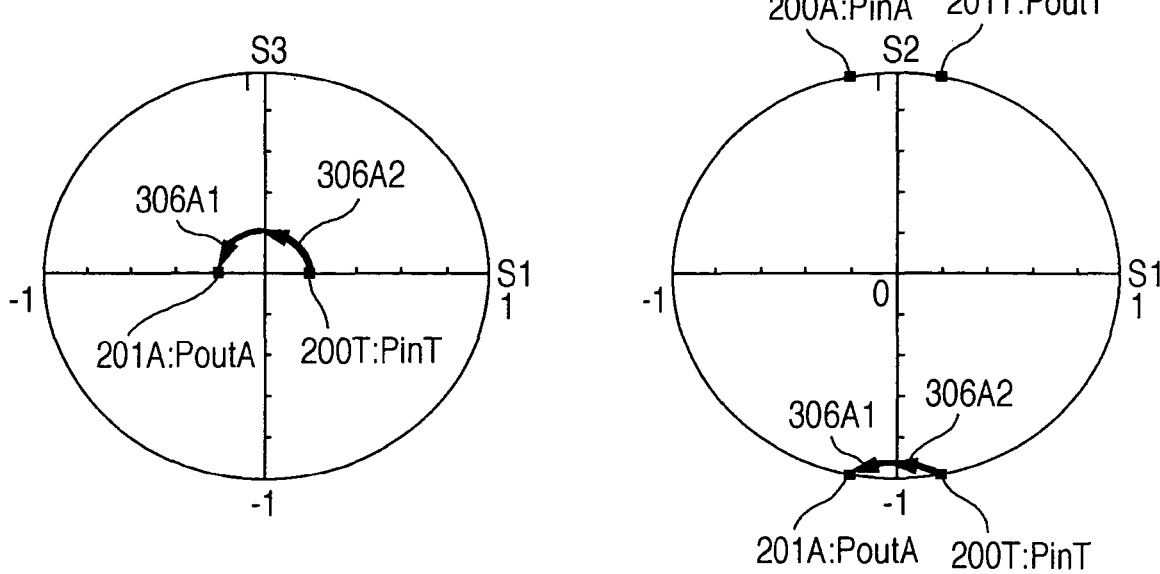
FIG. 30 is a view showing the Poincare sphere to be used for describing the LCD apparatus according to one embodiment of the present invention.

In FIG. 27, the right-hand portion concerns with the e-mode and shows the configuration in which the positive a-plate 13A1 is located on the side of the liquid crystal layer 15. In this configuration, the slow axis 13A2S of the negative a-plate 13A2 and the slow axis 13A1S of the positive a-plate 13A1 are located in parallel to the absorption axis 12CA of the first polarizer 12. FIG. 30 concerns with this configuration and shows the conversion of the polarization state on the black display. It is understood from FIG. 30 that the change of the polarization state shown in FIG. 14 takes place.

Figure 31:
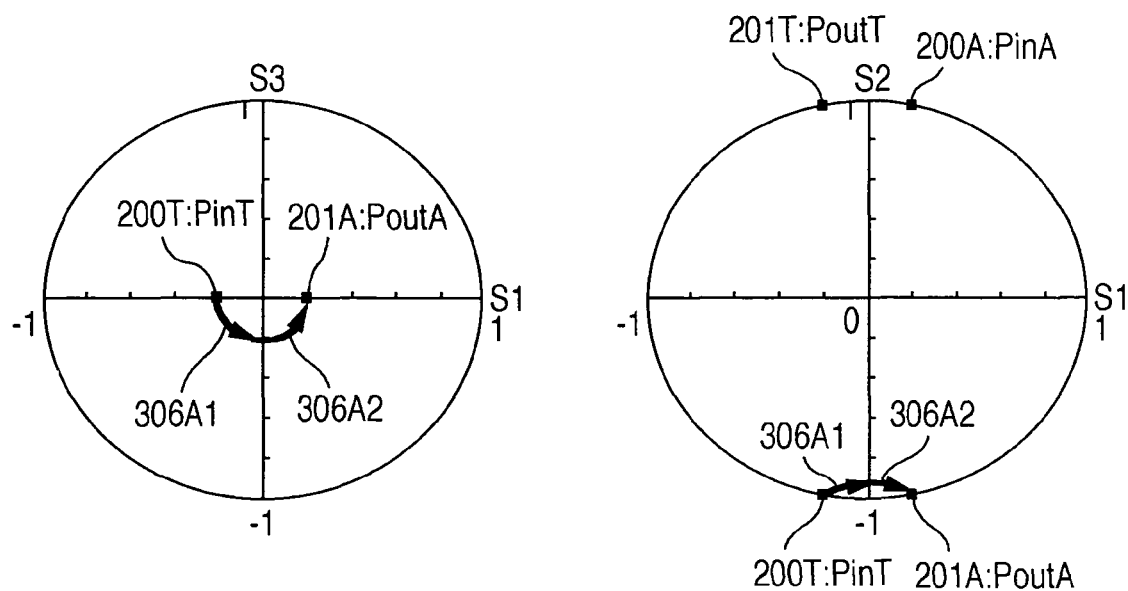
FIG. 31 is a view showing the Poincare sphere to be used for describing the LCD apparatus according to one embodiment of the present invention.

In FIG. 28, the left-hand portion concerns with the o-mode and shows the configuration in which the positive a-plate 13A1 is located on the side of the liquid crystal layer 15. In this configuration, the slow axis 13A2S of the negative a-plate 13A2 and the slow axis 13A1S of the positive a-plate 13A1 are located perpendicularly to the absorption axis 12CA of the first polarizer 12. FIG. 31 shows the conversion of the polarization state on the black display in this configuration. It is understood from FIG. 31 that the change of the polarization state shown in FIG. 13 takes place.

Figure 32:
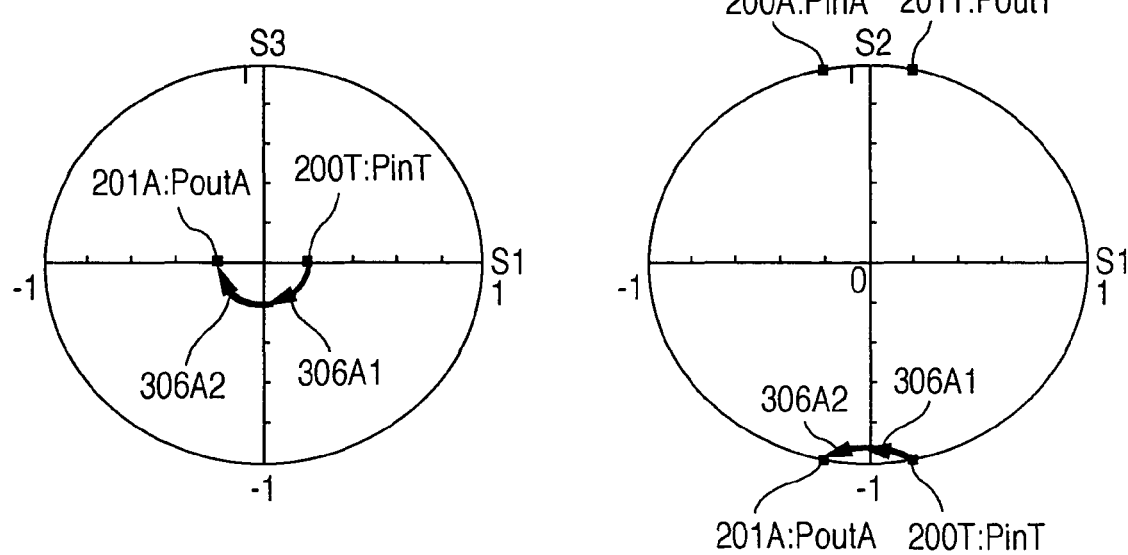
FIG. 32 is a view showing the Poincare sphere to be used for describing the LCD apparatus according to one embodiment of the present invention.

In FIG. 28, the left-hand portion concerns with the e-mode and shows the configuration in which the negative a-plate 13A1 is located on the side of the liquid crystal layer 15. In this configuration, the slow axis 13A2S of the negative a-plate 13A2 and the slow axis 13A1S of the positive a-plate 13A1 are located perpendicularly to the absorption axis 12CA of the first polarizer 12. FIG. 32 shows the conversion of the polarization state on the black display in this configuration. It is understood from FIG. 14 that the change of the polarization state shown in FIG. 14 takes place.

It is understood from FIGS. 28 to 31 that the changes of the polarization state in the four configurations shown in FIGS. 27 and 28 are symmetric to each other and the different respect is only the path and the number of each change of the polarization state. That is, if each of these four configurations has the same combination of the retardations of the positive a-plate and the negative a-plate, those four configurations indicate the substantially same viewing angle characteristic in the black state. Hence, for studying the retardation of the retardation films caused by the optical simulation to be discussed below, only the configuration in the left hand of FIG. 28 is used.

Figure 33:
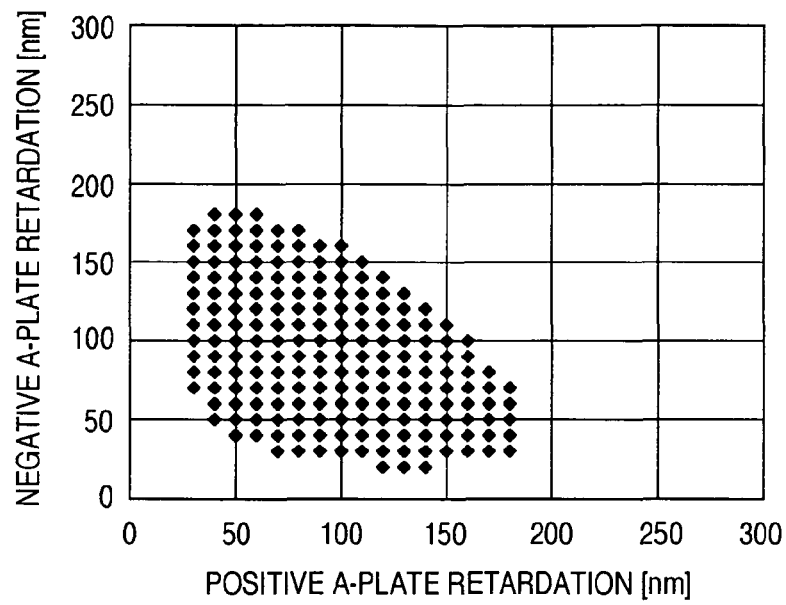
FIG. 33 is a graph showing characteristics of the LCD apparatus according to one embodiment of the present invention.
Figure 34:
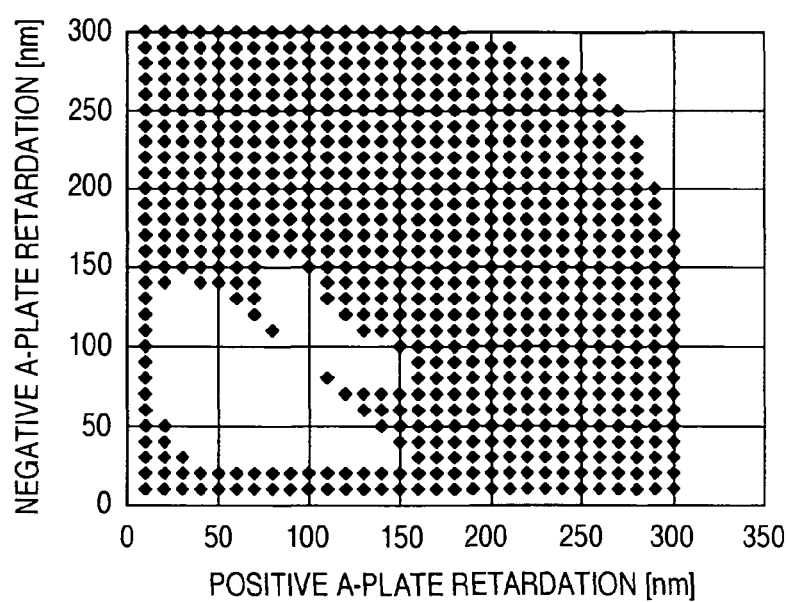
FIG. 34 is a graph showing characteristics of the LCD apparatus according to one embodiment of the present invention.
Figure 35:
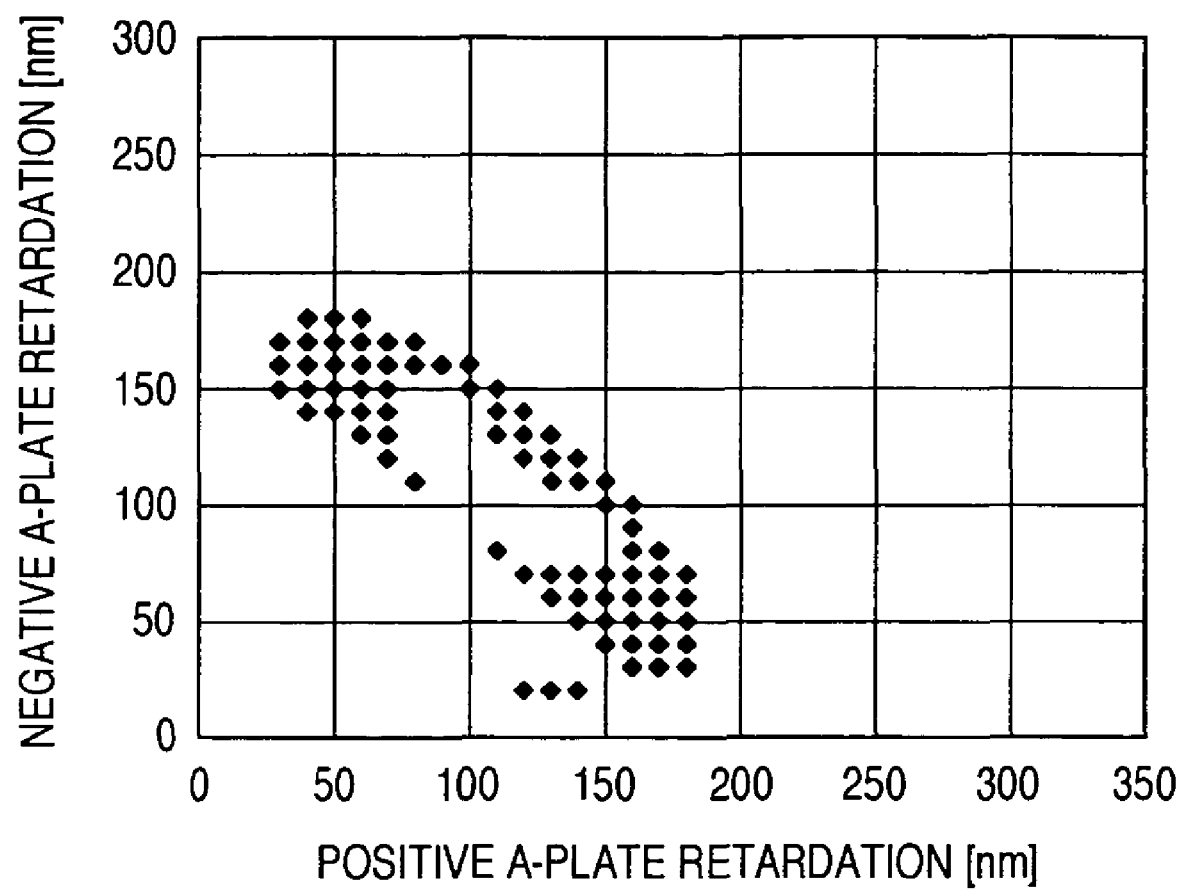
FIG. 35 is a graph showing characteristics of the LCD apparatus according to one embodiment of the present invention.

Like the numeric result in FIG. 22 derived in the example 1, FIG. 33 shows the result derived by calculating the maximum transmittance and $\Delta xy$ in the black state in the configuration shown in the left hand of FIG. 28 as changing each retardation of the positive a-plate and the negative a-plate and deriving the condition in which the maximum transmittance is 1.2% or less based on the result. Further, FIG. 34 shows the resulting condition in which $\Delta xy$ is 0.15 or less. Like the example 1, it is understood from this result that it is difficult to reduce both of the luminance change and the color shift in the black state. Further, as will be understood from FIGS. 29 to 32, the conversion of the polarization state by the positive a-plate is symmetric to that by the negative a-plate. Hence, in FIGS. 33 to 35, the retardation is substantially axisymmetric with respect to a diagonal passing a point of origin. That is, the condition that the retardation of the positive a-plate is 30 nm and the retardation of the negative a-plate is 160 nm is equivalent in the viewing angle characteristic to the condition that the retardation of the positive a-plate is 160 nm and the retardation of the negative a-plate is 30 nm. In FIG. 33, the maximum transmittance becomes the lowest when each retardation of the positive a-plate and the negative a-plate is 90 nm. However, it is understood from FIG. 34 that closer to this condition, the condition for reducing the color shift is not satisfied. According to the inventors' study, the condition that meets the reduction of both of the luminance change and the color shift is that the retardation of the positive a-plate is 140 nm and the retardation of the negative a-plate is 60 nm. As stated above, this trend is substantially common to all the configurations shown in FIGS. 27 and 28.

Herein, the terms of "positive a-plate" and "negative a-plate" originally mean the complete uniaxial anisotropic medium. However, it was found that the biaxial anisotropic mediums used as the positive and the negative a-plates do not greatly change the trend indicated in the example 3. In the example 3, it was assured that the replacement of the positive a-plate with the retardation film with its Nz coefficient of 0.8 to 1.2 (to be discussed below) and of the negative a-plate with the retardation film with its Nz coefficient of −0.2 to 0.2 does not greatly change the trend indicated in the example 3.

The calculated result indicated in the example 3 is derived on the assumption that the retardation films are formed of a norbornane system material and the dependency of the refractive index of the films on the wavelength is specified. In place of the norbornane system material, it was found that the retardation films formed of PC or polystyrene offer the substantially same result.

EXAMPLE 4

Figure 36:
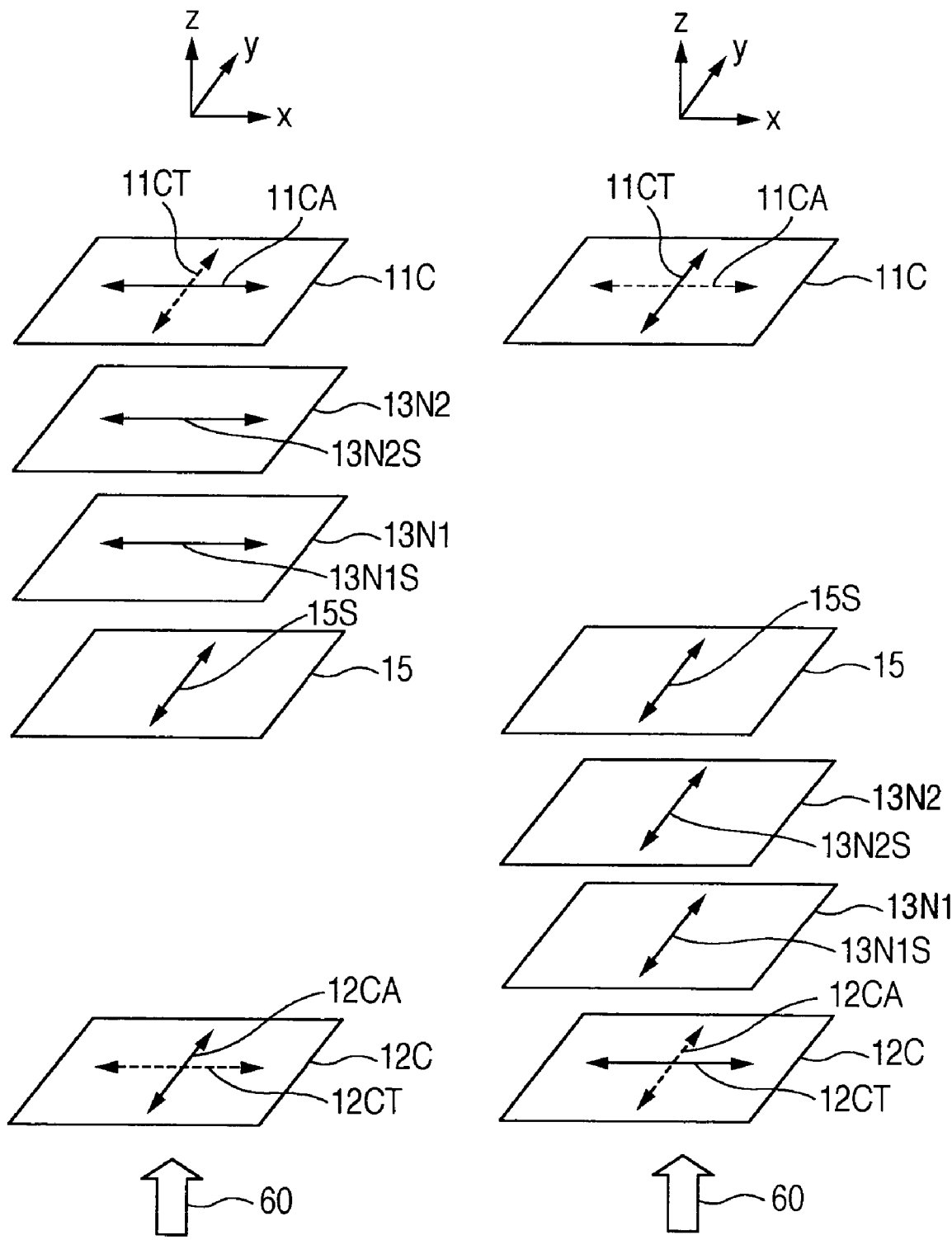
FIG. 36 is a view showing an LCD apparatus according to one embodiment of the present invention.
Figure 37:
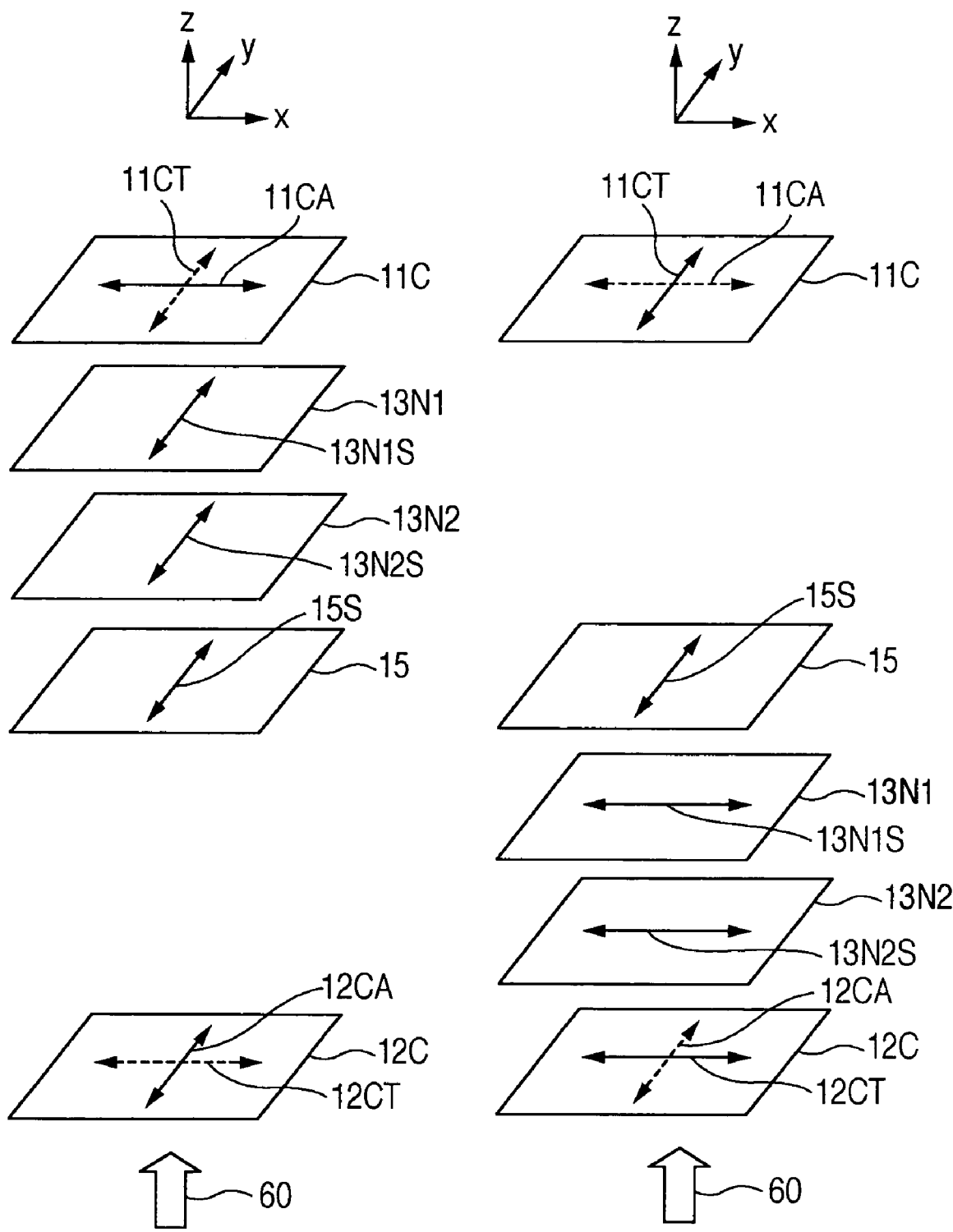
FIG. 37 is a view showing an LCD apparatus according to one embodiment of the present invention.

The structure of the example 4 is shown in FIG. 1 and the optical configuration is shown in FIGS. 36 and 37. The left-hand portions of FIGS. 36 and 37 concern with the o-mode, while the right-hand portions of FIGS. 36 and 37 concern with the e-mode. In the example 4, two retardation films are used in which one film has the Nz coefficient >0.5 and the other film has the Nz coefficient ≦0.5. The Nz coefficient is a quantity to be frequently used in the case of representing a birefringence of the medium having the biaxial anisotropy about the refractive index. Assuming that the slow axis on the plane is in parallel to the x-axis, the refractive indexes in the x-axis and the y-axis directions are nx and ny, and the refractive index in the z-axis direction, that is, the thickness direction is nz, the Nz coefficient may be represented by the following expression (8):

$$Nz=(nx-nz)/(nx-ny) \quad (8)$$

wherein the major axis with a larger refractive index on the plane is called a slow axis of the retardation film with the biaxial anisotropy. In the following description, when simply termed the retardation of the biaxial anisotropic medium, it means the retardation on the plane.

Figure 38:
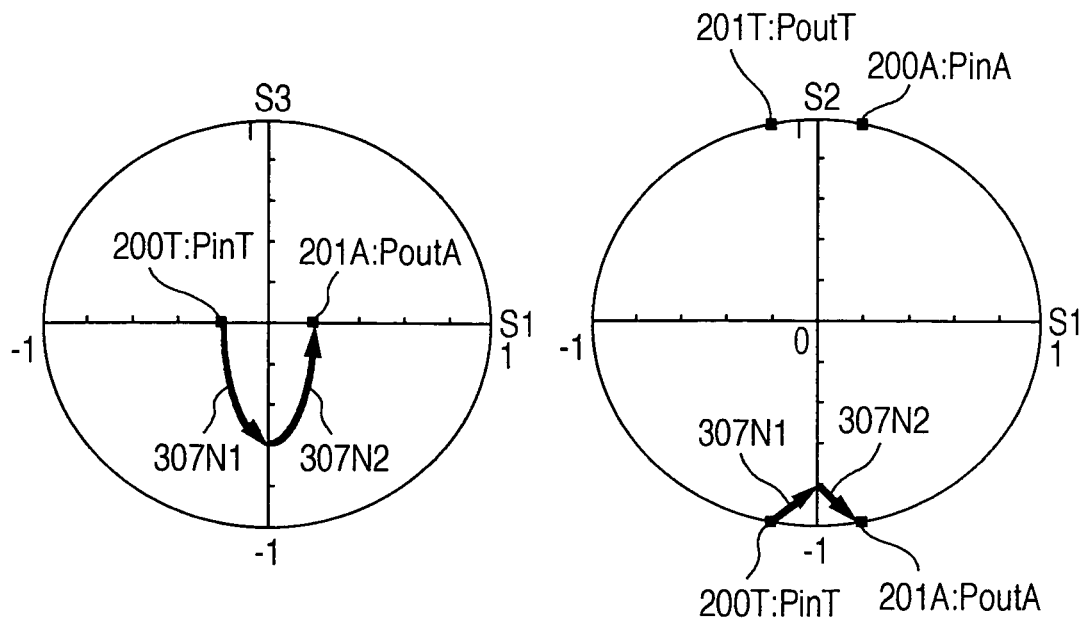
FIG. 38 is a view showing the Poincare sphere to be used for describing the LCD apparatus according to one embodiment of the present invention.
Figure 39:
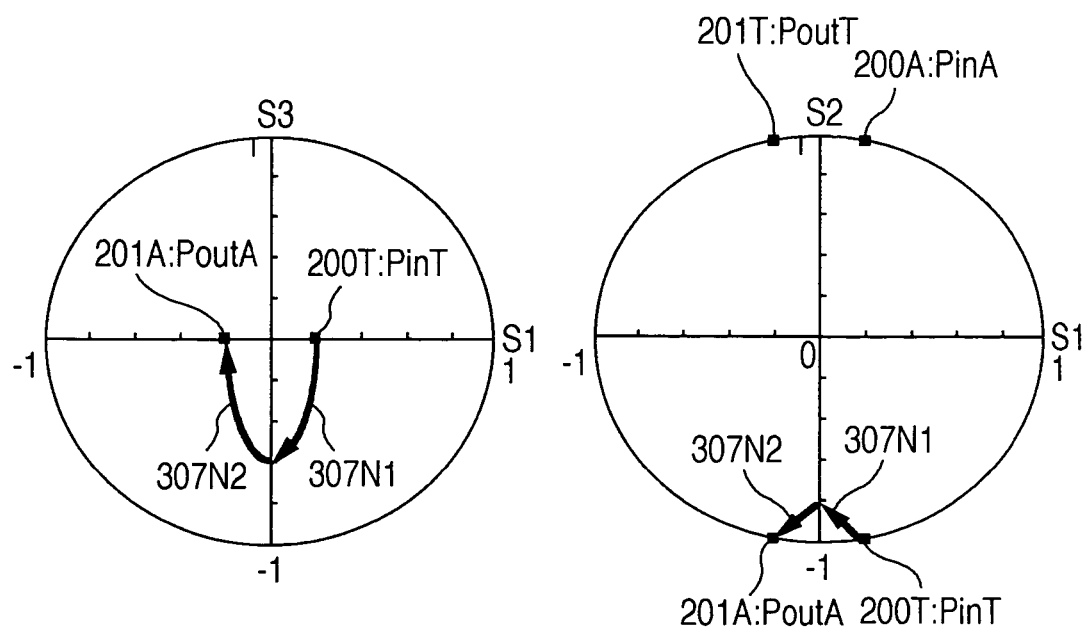
FIG. 39 is a view showing the Poincare sphere to be used for describing the LCD apparatus according to one embodiment of the present invention.
Figure 40:
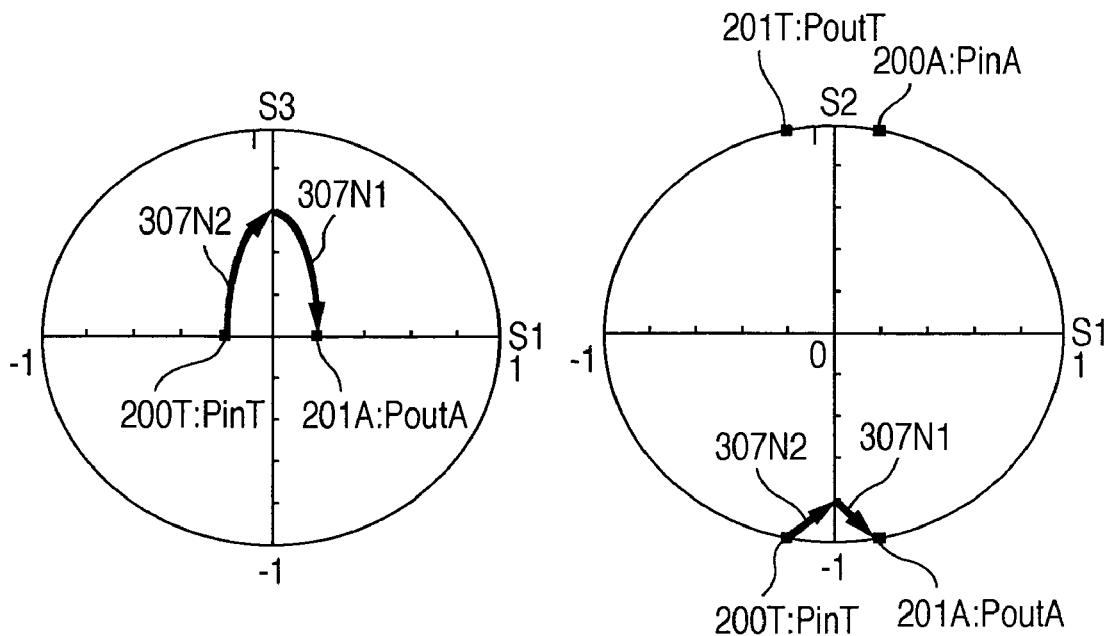
FIG. 40 is a view showing the Poincare sphere to be used for describing the LCD apparatus according to one embodiment of the present invention.
Figure 41:
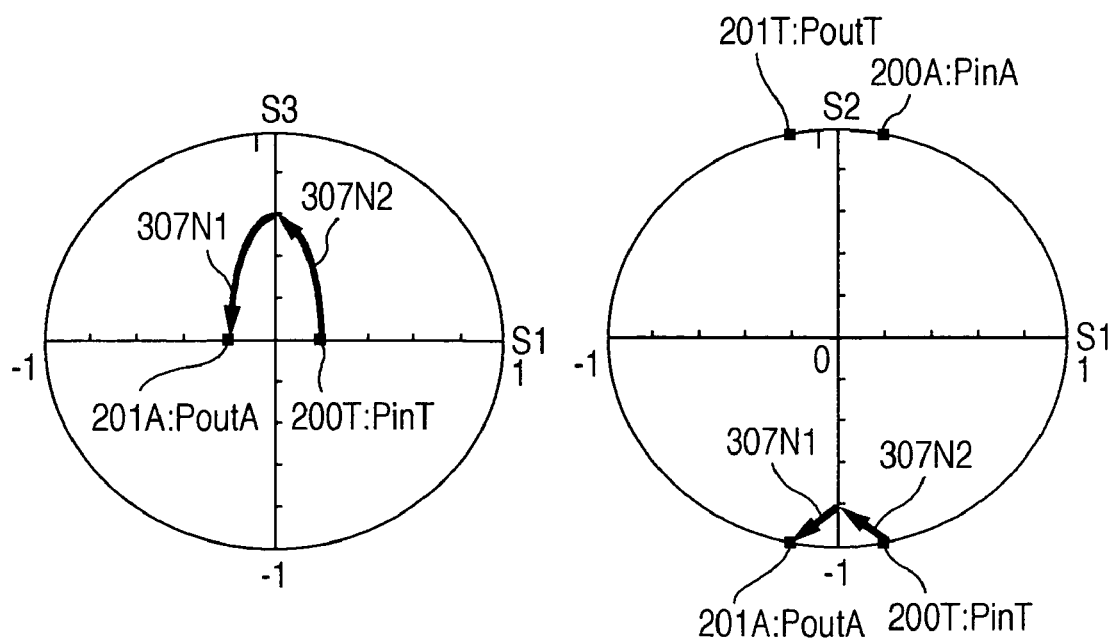
FIG. 41 is a view showing the Poincare sphere to be used for describing the LCD apparatus according to one embodiment of the present invention.

In FIGS. 36 and 37, 13N1 denotes the retardation film with the Nz coefficient >0.5 and 13N1S denotes the slow axis direction of the retardation film. Further, 13N2 denotes the retardation film with the Nz coefficient ≦0.5 and 13N2S denotes the slow axis direction of the retardation film. In the configuration shown in FIG. 1, for executing the conversion of the polarization state as shown in FIG. 13 or 14 through the use of one retardation film with the Nz coefficient >0.5 and the other film with the Nz coefficient ≦0.5, according to the inventors' study, four configurations shown in FIGS. 36 and 37 may be considered. The change of the polarization state in the black state in each configuration shown in FIGS. 38 to 41 is represented with the Poincare sphere. FIG. 38 shows the change of the polarization state in the configuration of the left hand of FIG. 36. FIG. 39 shows the change of the polarization state in the configuration of the right hand of FIG. 36. FIG. 40 shows the change of the polarization state in the configuration of the left hand of FIG. 37. FIG. 41 shows the change of the polarization state in the configuration of the right hand of FIG. 37.

As shown in these figures, it is understood that the changes of polarization state of the four configurations are symmetric to each other and if the two retardation films have the same retardations as each other, these four configurations offer the substantially same viewing angle characteristic in the black state. Hence, the optical simulation for studying the relation between the retardations and the viewing angle characteristic in the black state of the two retardation films was carried out with respect to only the configuration in the left hand of FIG. 36.

Figure 42:
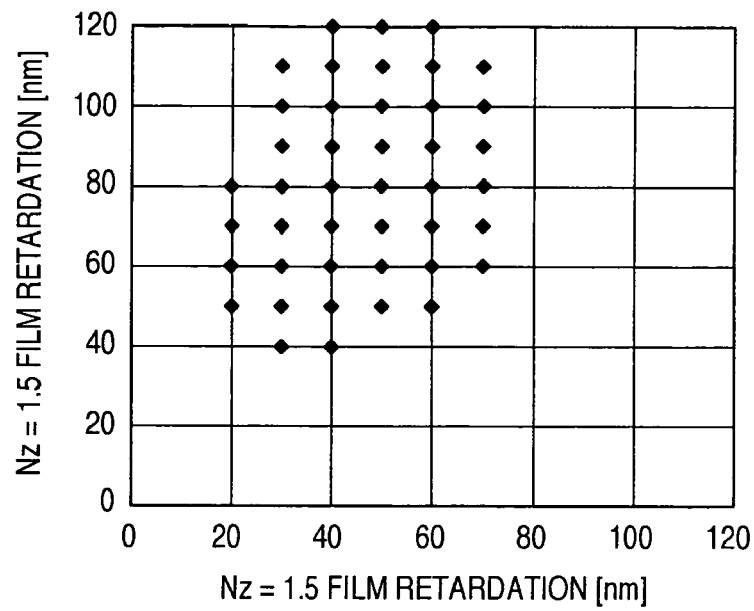
FIG. 42 is a graph showing characteristics of the LCD apparatus according to one embodiment of the present invention.
Figure 43:
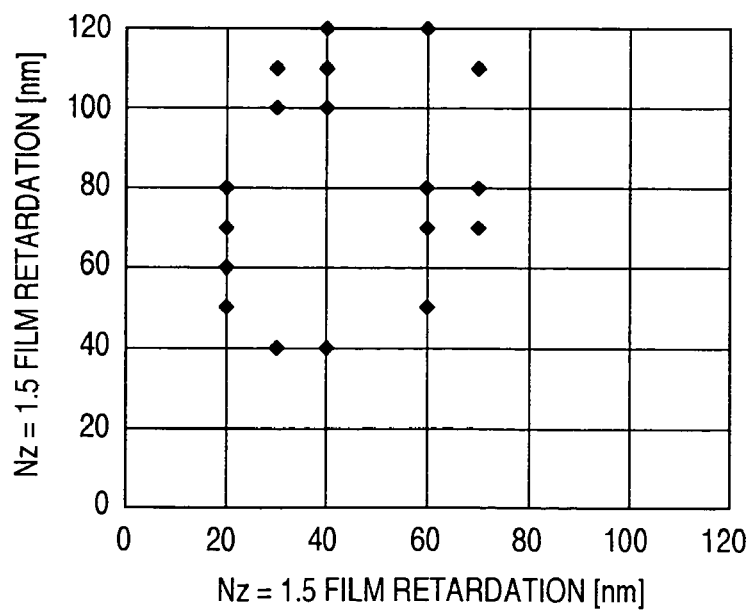
FIG. 43 is a graph showing characteristics of the LCD apparatus according to one embodiment of the present invention.

Like the derivation of the data shown in FIG. 22 in the example 1, FIG. 42 shows the condition in which the maximum transmittance is 1.2% or less. This condition is derived by calculating the maximum transmittance in the black state and Δxy as changing the planar retardation of each retardation film in the configuration shown in the left hand of FIG. 36. Further, FIG. 43 shows the condition in which the maximum transmittance is 1.2% or less and Δxy is 0.15 or less. This result is derived on the assumption that the retardation film 13N1 has the Nz coefficient of 1.5 and the other film 13N2 has the Nz coefficient of −1.5 in the left hand of FIG. 36. At first, what is to be remarked is that the configuration indicated in the example 4 may reduce the planar retardation of the retardation film as compared with the examples 1 to 3 in the condition of reducing the luminance change and the color shift when viewed from the oblique direction. In the examples 1 to 3 and the present example, if the slow axis of the retardation film is located completely in parallel to or perpendicularly to the slow axis of the liquid crystal layer, the characteristic in the black state caused when an operator views the display from the frontal direction is substantially equivalent to the characteristic occurring when no retardation films are provided. However, if the axis is shifted by ±2 degrees on the manufacture, the characteristic in the black state caused when the display is viewed from the frontal direction is degraded. Herein, if the axial shift takes place in the configuration with the retardation film having a larger retardation on the plane and the other configuration with the film having a smaller retardation on the plane, the configuration with the film having a smaller retardation on the plane is able to suppress the degrade of the characteristic is the black state caused when viewed from the frontal direction more than the configuration with the film having a larger retardation on the plane. The example 4 may realize the former configuration.

Further, as shown in FIGS. 42 and 43, the retardation of the retardation film with the Nz coefficient of 1.5 is slightly larger than the retardation of the film with the Nz coefficient of −1.5. According to the inventors' study, it was found that this results from the change of the polarization state caused by one film is asymmetric to that caused by the other film. As shown in FIG. 38, it was also found that the symmetric change of the polarization state on the S2 to S3 plane of the Poincare sphere may reduce the retardations of both of the films. It was unveiled that this condition may be represented by the following expression (9) on the assumption that the Nz coefficient of the retardation film for meeting Nz coefficient >0.5 is Nz1 and the Nz coefficient of the retardation film for satisfying Nz coefficient ≦0.5 is Nz2.

$$Nz1+Nz2\approx1 \quad (9)$$

Figure 44:
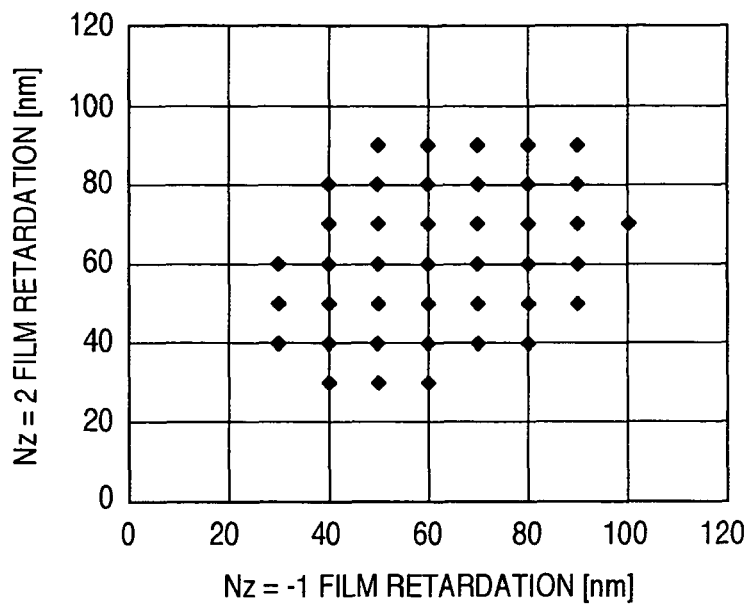
FIG. 44 is a graph showing characteristics of the LCD apparatus according to one embodiment of the present invention.
Figure 45:
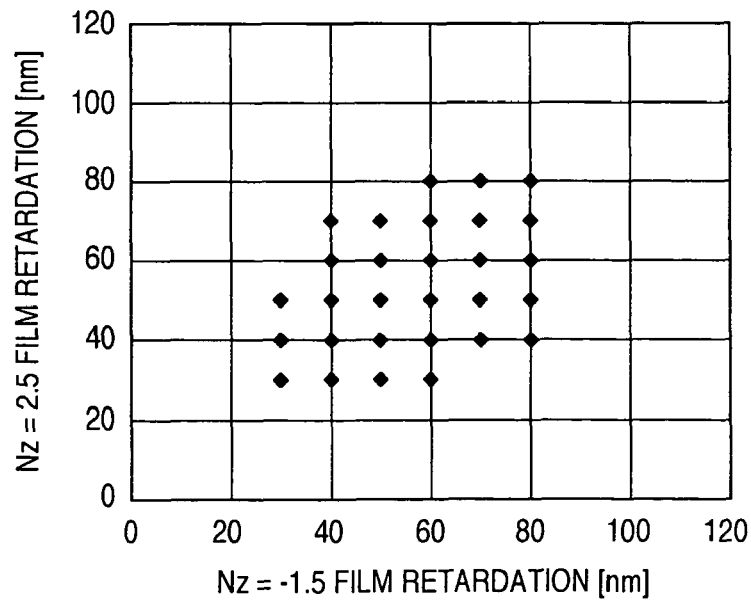
FIG. 45 is a graph showing characteristics of the LCD apparatus according to one embodiment of the present invention.
Figure 46:
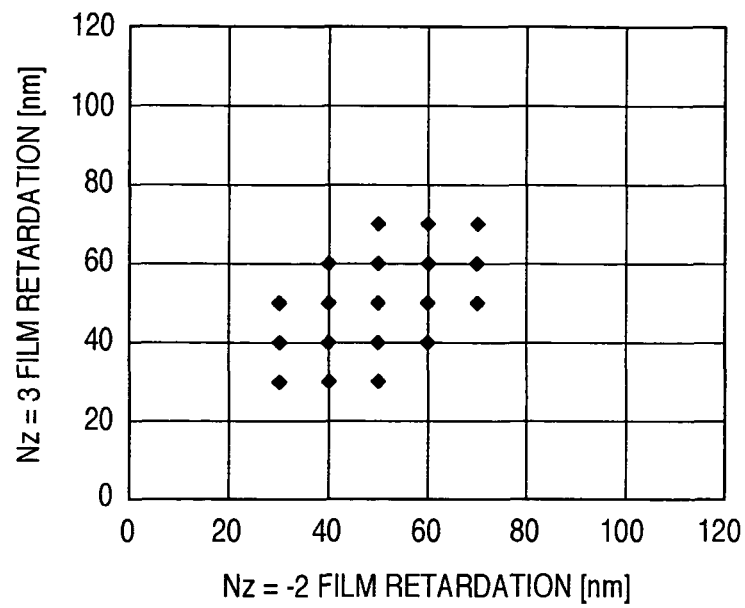
FIG. 46 is a graph showing characteristics of the LCD apparatus according to one embodiment of the present invention.
Figure 47:
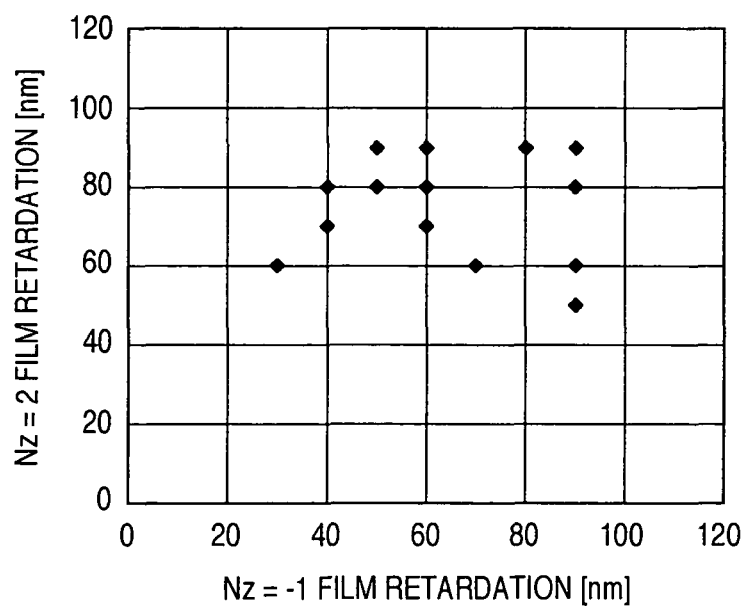
FIG. 47 is a graph showing characteristics of the LCD apparatus according to one embodiment of the present invention.
Figure 48:
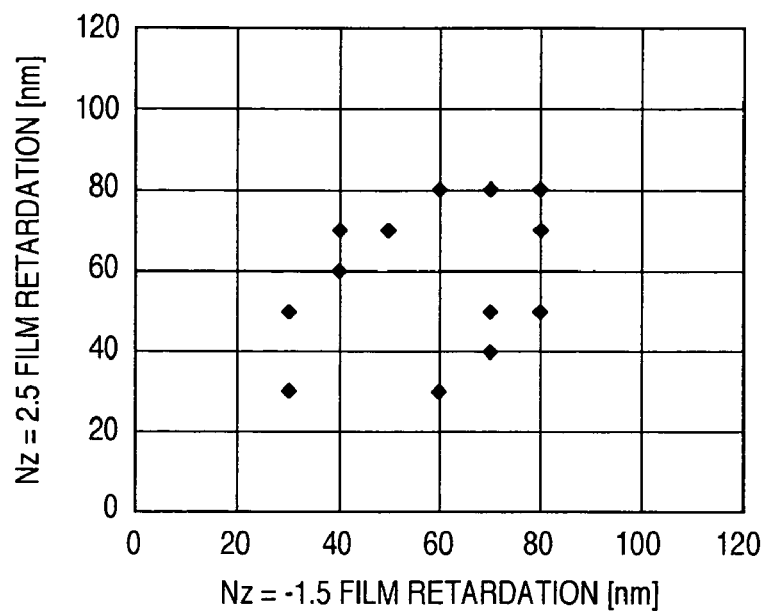
FIG. 48 is a graph showing characteristics of the LCD apparatus according to one embodiment of the present invention.
Figure 49:
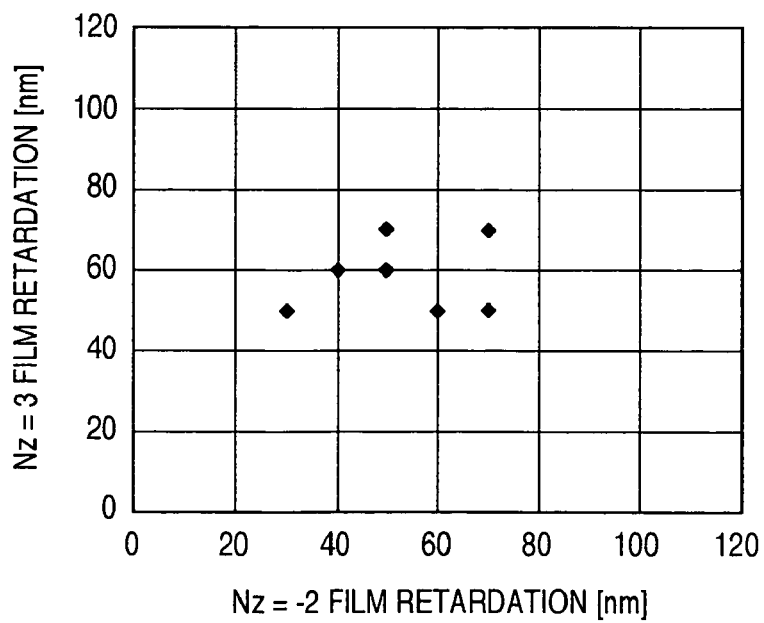
FIG. 49 is a graph showing characteristics of the LCD apparatus according to one embodiment of the present invention.
Figure 50:
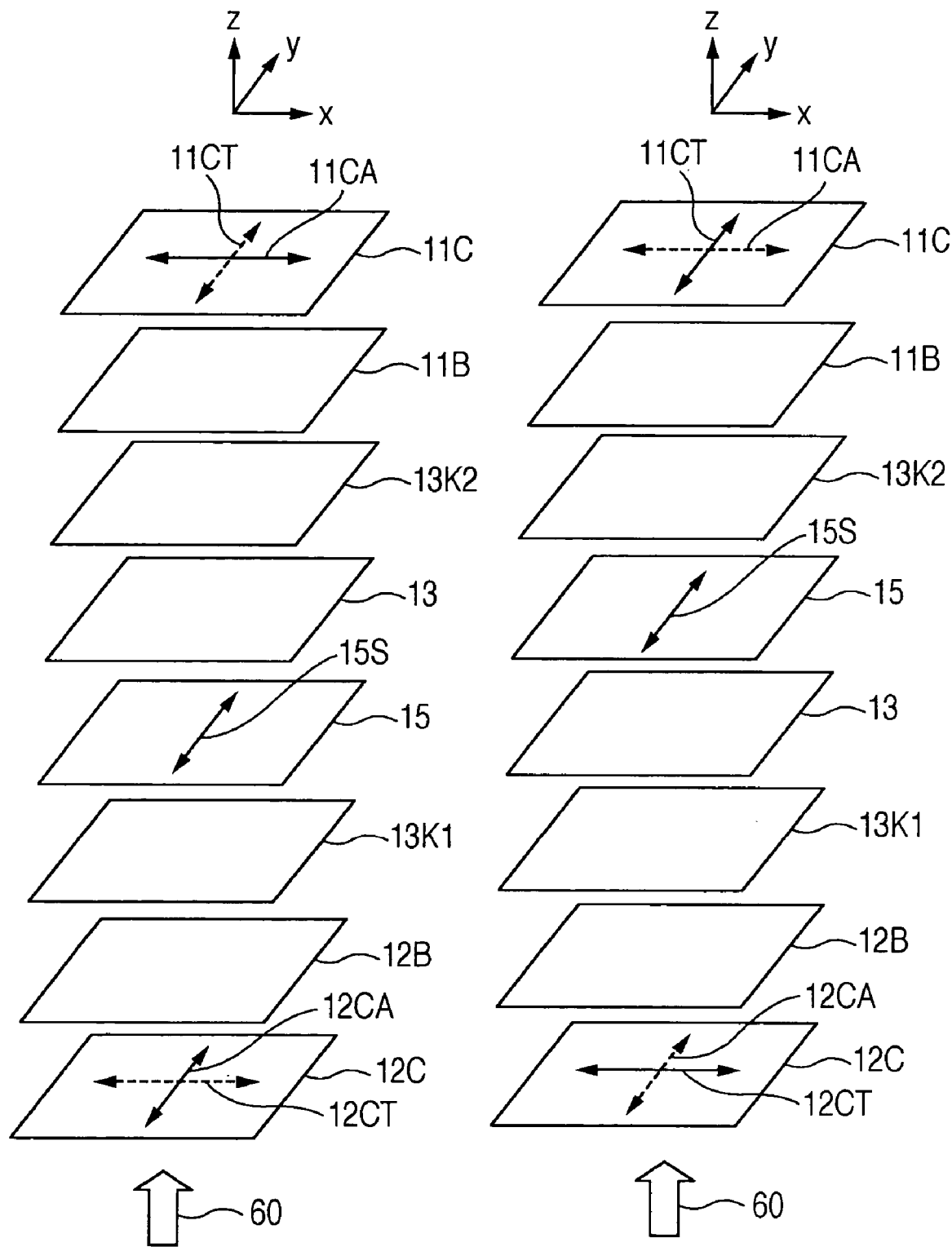
FIG. 50 is a view showing the Poincare sphere to be used for describing the LCD apparatus according to one embodiment of the present invention.

FIGS. 44 to 46 show the condition in which the maximum transmittance is 1.2% or less in the configuration that meets that condition. Further, FIGS. 47 to 49 show the condition in which the maximum transmittance is 1.2% or less and Δxy is 0.15 or less. FIGS. 44 and 47 show the condition derived in the case of using the retardation film with the Nz coefficient of −1 and the Nz coefficient of 2. FIGS. 45 to 48 show the condition derived in the case of using the retardation film with the Nz coefficient of −2 and the Nz coefficient of 2.5. FIGS. 46 and 49 show the condition derived in the case of using the retardation film with the Nz coefficient of −2 and the Nz coefficient of 3. Comparing FIG. 42 with FIGS. 44 to 46, it is understood that as the latter condition the planar retardation of the two retardation films is small. Further, it is understood that each area shown in FIGS. 44 to 47 is symmetric with respect to the diagonal passing the point of origin. This suggests that the symmetric change of polarization state as stated above is realized. As a result, in the condition shown in FIGS. 47 to 49 in which the color shift is also reduced, the planar retardation of the two retardation films are made small. Further, comparing FIGS. 44 to 46 with one another, it is understood that the configuration with a larger absolute value of the Nz coefficient may make the planar retardation of the two retardation films smaller.

As a special case of the example 4, the absolute value of the Nz coefficient of one retardation film may be specified as a larger value. In this case, it is considered that this film have the substantially same function as the c-plate. It means that the change of the polarization state is analogous to that indicated in the example 1 or 2. Hence, like the examples 1 and 2, the slow axis direction of this retardation film may be somewhat arbitrarily defined on the plane.

The result indicated in the example 4 is derived on the assumption that the retardation film is formed of a norbornane system material and the dependency of the refractive index of the film on the wavelength is specified. In place of the norbornane system material, the film formed of PC or polystyrene may offer the substantially same result.

EXAMPLE 5

In the examples 1 to 4, it was considered that the adverse effect of the liquid crystal layer is eliminated in the case the supporting material of the polarizer has an isotropic. However, even if the supporting material has a birefringence, in principle, it is possible to eliminate the adverse effect of the liquid crystal layer.

FIG. 43 shows the optical configuration of this example. The left-hand portion of FIG. 43 concerns with the o-mode and the right-hand portion thereof concerns with the e-mode. In FIG. 43, the supporting materials 12B and 11B of the first and the second polarizers both have a birefringence. 13K1 denotes the retardation film that serves to cancel the birefringence of the supporting material 12B of the first polarizer. Likewise, 13K2 denotes the retardation film that serves to cancel the birefringence of the supporting material 11B of the second polarizer. For example, if the supporting material of the polarizer is the positive c-plate, by locating the negative c-plate with the equal retardation as shown in FIG. 43, the birefringence of the supporting material of the polarizer is cancelled. If the supporting material is the positive a-plate, by locating the negative a-plate with the equal retardation so that the slow axis may be substantially perpendicular to the slow axis of the supporting material as shown in FIG. 43, the birefringence of the supporting material is cancelled. As the commonly used supporting material, TAC may be referred. However, since the TAC is equivalent to the negative c-plate as stated above, if the TAC is used as the supporting materials of the first and the second polarizer, as the components 13K1 and 13K2 in FIG. 43, the positive c-plate may be used.

As described above, in a case that the supporting material of the polarizer has the birefringence, it is possible to obtain the same condition as the condition in the case that the polarizer with the isotropic is used. That is, it is considered that the retardation shown in FIG. 43 is equivalent to those shown in FIGS. 4 and 6. Hence, the plurality of retardation films 13 may be considered as those in the examples 1 to 4, which makes it possible to eliminate the adverse effect of the liquid crystal layer and reduce the luminance change and the color shift occurring when the operator views the black display from the oblique direction.

EXAMPLE 6

Figure 51:
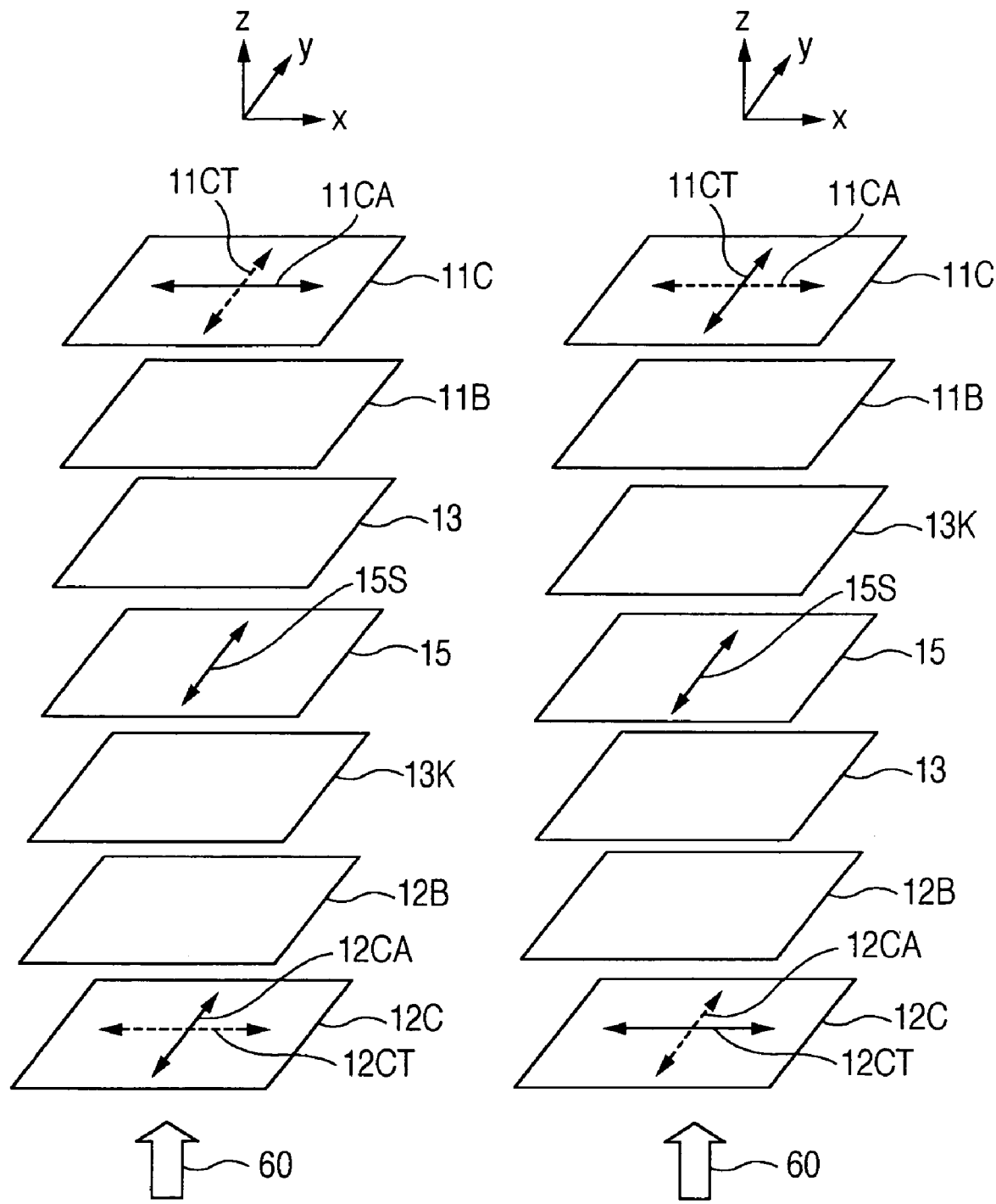
FIG. 51 is a view showing an LCD apparatus according to one embodiment of the present invention.

FIG. 51 shows the optical configuration of the example 6. The left-hand portion of FIG. 51 concerns with the o-mode, while the right-hand portion of FIG. 51 concerns with the e-mode. As shown, 13K denotes the retardation film that serves to cancel the adverse effect of the supporting material of the polarizer. As shown, for the o-mode, the adverse effect of the supporting material of the first polarizer is cancelled by the retardation film 13K. For the e-mode, the adverse effect of the supporting material 11B of the second polarizer is cancelled by the retardation film 13K. Further, for the o-mode, the plurality of retardation films 13 are located between the liquid crystal layer 15 and the supporting material of the second polarizer. For the e-mode, the plurality of retardation films 13 are located between the supporting material 12B of the first polarizer and the liquid crystal layer 15.

Figure 52:
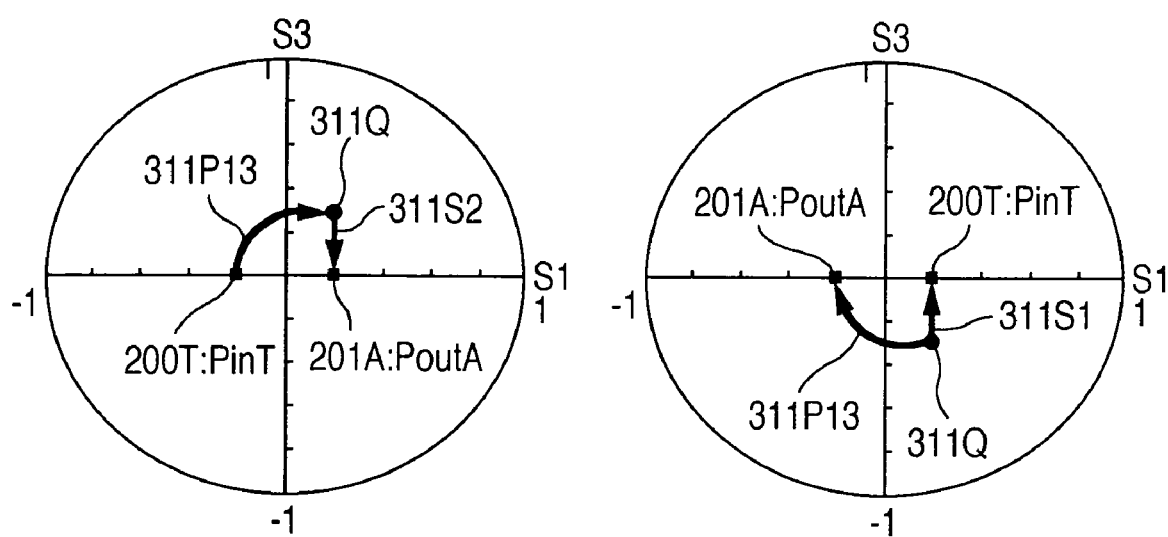
FIG. 52 is a view showing the Poincare sphere to be used for describing the LCD apparatus according to one embodiment of the present invention.

FIG. 52 shows the change of the polarization state on the black display in the example 6. The left-hand portion of FIG. 52 concerns with the o-mode, while the right-hand portion of FIG. 52 concerns with the e-mode. As shown in FIG. 52, 311P13 denotes the change of the polarization state caused by the retardation films 13 shown in FIG. 51. 311S2 denotes the change of the polarization state caused by the supporting material 11B of the second polarizer in the case of the o-mode shown in the left hand of FIG. 51 or the change of the polarization state caused by the supporting material 12B of the first polarizer in the case of the e-mode shown in the right hand of FIG. 51.

At first, the case of the o-mode will be described. As shown in the left hand of FIG. 51, the adverse effect of the supporting material of the first polarizer is cancelled. Hence, no adverse effect by the liquid crystal layer takes place in the change of the polarization state shown in the left hand of FIG. 52. After the light passes through the liquid crystal layer, the change of the polarization state 311P13 is brought about by the retardation films 13 as shown in FIG. 52, thereby putting the polarization state into the state 311Q. If this polarization state Q is made to be the polarization state 201A:PoutA by the change of the polarization state 311S2 caused by the supporting material 11B of the second polarizer, like the example 5, the adverse effect of the liquid crystal layer is eliminated, so that the luminance change and the color shift depending on the viewing angle may be reduced. That is, the state 311Q means the state occurring in the case of reversing the polarization state 201A:PoutA that coincides with the absorption axis of the second polarizer into the change of the polarization state 311S2 by the supporting material 11B of the second polarizer. Hence, it is just necessary to define the plurality of retardation films 13 so that the polarization state 200T:PinT occurring after the light is passed through the liquid crystal layer may be converted into the state 311QQ.

In turn, the case of the e-mode will be described. In the right hands of FIGS. 51 and 52, the incident light is changed into the polarization state 200T:PinT through the effect of the first polarization layer 12C. However, the change of the polarization state 311S1 is brought about by the supporting material 12B of the first polarizer, so that the polarization state is made to be the state 311Q. Afterwards, if the change of the polarization state 311P13 is brought about by the plurality of retardation films 13 and thereby the polarization state is made to be the state 201A:PoutA, no further great change of the polarization state is brought about by the liquid crystal layer.

Further, as shown in the right hand of FIG. 51, the adverse effect of the supporting material 11B of the second polarizer is cancelled by the retardation films 13K, so that the light is incident to the second polarization layer as keeping the polarization state 201A:PoutA occurring after the light is passed through the liquid crystal layer. Hence, like the example 5, the adverse effect of the liquid crystal layer is eliminated, so that the luminance change and the color shift depending on the viewing angle may be reduced. That is, it is just necessary to define the plurality of retardation films 13 so that the polarization state 311Q may be converted into the polarization state 201A:PoutA that coincides with the absorption axis of the second polarizer.

Figure 53:
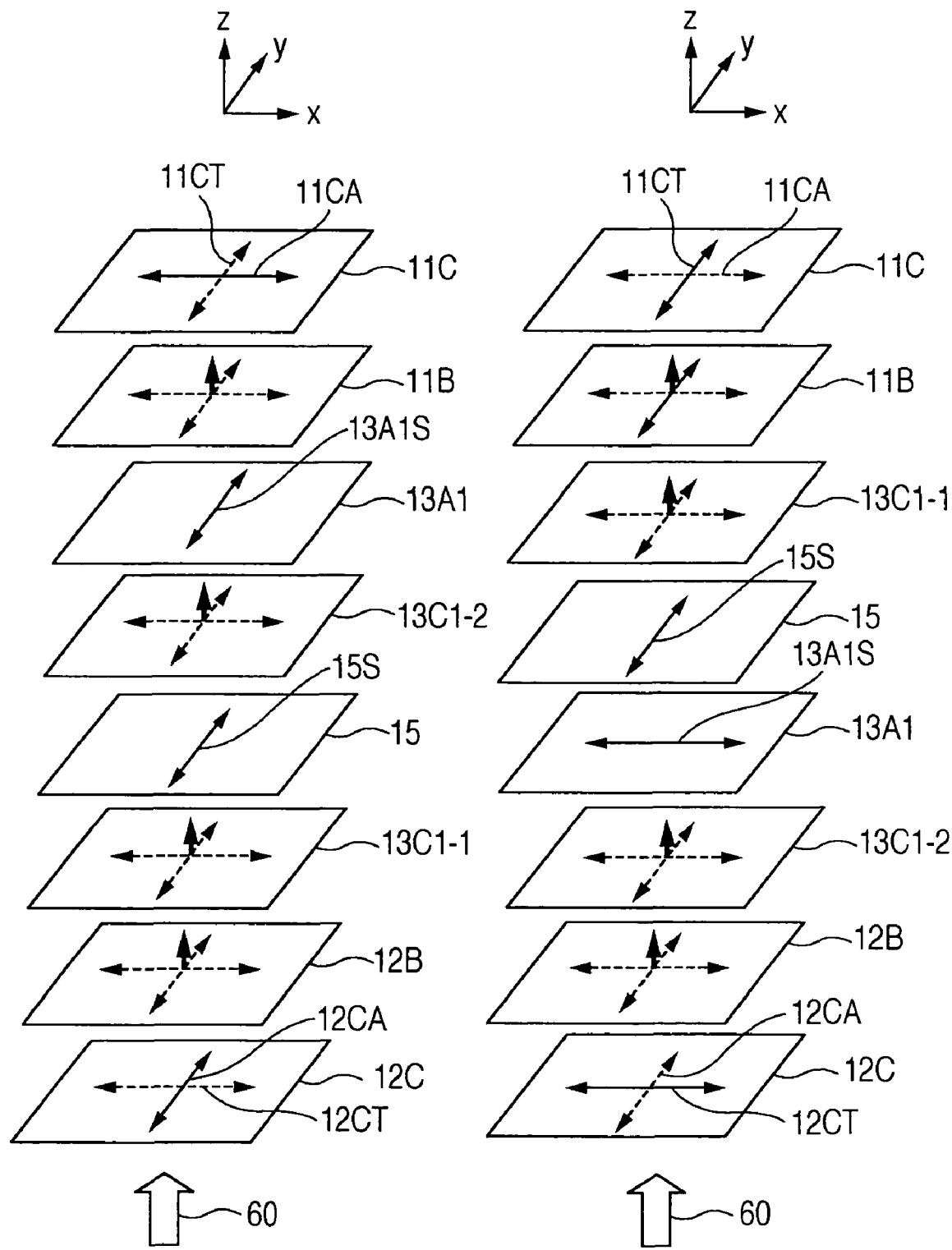
FIG. 53 is a view showing an LCD apparatus according to one embodiment of the present invention.
Figure 54:
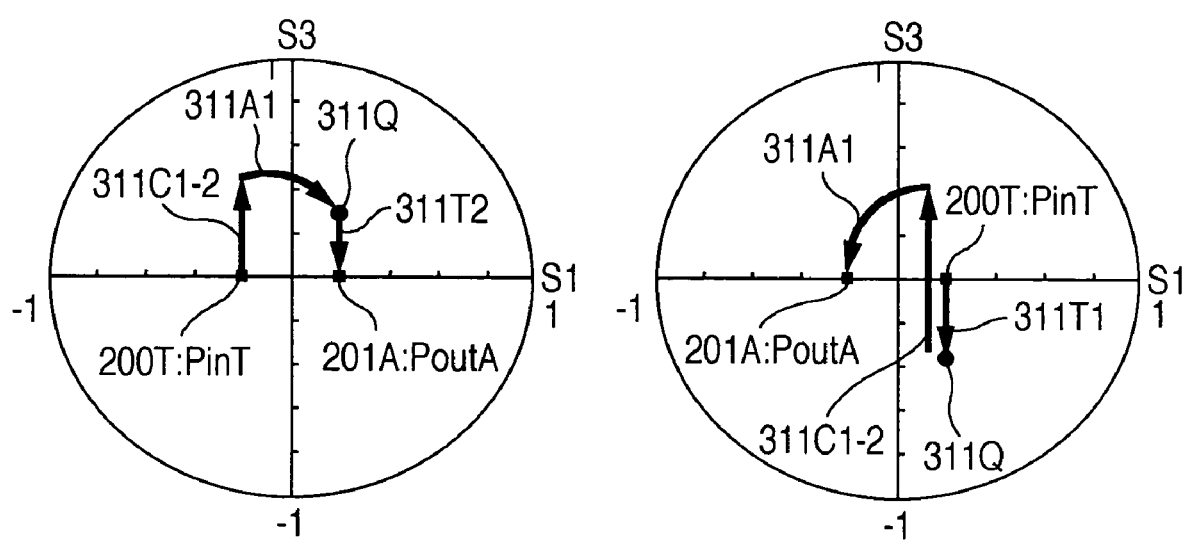
FIG. 54 is a view showing the Poincare sphere to be used for describing the LCD apparatus according to one embodiment of the present invention.

As an example, it is possible to describe the configuration wherein the supporting material of the polarizer is formed of TAC and the positive c-plate and the positive a-plate are used as the retardation films. FIG. 53 shows the optical configuration. The left-hand portion of FIG. 53 concerns with the o-mode, while the right-hand portion of FIG. 53 concerns with the e-mode. As shown, 13C1-1 denotes the positive c-plate, which serves to cancel the adverse effect of the TAC adjacent thereto. It is served as the retardation films 13K shown in FIG. 51. In FIG. 53, 13C1-2 denotes the positive c-plate and 13A1 denotes the positive a-plate, which are served as the retardation films 13 shown in FIG. 51. Further, for the o-mode, the slow axis 13A1S of the positive a-plate 13A1 is parallel to the slow axis 15S of the liquid crystal layer, while for the e-mode, the slow axis 13A1S thereof is perpendicular to the slow axis 15S of the liquid crystal layer. FIG. 54 shows the change of the polarization state in this configuration. The left-hand portion of FIG. 54 concerns with the o-mode, while the right-hand portion of FIG. 54 concerns with the e-mode. In FIG. 54, 311C1-2 denotes the change of the polarization state caused by the positive c-plate 13C1-2 shown in FIG. 53, while 311A1 denotes the change of the polarization state caused by the positive c-plate 13A1 shown therein. Moreover, in FIG. 54, 311T1 denotes the change of the polarization state caused by the supporting material of the first polarizer, while 311T2 denotes the change of the polarization state caused by the supporting material of the second polarizer. In FIG. 54, it is understood that the change of the polarization state considered with reference to FIG. 52 is made possible through the use of the positive c-plate and the positive a-plate.

According to the inventors' study, it is possible to perform the conversion of the polarization state shown in FIG. 52 in a case that a group of one negative c-plate and one negative a-plate, a group of one positive a-plate and one negative a-plate are used as the plurality of retardation films shown in FIG. 51, or one retardation film with the Nz coefficient of 0.2 to 0.8 is used as the retardation film.

EXAMPLE 7

Figure 55:
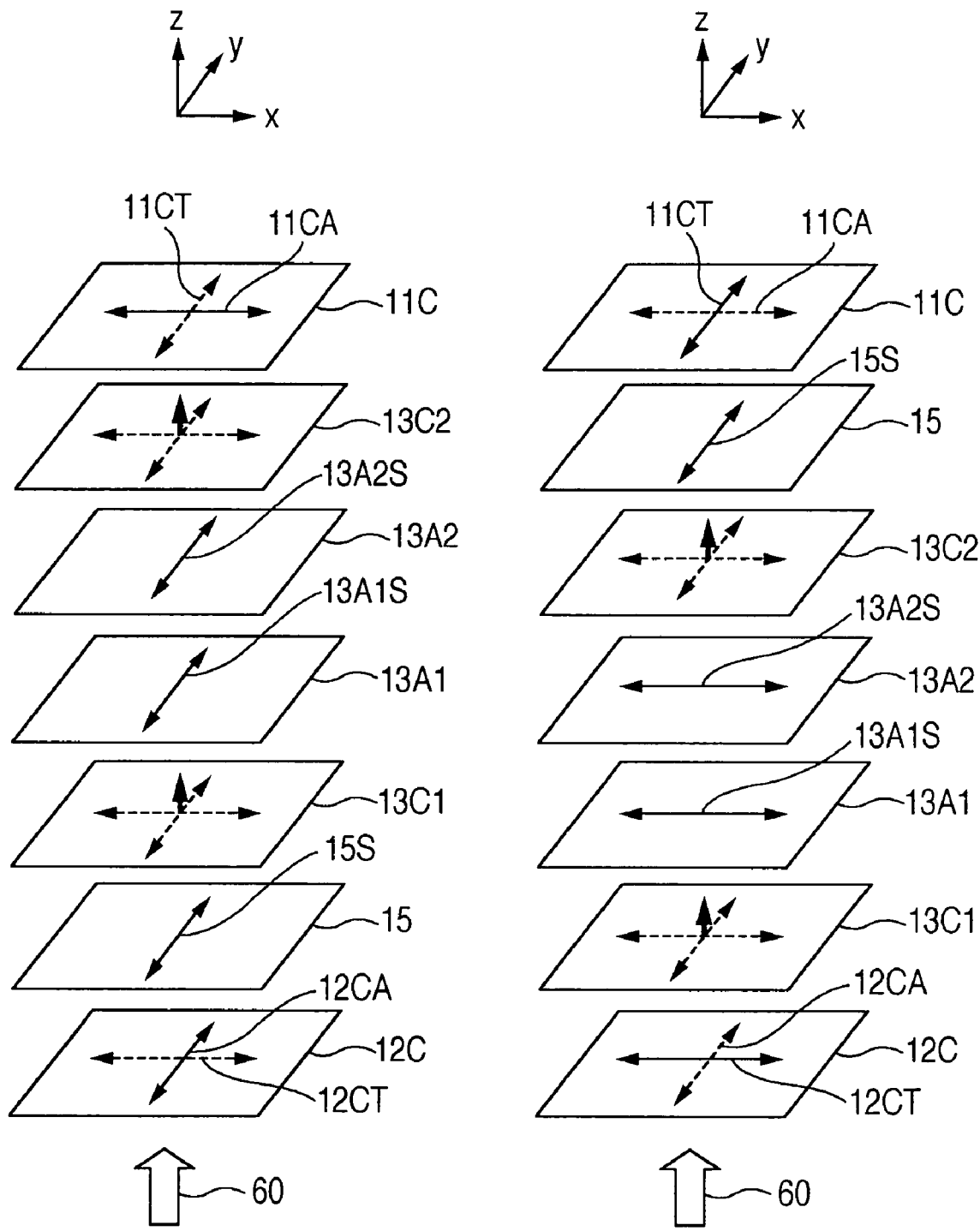
FIG. 55 is a view showing an LCD apparatus according to one embodiment of the present invention.

FIG. 1 shows the configuration of the example 7 and FIG. 55 shows the optical configuration thereof. In these figures, the left-hand portion concerns with the o-mode and the right-hand portion concerns with the e-mode. In FIG. 1, the supporting material 11B or 12B of the polarizer has the isotropic refractive index. In the example 7, one positive c-plate, one positive a-plate, one negative c-plate, and one negative a-plate are used for composing the plurality of retardation films 13 shown in FIG. 1. In the configuration of FIG. 55, for the o-mode, the slow axis 13A1S of the positive a-plate 13A1 and the slow axis 13A2S of the negative a-plate 13A2 are located in parallel to the slow axis 15S of the liquid crystal layer 15. For the e-mode, the slow axis 13A1S of the positive a-plate 13A1 and the slow axis 13A2S of the negative a-plate 13A2 are located perpendicularly to the slow axis 15S of the liquid crystal layer 15.

Figure 56:
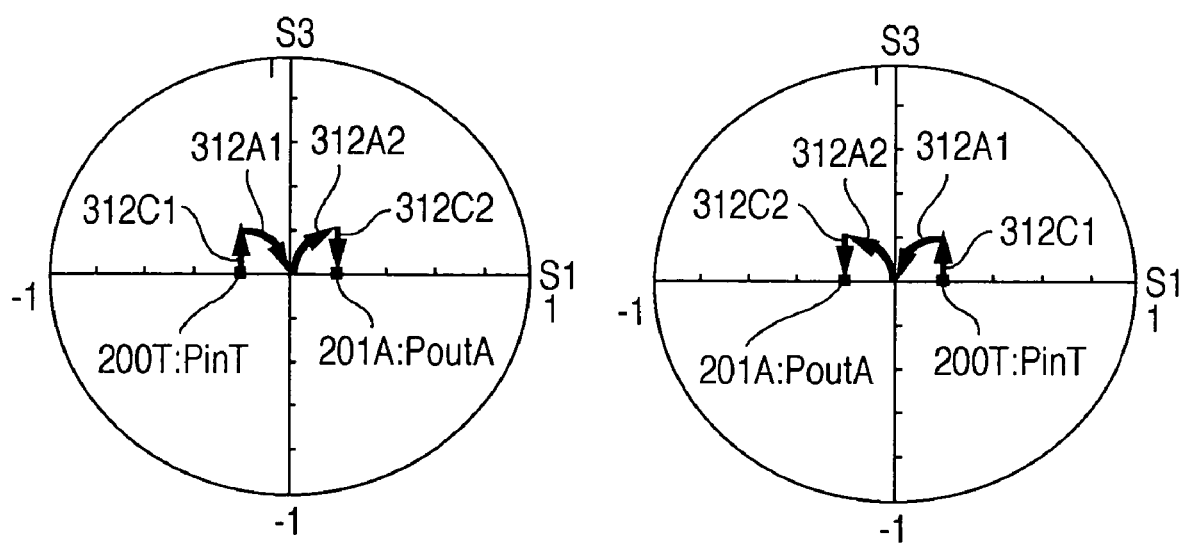
FIG. 56 is a view showing the Poincare sphere to be used for describing the LCD apparatus according to one embodiment of the present invention.

FIG. 56 shows the change of the polarization state on the black display in the example 7. In FIG. 56, 312C1, 312A1, 312A2, and 312C2 denote the changes of the polarization state caused by the positive c-plate 13C1, the positive a-plate 13A1, the negative a-plate 13A2, and the negative c-plate 13C2 shown in FIG. 56, respectively. According to the inventors' study, it was found that the change of the polarization state caused by the positive c-plate is symmetric to that caused by the negative c-plate and the change of the polarization state caused by the positive a-plate is symmetric to that caused by the negative a-plate and thereby the color shift depending on the viewing angle may be reduced.

Figure 57:
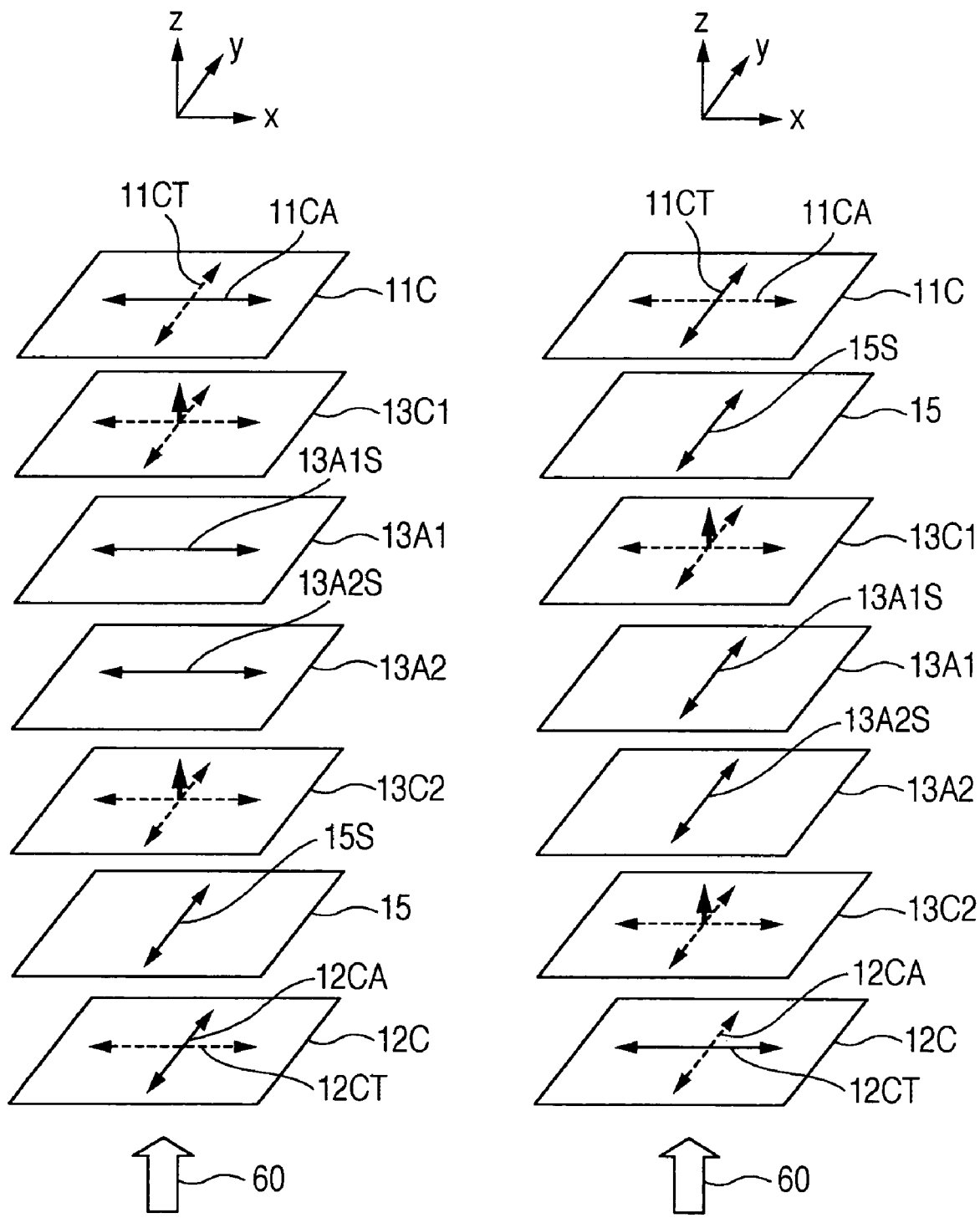
FIG. 57 is a view showing an LCD apparatus according to one embodiment of the present invention.
Figure 58:
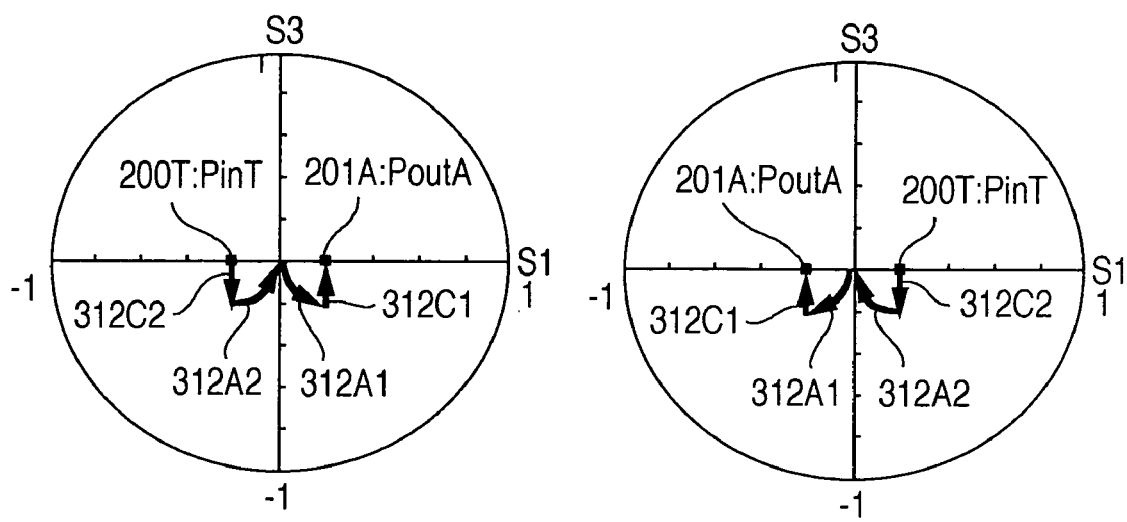
FIG. 58 is a view showing the Poincare sphere to be used for describing the LCD apparatus according to one embodiment of the present invention.

The similar change of the polarization state can be obtained by the configuration shown in FIG. 57. The left-hand portion of FIG. 57 concerns with the o-mode, while the right-hand portion thereof concerns with the e-mode. The location of four retardation films in FIG. 55 is different from the location thereof in FIG. 57. Further, in FIG. 57, for the o-mode, the slow 13A1S of the positive a-plate 13A1 and the slow axis 13A2S of the negative a-plate 13A2 are located in parallel to the slow axis 15S of the liquid crystal layer 15, while for the e-mode, the slow 13A1S thereof and the slow axis 13A2S thereof are located perpendicularly to the slow axis 15S thereof. The change of the polarization state in the black state in this configuration is shown in FIG. 58. It is understood that the change of the polarization state shown in FIG. 56 is symmetric to that shown in FIG. 58. That is, the configurations shown in FIGS. 55 and 57 are substantially equivalent with respect to the change of the polarization state.

EXAMPLE 8

The example 8 concerns with the method of changing the dependency of the refractive index of the retardation films on the wavelength and reducing the luminance change and the color shift in the black state.

Figure 59:
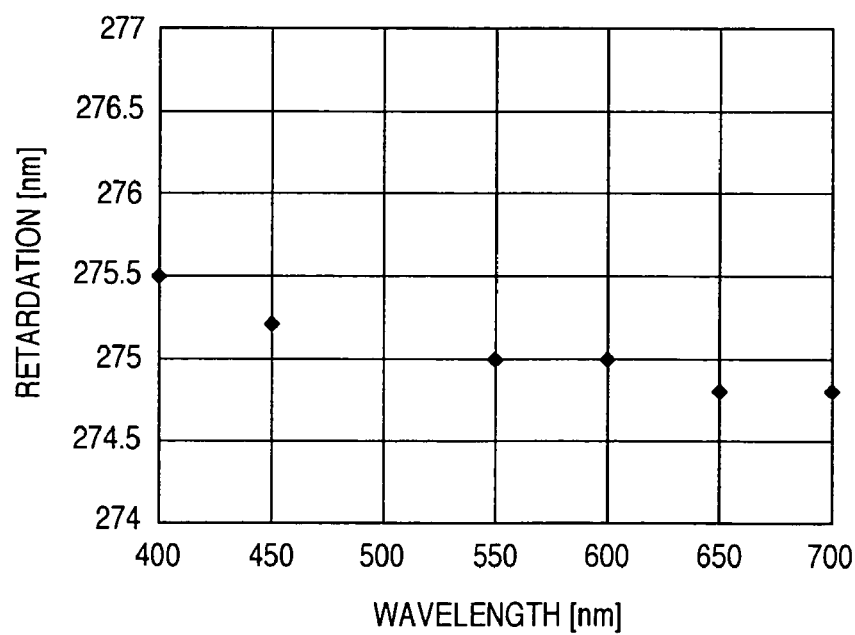
FIG. 59 is a characteristic graph showing an example of a relation between retardation and wavelength of an retardation film formed of norbornane.

As an example, the application of the example 8 to the configuration described about the embodiment 3 will be described. The optical configuration is as shown in FIGS. 27 and 28. The example 3 indicates the result derived through the effect of the optical simulation executed on the assumption that the positive a-plate 13A1 and the negative a-plate 13A2 are formed of PC, polystyrene, and a norbornane system material and the dependency of the refractive index on the wavelength is specified. FIG. 59 shows the dependency of the retardation of the positive a-plate formed of the norbornane system material on the refractive index. As shown in FIG. 59, it is understood that a shorter wavelength makes the retardation larger, while the longer wavelength makes the retardation smaller. This trend holds true to the positive a-plate formed of PC or polystyrene. Consider how the polarization state is changed depending on the wavelength in the configuration shown in the left hand of FIG. 27 in the case of using the retardation films formed of one of those materials.

Considering the change of the polarization state on the Poincare sphere, the change is represented by the rotation transformation with a certain axis as its center. The angle of rotation is $2\pi R/\lambda$, in which R is a retardation and $\lambda$ is a wavelength.

Figure 60:
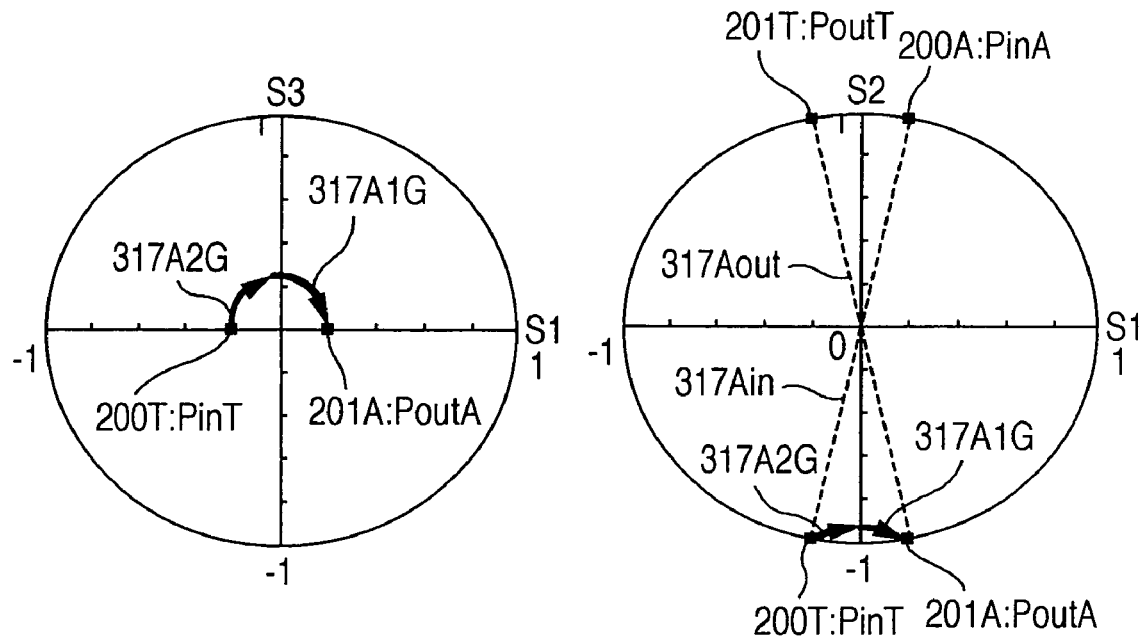
FIG. 60 is a view showing the Poincare sphere to be used for describing the LCD apparatus according to one embodiment of the present invention.
Figure 61:
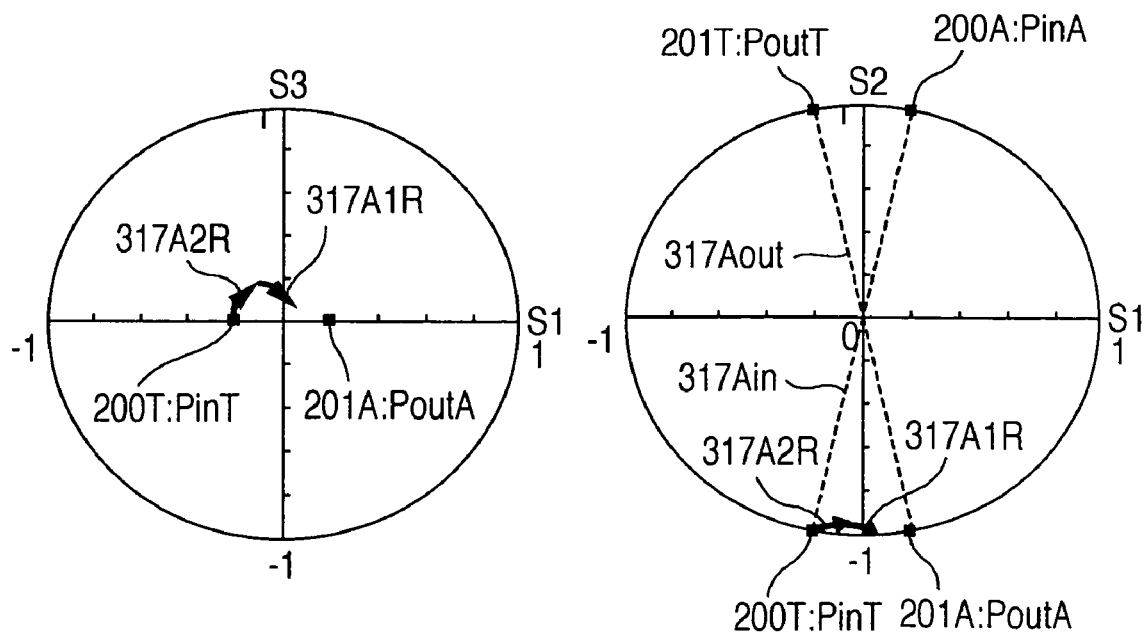
FIG. 61 is a view showing the Poincare sphere to be used for describing the LCD apparatus according to one embodiment of the present invention.
Figure 62:
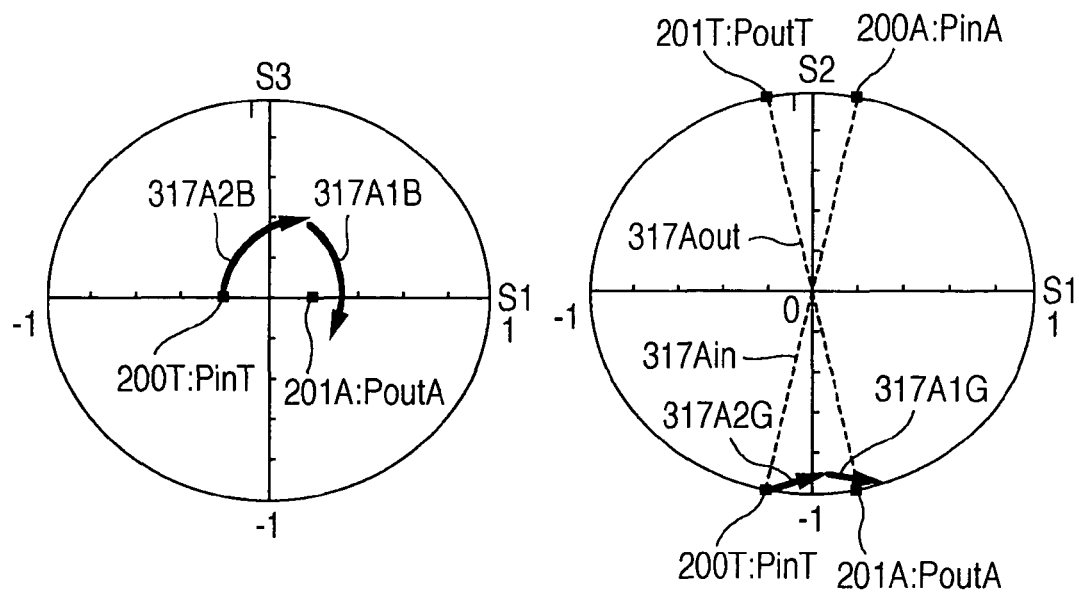
FIG. 62 is a view showing the Poincare sphere to be used for describing the LCD apparatus according to one embodiment of the present invention.

It is assumed that in the configuration shown in the left hand of FIG. 27 the retardations of the positive a-plate 13A1 and the negative a-plate 13A2 are specified and the change of the polarization state as shown in FIG. 60 is occurring until the green light with a wavelength of 550 nm reaches the second polarizer 11. The almost of the green light is absorbed by the second polarizer, when the change of the polarization state is brought about with respect to the red light with a wavelength of about 600 nm. This change is shown in FIG. 61. Since the wavelength of the red light is longer than that of the green light, the rotation angle of the foregoing rotation transformation about the red light is smaller than that about the green light. Likewise, the change of the polarization state is brought about with respect to the blue light with a wavelength of about 420 nm. This change is shown in FIG. 62. Since the wavelength of the blue light is shorter than that of the green light, the rotation angle of the foregoing rotation transformation about the blue light is larger than that about the green light. That is, even if the change of the polarization state as shown in FIG. 60 is obtained about the light with each wavelength, the change of the polarization state as shown in FIG. 61 or 62 is caused with respect to the light with another wavelength rather the aforementioned wavelength. It was found that this change in the case of the luminance change and the color shift in the oblique field of view in the black state.

Then, a new means is provided for avoiding such a phenomenon by changing the dependency of the retardation refractive index of the retardation film on the wavelength. In order to keep the rotation angle of the foregoing rotation transformation constant without depending on any wavelength, it is just necessary to establish the relation of:

$$R/\lambda = K \text{(constant)} \tag{10}$$

Figure 63:
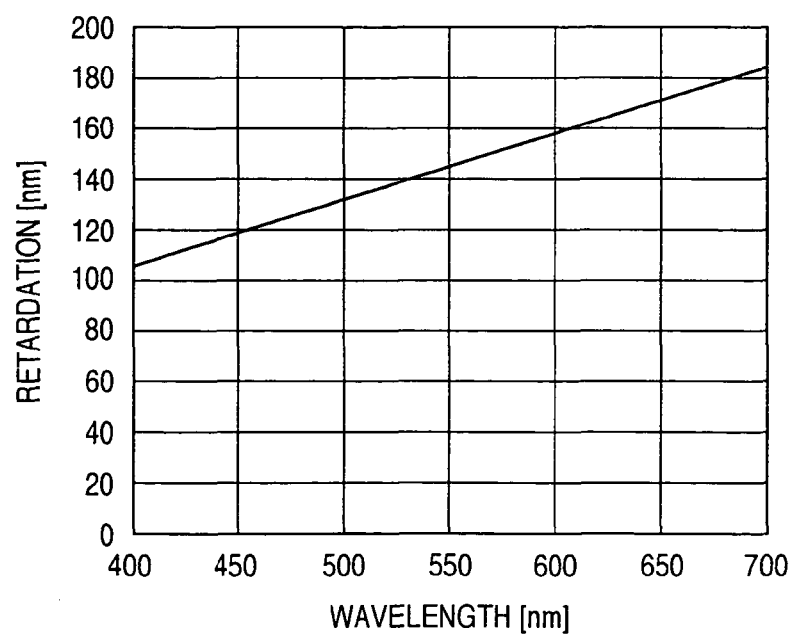
FIG. 63 is a characteristic graph showing a representative example of a relation between retardation and wavelength of an retardation film used in the LCD apparatus according to one embodiment of the present invention.

That is, it was found that $R=K\lambda$ is established and the linear relation is also established between the retardation of the retardation film and the wavelength. From the expression (10), K is constant. FIG. 63 shows the ideal dependency of the retardation of the film on the wavelength, which is derived on this fact. FIG. 63 shows a mere example in which the dependency of the retardation on the wavelength concerns with the positive a-plate with the retardation of 140 nm against the light with the wavelength of 533 nm. Assuming that the positive a-plate and the negative a-plate have this dependency of the retardation on the wavelength, the viewing angle characteristic in the black state in the configuration shown in the left hand of FIG. 27 is reviewed through the effect of the optical simulation.

Figure 64:
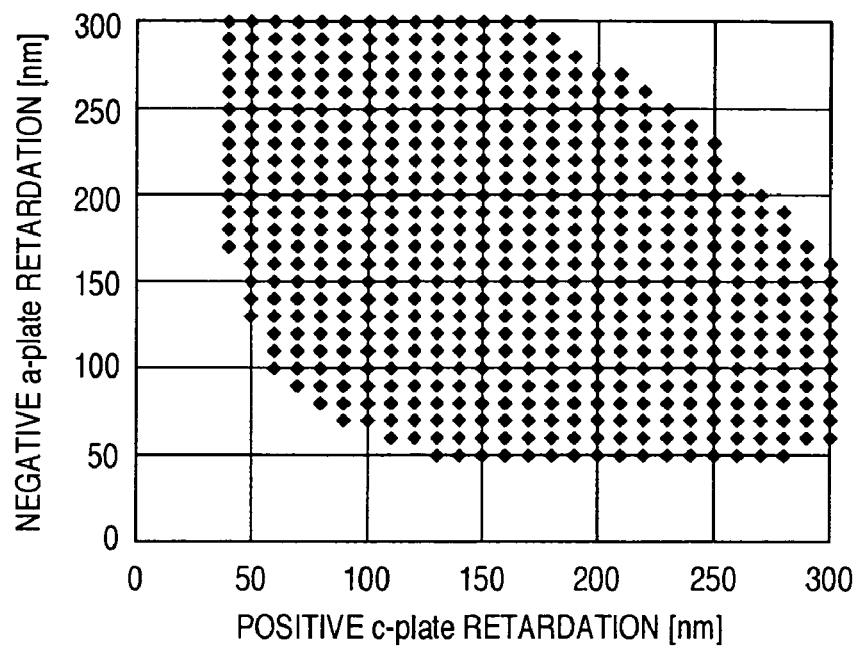
FIG. 64 is a graph showing characteristics of the LCD apparatus according to one embodiment of the present invention.
Figure 65:
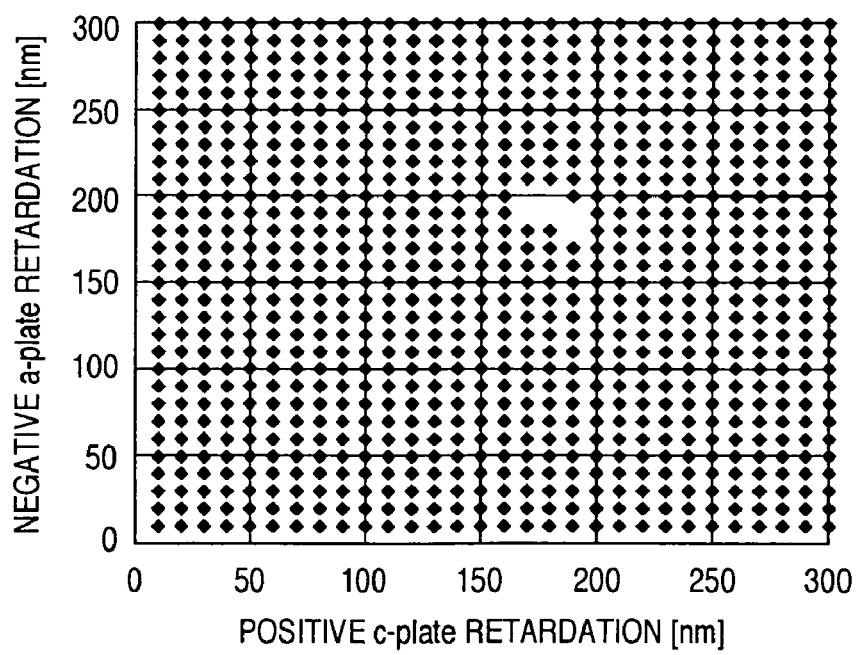
FIG. 65 is a graph showing characteristics of the LCD apparatus according to one embodiment of the present invention.
Figure 66:
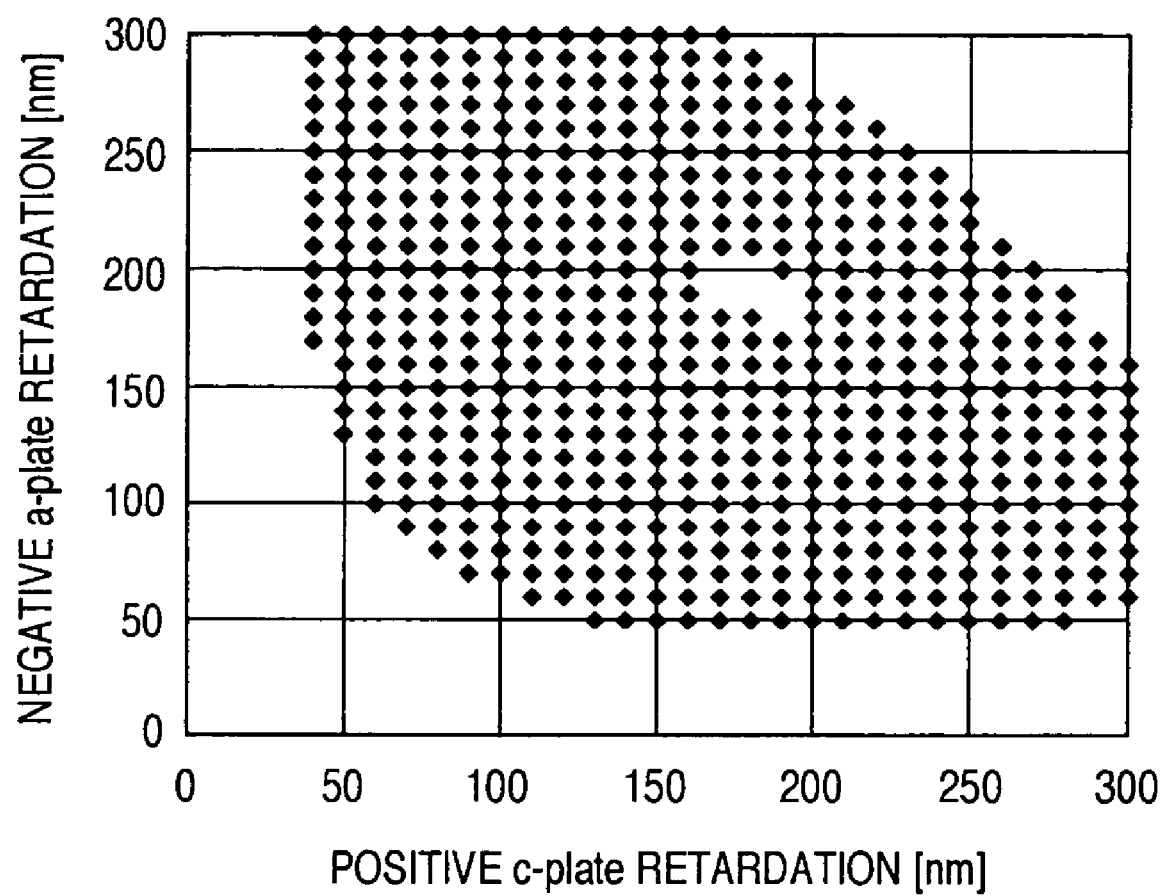
FIG. 66 is a graph showing characteristics of the LCD apparatus according to one embodiment of the present invention.

With the same method as the method of deriving the result shown in FIG. 33 in the example 3, the resulting condition in which the maximum transmittance is 1.2% or less is shown in FIG. 64. This condition is derived as a result of calculating the maximum transmittance and Δxy in the black state in the left-hand portion of FIG. 27 as changing the retardations of the positive a-plate and the negative a-plate. Further, FIG. 65 shows the resulting condition in which Δxy is 0.15 or less. Further, FIG. 66 shows the resulting condition in which the maximum transmittance is 1.2% or less and Δxy is 0.15 or less. Comparing the result in FIG. 33 with that in FIG. 64, the result in FIG. 34 with that in FIG. 65, and the result in FIG. 35 with that in FIG. 66, it is understood that the retardation films provided with the dependency of the retardation on the wavelength described with respect to the example 8 may greatly improves the viewing angle characteristic in the black state even if the configurations are the same as each other. The degrees of the maximum luminance and Δxy reduction was greatly improved using the retardation films provided with the dependency of the retardation on the wavelength described with respect to the example 8.

This trend was also obtained in the case of using at least one retardation film that satisfies the following relation:

$$R_R > R_G > R_B \tag{11}$$

wherein $R_R$, $R_G$ and $R_B$ denote the retardations to the blue light, the green light and the red light, respectively.

Further, about this relation, the similar result was obtained in all the configurations of the examples 1 to 9. Moreover, the similar result was obtained not only in the case of the retardation films but also in the case that the polarizer supporting material with an anisotropic has the foregoing dependency of the retardation on the wavelength.

EXAMPLE 9

Figure 67:
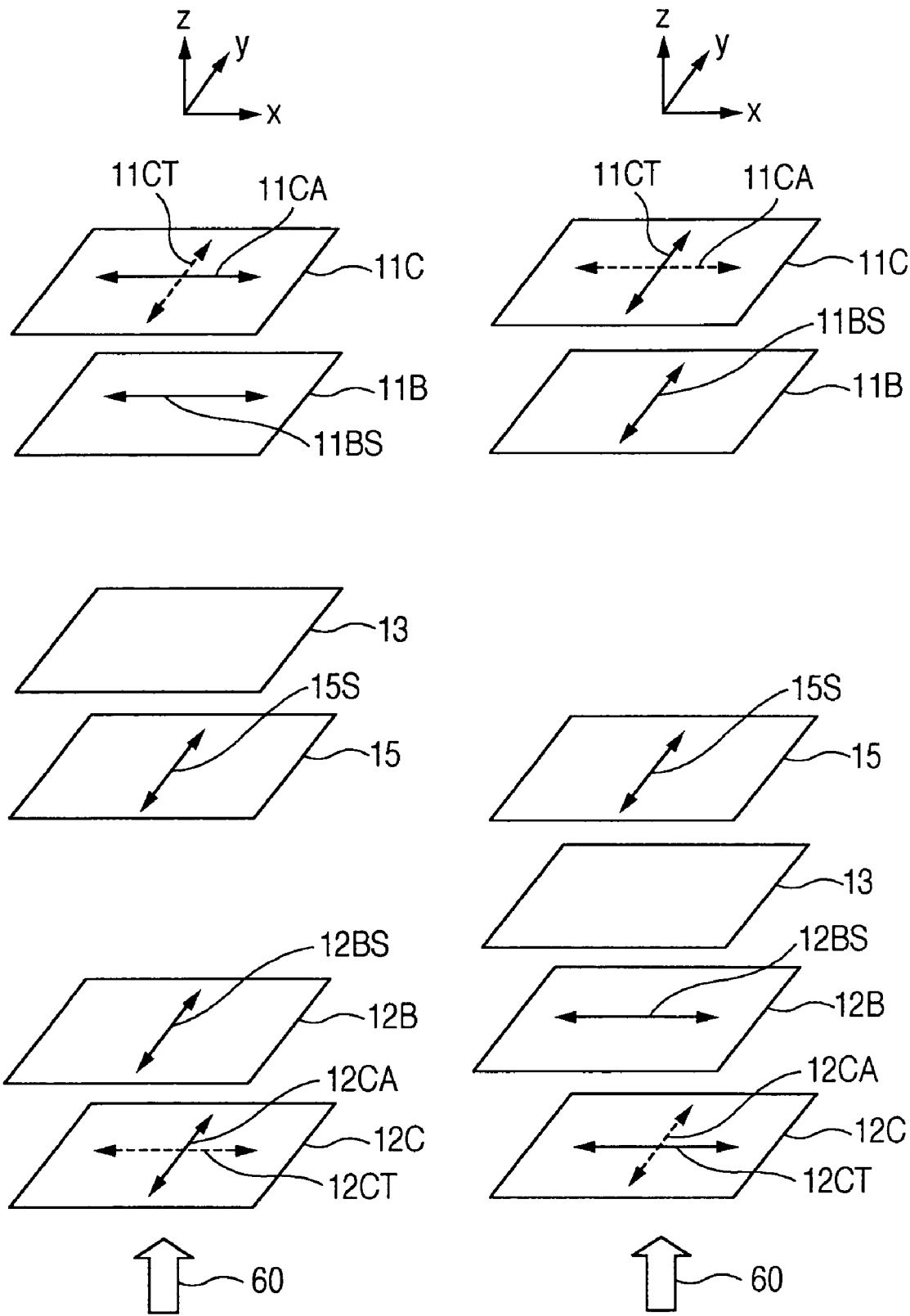
FIG. 67 is a view showing an LCD apparatus according to one embodiment of the present invention.

The configuration of the example 9 is shown in FIG. 1 and the optical configuration thereof is shown in FIG. 67. In both figures, the left-hand portion concerns with the o-mode, while the right-hand portion concerns with the e-mode. In the example 9, the polarizer supporting materials 11B and 12B are formed of a birefringent medium and thus include the anisotropic as that of the positive a-plate. As shown in FIG. 67, the slow axes 11BS and 12BS are located in parallel to the absorption axes 11CA and 12AC of the adjacent polarization layer.

In a case that the foregoing polarizer is included in the configuration shown in FIG. 67, it was found that if the change of the polarization state shown in FIG. 13 for the o-mode or shown in FIG. 14 for the e-mode before and after the light is transmitted through the retardation films 13, the optical configurations shown in the left hand of FIG. 67 and in FIG. 4 are equivalent in the change of the polarization state and the optical configurations shown in the right hand of FIG. 67 and in FIG. 6 are also equivalent in the change thereof. That is, in the lateral electric field system, the use of the polarizer described in the example 9 does not need to cancel the birefringence of the polarizer supporting material for eliminating the adverse effect of the liquid crystal layer in the oblique field of view unlike the example 5. Or, the use of the polarizer described in the example 9 does not need to reduce the adverse effect of the liquid crystal layer from the oblique field of view though the example 7 needs the negative a-plate for reducing the adverse effect thereof. Like the example 1 to 4, the example 9 requires the retardation films 13 to perform the conversion of the polarization state shown in FIG. 13 for the o-mode or in FIG. 14 for the e-mode.

Further, the similar result is obtained when the negative a-plate is used as the polarizer supporting material and the slow axis thereof is located perpendicularly to the absorption axis of the adjacent polarization layer.

EXAMPLE 10

When manufacturing the LCD apparatus having the configuration shown in FIG. 1, in place of performing the work of pasting a plurality of retardation films 13 with the substrate 14 or 16 and further with the polarizer 11 or 12, it is better in productivity to use the pre-pasted combination of the polarizer and the retardation films as one polarizer.

For example, when manufacturing the LCD apparatus having the configuration of the example 1 shown in FIG. 16, it is possible to use the combination of the polarizer and the positive a-plate and c-plate pasted in the shown order as one polarizer.

Further, in a case that the retardation films are served as the polarizer supporting material, it is not necessary to locate the polarizer supporting material 11B or 12B shown in FIG. 1, thereby being able to reduce the number of necessary components.

This holds true to the manufacture of the LCD apparatus having each of the configurations described with respect to the examples 2 to 11.

EXAMPLE 11

FIG. 2 shows the configuration of the example 11. The left-hand portion of FIG. 2 concerns with the o-mode, while the right-hand portion of FIG. 2 concerns with the e-mode. In the example, for the o-mode, the supporting material 11D of the second polarizer is formed of TAC and the supporting material of the first polarizer has the isotropic. For the e-mode, the supporting material 12D of the first polarizer is formed of TAC and the supporting material of the second polarizer has the isotropic. Further one negative a-plate is used as the plurality of retardation films 13.

Figure 68:
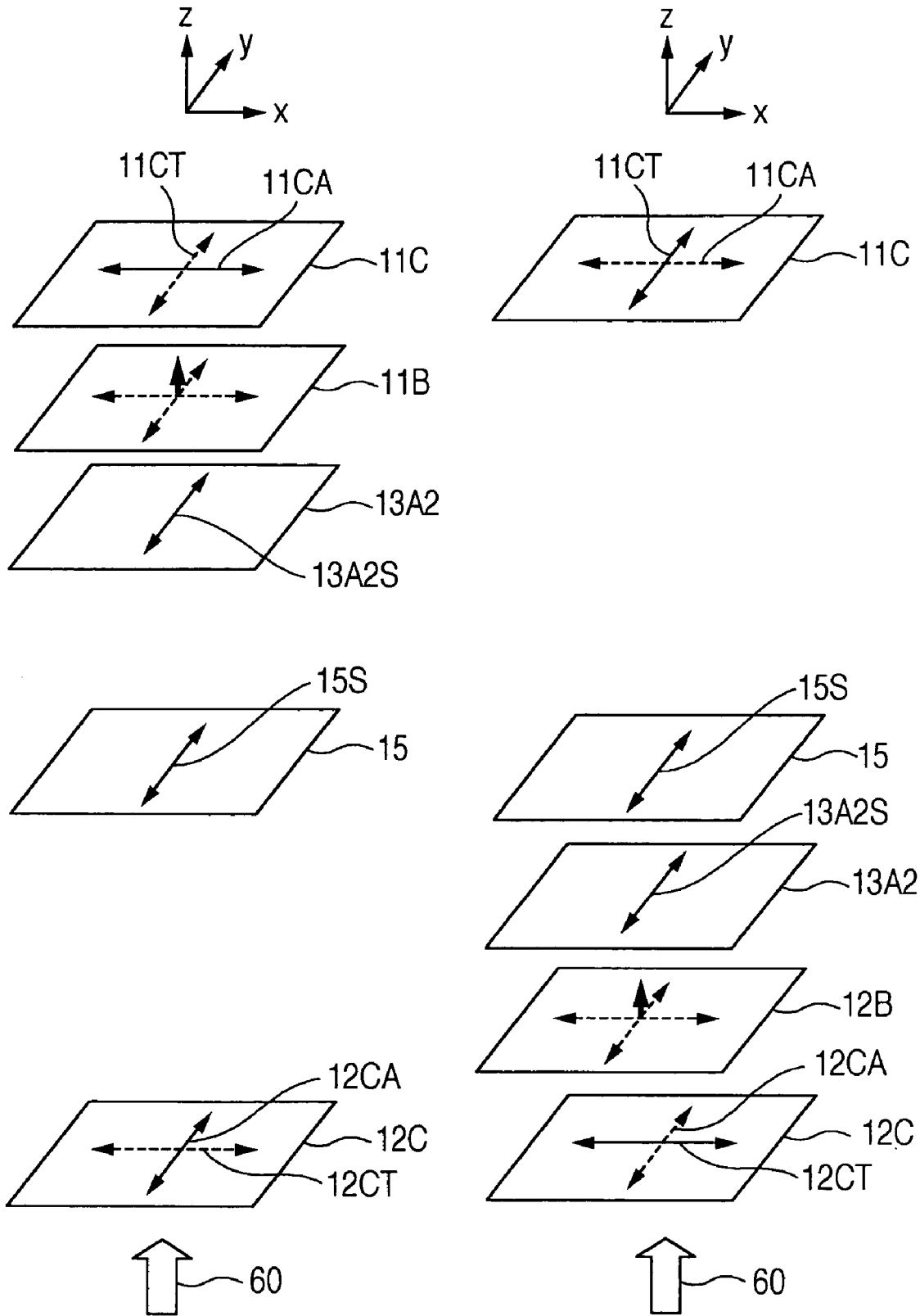
FIG. 68 is a view showing an LCD apparatus according to one embodiment of the present invention.

The optical configuration of the example 11 is shown in FIG. 68. As shown in FIG. 68, the slow axis 13A2S of the negative a-plate 13A2 is located in parallel to the slow axis 15S of the liquid crystal layer 15. In this case, it was found that the example 11 offers the substantially equivalent change of polarization state as that occurred in the example 1 or 2. In FIGS. 22 to 24, the replacement of the retardation of the polarizer supporting material formed of TAC with the retardation of the positive c-plate makes it possible to apply the results shown in FIGS. 22 to 24 to the configuration shown in FIG. 68 as it is.

It was found that the part of the condition in which the luminance change and the color shift are both reduced as shown in FIG. 24 can be sufficiently achieved by the TAC used as the polarizer supporting material. Further, the material of TAC is highly endurable to the variety of refractive indexes caused by the external force. Hence, it was found that the configuration shown in FIG. 68 is effective in reducing the luminance change and the color shift in the black state when viewed from the oblique direction, reducing the number of necessary components, and improving the reliability of the LCD apparatus.

The idea of providing the TAC with the function as the polarizer supporting material and the function as one of the retardation films may be applied to every case of locating the negative c-plate adjacently to the polarization layer in the optical configuration illustrated with respect to the example 9.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display apparatus comprising:
a first polarization layer located on one side of a first substrate;
a second polarization layer located on the other side of a second substrate;
a liquid crystal layer formed of liquid crystal molecules and located between said first and second substrates such that said liquid crystal molecules are aligned in parallel to said first or second substrate and in one direction and thereby make a black state possible; and
a lighting device,
wherein an absorption axis of said first polarization layer is substantially perpendicular to an absorption axis of said second polarization layer;
said first polarization layer is located on a side of said lighting device;
said absorption axis of said first polarization layer is substantially perpendicular to a slow axis on a plane of said liquid crystal layer;
refractive index of a portion between said liquid crystal layer and said second polarization layer is substantially isotropic;
a first retardation film and a second retardation film are located between said liquid crystal layer and said first polarization layer;
said first retardation film satisfies any one of following cases (1) to (4) under conditions that n1 is a planar refractive index in a slow axis direction, n2 is a planar refractive index in a fast axis direction and n3 is a refractive index in a thickness direction,
(1) said first retardation film satisfies 0.5<(n1−n3)/(n1−n2)<0.8, and said second retardation film satisfies (n1−n3)/(n1−n2)<0.5
(2) said first retardation film satisfies 1.2<(n1−n3)/(n1−n2)<5, and said second retardation film satisfies (n1−n3)/(n1−n2)<0.5
(3) said first retardation film satisfies 0.5<(n1−n3)/(n1−n2), and said second retardation film satisfies 0.2<(n1−n3)/(n1−n2)<0.5
(4) said first retardation film satisfies 0.5<(n1−n3)/(n1−n2), and said second retardation film satisfies −5<(n1−n3)/(n1−n2)<0.2; wherein,
when said first retardation film is located on a side of said first polarization layer, and said second retardation film is located on a side of said second retardation film is located on a side of said liquid crystal layer, slow axes on planes of said first retardation film and said second retardation film are substantially parallel to a slow axis on a plane of said liquid crystal layer;
when said first retardation film is located on a side of said liquid crystal layer, and said second retardation film is located on a said of said first polarization layer, slow axes on planes of said first retardation film and said second retardation film are substantially perpendicular to a slow axis on a plane of said liquid crystal layer; and
when a viewing angle is changed, a maximum value of transmittance in said black state is 1.2% or less.

2. The liquid crystal display apparatus according to claim 1, wherein one of said first and second retardation films is a retardation film of uniaxial anisotropy, and the other is a retardation film of biaxial anisotropy.

3. A liquid crystal display apparatus comprising:
a first polarization layer located on one side of a first substrate;
a second polarization layer located on the other side of a second substrate;
a liquid crystal layer formed of liquid crystal molecules and located between said first and second substrates such that said liquid crystal molecules are aligned in parallel to said first substrate or second substrate and in one direction and thereby make a black state possible; and
a lighting device,
wherein an absorption axis of said first polarization layer is substantially perpendicular to an absorption axis of said second polarization layer;
said first polarization layer is located on a side of said lighting device;
said absorption axis of said first polarization layer is substantially perpendicular to a slow axis on a plane of said liquid crystal layer;

refractive index of a portion between said liquid crystal layer and said first polarization layer is substantially isotropic;

a first retardation film and a second retardation film are located between said liquid crystal layer and said second polarization layer;

said first retardation film satisfies any one of the following cases (1) to (4) under conditions that n1 is a planar refractive index in a slow axis direction, n2 is a planar refractive index in a fast axis direction and n3 is a refractive index in a thickness direction, (1) said first retardation film satisfies 0.5<(n1−n3)/(n1−n2)<0.8, and said second retardation film satisfies (n1−n3)/(n1−n2)<0.5

(2) said first retardation film satisfies 1.2<(n1−n3)/(n1−n2)<5, and second retardation film satisfies (n1−n3)/(n1−n2)<0.5

(3) said first retardation film satisfies 0.5<(n1−n3)/(n1−n2), and said second retardation film satisfies 0.2<(n1−n3)/(n1−n2)<0.5

(4) said first retardation film satisfies 0.5<(n1−n3)/(n1−n2), and said second retardation film satisfies −5<(n1−n3)/(n1−n2)<−0.2; wherein, when said first retardation film is located on a side of said second polarization layer, and said second retardation film is located on a side of said liquid crystal layer, slow axes on planes of said first retardation film and said second retardation film are substantially parallel to a slow axis on a plane of said liquid crystal layer;

wherein said first retardation film is located on a side of said liquid crystal layer, and said second d retardation film is located on a side of said second polarization layer, slow axes on planes of said first retardation film and said second retardation film are substantially perpendicular to a slow axis on a plane of said liquid crystal layer; and when a viewing angle is changed, a maximum value of transmittance in said black state is 1.2% or less.

4. The liquid crystal display apparatus according to claim 3, wherein one of said first and second retardation films is a retardation film of uniaxial anisotropy, and the other is a retardation film of biaxial anisotropy.

5. The liquid crystal display apparatus according to claim 1 or 3, said first polarization layer is formed by coating said first substrate with materials and then placing said first substrate under alignment processing.

6. A liquid crystal display apparatus comprising:

a first polarization layer located on one side of a first substrate;

a second polarization layer located on the other side of a second substrate;

a liquid crystal layer formed of liquid crystal molecules and located between said first and second substrates such that said liquid crystal molecules are aligned in parallel to said first or second substrate and in one direction and thereby make a black state possible; and a lighting device, wherein an absorption axis of said first polarization layer is substantially perpendicular to an absorption axis of said second polarization layer;

said first polarization layer is located on a side of said lighting device;

said absorption axis of said first polarization layer is substantially perpendicular to a slow axis on a plane of said liquid crystal layer;

refractive index of a portion between said liquid crystal layer and said second polarization layer is substantially isotropic;

a first retardation film and a second retardation film are located between said liquid crystal layer and said first polarization layer;

said first retardation film satisfies any one of following cases (1) to (4) under conditions that n1 is a planar refractive index in a slow axis direction, n2 is a planar refractive index in a fast axis direction and n3 is a refractive index in a thickness direction, (1) said first retardation film satisfies 0.5<(n1−n3)/(n1−n2)<0.8, and said second retardation film satisfies (n1−n3)/(n1−n2)<0.5

(2) said first retardation film satisfies 1.2<(n−n3)/(n1−n2)<5, and second retardation film satisfies (n1−n3)/(n1−n2)<0.5

(3) said first retardation film satisfies 0.5<(n1−n3)/(n1−n2), and said second retardation film satisfies 0.2<(n1−n3)/(n1−n2)<0.5

(4) said first retardation film satisfies 0.5<(n1−n3)/(n1−n2), and said second retardation film satisfies −5<(n1−n3)/(n1−n2)<−0.2; wherein, when said first retardation film is located on a side of said first polarization layer, and said second retardation film is located on a side of said second retardation film is located on a side of said liquid crystal layer, slow axes on planes of said first retardation film and said second retardation film are substantially parallel to a slow axis on a plane of said liquid crystal layer;

when said first retardation film is located on a side of said liquid crystal layer, and said second retardation film is located on a said of said first polarization layer, slow axes on planes of said first retardation film and said second retardation film are substantially perpendicular to a slow axis on a plane of said liquid crystal layer;

when said first retardation film is located on a side of said first polarization layer, and said second retardation film is located on a side of said liquid crystal layer, said first retardation film satisfies n1 1≈n2>n3, and said first retardation film is TAC; and when a viewing angle is changed, a maximum value of transmittance in said black state is 1.2% or less.

* * * * *